United States Patent
Werner et al.

(10) Patent No.: US 8,496,258 B2
(45) Date of Patent: Jul. 30, 2013

(54) HYBRID COMPONENT

(75) Inventors: Mark F. Werner, LaSalle (CA);
Timothy W. Skszek, Saline, MI (US);
Frank A. Horton, Rochester Hills, MI (US); Warren Young, Troy, MI (US);
Seetarama S. Kotagiri, Rochester Hills, MI (US); Gregory P. Kiselis, Oak Ridge, NC (US); DeWayne Dale Egle, Davisburg, MI (US); Gianfranco Gabbianelli, Birmingam, MI (US);
Jeffrey Jay Mellis, Bloomfield Hills, MI (US); Erryn Leigh Langlois, Windsor (CA); Daniel Sulisz, Lake Orion, MI (US); Pascal P. Charest, Caledon (CA);
Eric deNijs, Etobicoke (CA); Ying Zhang, Troy, MI (US); Ryan R. Warpup, Troy, MI (US); Dalip K. Matharoo, Orion, MI (US)

(73) Assignee: Magna International Inc., Aurora, Ontario (CA)

( * ) Notice: Subject to any disclaimer, the term of this patent is extended or adjusted under 35 U.S.C. 154(b) by 338 days.

(21) Appl. No.: 12/911,930

(22) Filed: Oct. 26, 2010

(65) Prior Publication Data

US 2011/0068619 A1    Mar. 24, 2011

Related U.S. Application Data

(63) Continuation-in-part of application No. 10/576,377, filed as application No. PCT/US2004/034504 on Oct. 20, 2004, now Pat. No. 7,837,230, application No. 12/911,930, which is a continuation-in-part of application No. 12/871,329, filed on Aug. 30, 2010, which is a continuation-in-part of application No. 11/913,736, filed as application No. PCT/CA2006/000820 on May 19, 2006, now Pat. No. 7,806,162.

(60) Provisional application No. 60/512,827, filed on Oct. 20, 2003, provisional application No. 60/612,800, filed on Sep. 27, 2004, provisional application No. 60/682,329, filed on May 19, 2005.

(51) Int. Cl.
*B60G 9/00* (2006.01)

(52) U.S. Cl.
USPC ....... 280/124.116; 280/124.128; 280/124.129

(58) Field of Classification Search
USPC .................. 280/124.116, 124.128, 124.129, 280/124.13
See application file for complete search history.

(56) References Cited

U.S. PATENT DOCUMENTS

| 1,021,437 A | 3/1912 | Vallone |
| 3,210,102 A | 10/1965 | Joslin |

(Continued)

FOREIGN PATENT DOCUMENTS

| CA | 1288928 | 9/1991 |
| CA | 2174302 | 11/1996 |

(Continued)

*Primary Examiner* — Toan To
(74) *Attorney, Agent, or Firm* — Dicksinson Wright PLLC

(57) ABSTRACT

A hybrid torsion beam axle assembly is provided, which includes a steel torsion beam. An end cap is fastened to an end portion of the steel torsion beam, and a cast trailing arm is cast about the end portion of the steel torsion beam including the end cap. In this way, the cast trailing arm is positively and rigidly secured to the steel torsion beam.

10 Claims, 39 Drawing Sheets

U.S. PATENT DOCUMENTS

| | | |
|---|---|---|
| 3,414,966 A | 12/1968 | Devin |
| 3,664,410 A | 5/1972 | Groteke |
| 3,844,024 A | 10/1974 | Otto |
| 3,881,973 A | 5/1975 | Pinckney |
| 4,007,540 A | 2/1977 | Tyree |
| 4,145,068 A | 3/1979 | Toyomasu |
| 4,262,187 A | 4/1981 | Savor |
| 4,279,275 A | 7/1981 | Stanwood et al. |
| 4,289,557 A | 9/1981 | Stanwood et al. |
| 4,413,856 A | 11/1983 | Mcmahan |
| 4,422,680 A | 12/1983 | Goupy |
| 4,465,392 A | 8/1984 | Lang |
| 4,505,238 A | 3/1985 | Jordan |
| 4,541,649 A | 9/1985 | Grunfeld |
| 4,548,254 A | 10/1985 | Roberts |
| 4,606,395 A | 8/1986 | Ban et al. |
| 4,633,931 A | 1/1987 | Yamaguchi et al. |
| 4,700,444 A | 10/1987 | Yamagata |
| 4,779,666 A | 10/1988 | Ruhlandt et al. |
| 4,829,979 A | 5/1989 | Moir |
| 4,856,800 A | 8/1989 | Hashimoto |
| 5,080,412 A | 1/1992 | Stewart |
| 5,116,071 A | 5/1992 | Calfee |
| 5,160,682 A | 11/1992 | Calfee |
| 5,226,469 A | 7/1993 | Matsumura |
| 5,232,041 A | 8/1993 | Kuhn |
| 5,275,263 A | 1/1994 | Mezger |
| 5,280,820 A | 1/1994 | Voss |
| 5,285,840 A | 2/1994 | Hayashi |
| 5,338,057 A | 8/1994 | Dickerson et al. |
| 5,381,849 A | 1/1995 | Fussnegger |
| 5,385,375 A | 1/1995 | Margan |
| 5,385,421 A | 1/1995 | Morgan et al. |
| 5,392,840 A | 2/1995 | Morgan et al. |
| 5,433,262 A | 7/1995 | Kawaguchi et al. |
| 5,584,518 A | 12/1996 | Frank |
| 5,613,794 A | 3/1997 | Isaac et al. |
| 5,720,319 A | 2/1998 | Smith |
| 5,727,827 A | 3/1998 | Shibuya |
| 5,732,801 A | 3/1998 | Gertz |
| 5,803,517 A | 9/1998 | Shibuya |
| 5,829,805 A | 11/1998 | Watson |
| 5,983,975 A | 11/1999 | Nilsson |
| 6,042,163 A | 3/2000 | Reiffer |
| 6,086,162 A * | 7/2000 | Pinch et al. .................. 301/124.1 |
| 6,105,849 A | 8/2000 | Mochizuki et al. |
| 6,173,628 B1 | 1/2001 | Leith |
| 6,179,353 B1 | 1/2001 | Heatherington |
| 6,216,763 B1 | 4/2001 | Ruehl |
| 6,244,496 B1 | 6/2001 | Kato et al. |
| 6,298,962 B1 | 10/2001 | Kato et al. |
| 6,311,996 B1 | 11/2001 | Kato et al. |
| 6,312,028 B1 | 11/2001 | Wilkosz |
| 6,318,443 B1 | 11/2001 | Leith |
| 6,318,775 B1 | 11/2001 | Heatherington |
| 6,324,940 B1 | 12/2001 | Pazdirek et al. |
| 6,325,567 B1 | 12/2001 | Kato et al. |
| 6,328,092 B1 | 12/2001 | Guetlbauer |
| 6,406,237 B1 | 6/2002 | Wojciechowski et al. |
| 6,408,515 B1 | 6/2002 | Durand |
| 6,464,240 B1 | 10/2002 | Seksaria et al. |
| 6,481,690 B2 | 11/2002 | Kariatsumari |
| 6,561,077 B2 | 5/2003 | Castel et al. |
| 6,598,778 B2 | 7/2003 | Konno et al. |
| 6,644,699 B2 | 11/2003 | Anderson |
| 6,654,995 B1 | 12/2003 | Wang et al. |
| 6,663,150 B1 | 12/2003 | Evans |
| 6,669,252 B2 | 12/2003 | Roussel |
| 6,684,736 B2 | 2/2004 | Leith |
| 6,695,368 B1 | 2/2004 | Weykamp |
| 6,712,411 B2 | 3/2004 | Gotanda |
| 6,733,055 B2 | 5/2004 | Lino |
| 6,808,215 B2 | 10/2004 | Sakuma |
| 6,935,657 B2 | 8/2005 | Kondou et al. |
| 7,175,204 B2 | 2/2007 | Tarbutton et al. |
| 7,399,942 B2 | 7/2008 | Wang et al. |
| 7,537,224 B2 * | 5/2009 | Morris et al. ........... 280/124.116 |
| 7,566,063 B2 * | 7/2009 | Oki et al. ................ 280/124.106 |
| 7,862,059 B2 * | 1/2011 | Ko ........................ 280/124.116 |
| 2001/0004929 A1 | 6/2001 | Leith |
| 2003/0038453 A1 | 2/2003 | Seksaria et al. |
| 2004/0070220 A1 | 4/2004 | Evans |
| 2004/0183339 A1 | 9/2004 | Seksaria |
| 2006/0033304 A1 * | 2/2006 | Saieg et al. ............. 280/124.128 |
| 2006/0071440 A1 * | 4/2006 | Fought et al. .......... 280/124.128 |
| 2006/0237939 A1 * | 10/2006 | Hicks .................... 280/124.116 |
| 2009/0134594 A1 | 5/2009 | Kiselis et al. |

FOREIGN PATENT DOCUMENTS

| | | |
|---|---|---|
| DE | 521654 | 3/1931 |
| EP | 0318655 A2 | 6/1989 |
| EP | 0776814 | 6/1997 |
| JP | 59039460 A | 3/1984 |
| WO | 9622851 | 1/1996 |
| WO | 2005042188 | 5/2005 |

* cited by examiner

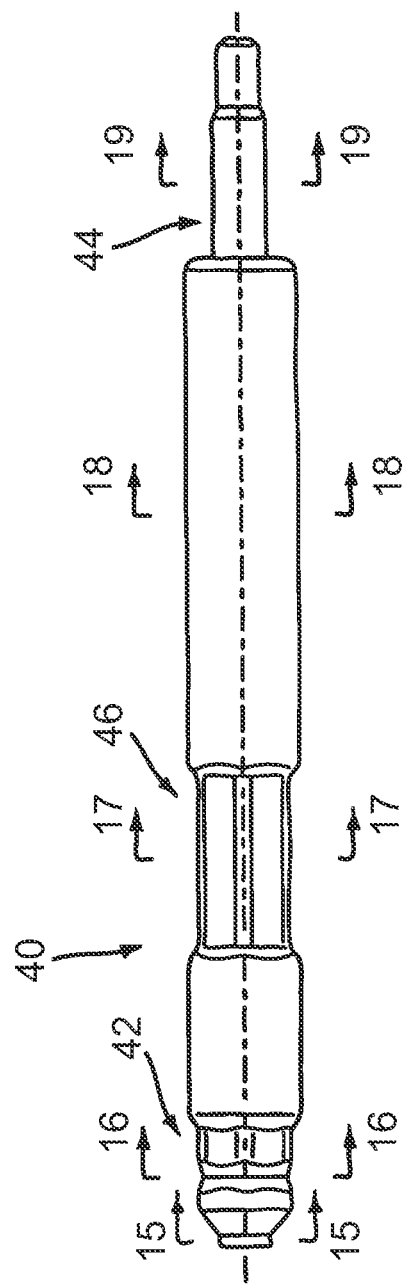
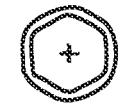
FIG. 14
FIG. 19
FIG. 18
FIG. 17
FIG. 16
FIG. 15

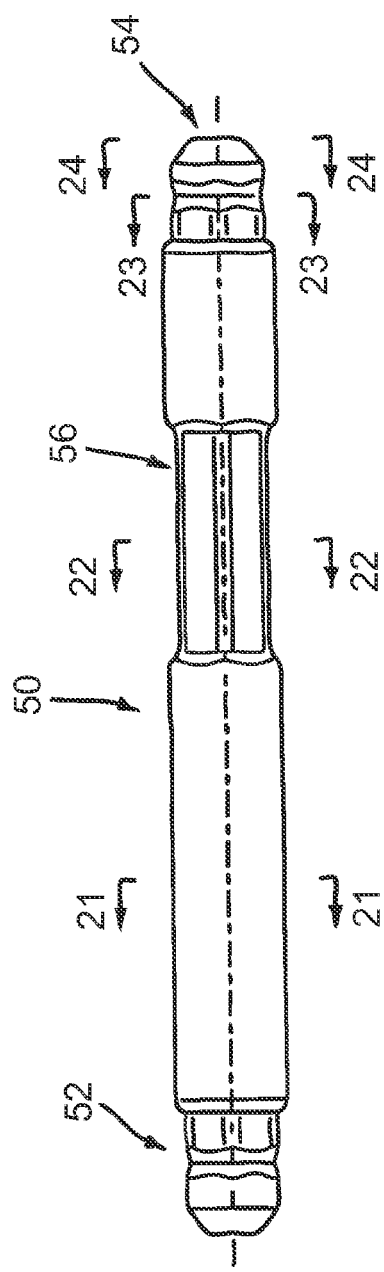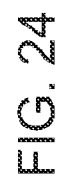

HYBRID COMPONENT

This application is a continuation-in-part of U.S. patent application Ser. No. 10/576,377, filed on Apr. 25, 2007, now U.S. Pat. No. 7,837,230 which is a National Phase entry of PCT Application No. PCT/US04/034504 filed on Oct. 20, 2004 which claims the benefit of U.S. provisional application No. 60/512,827, filed on Oct. 20, 2003 and 60/612,800, filed on Sep. 27, 2004. This application is also a continuation-in-part of U.S. patent application Ser. No. 12/871,329, filed on Aug. 30, 2010, which is a continuation-in-part of U.S. patent application Ser. No. 11/913,736, filed on Dec. 14, 2007, now U.S. Pat. No. 7,806,162 which is a National Phase entry of PCT Application No. PCT/CA06/000820 filed on May 19, 2006, which claims the benefit of U.S. provisional application No. 60/682,329, filed on May 19, 2005. The entire disclosures of each of the above-noted applications are incorporated herein by reference.

FIELD OF THE INVENTION

The present invention relates generally to an automotive component, and more specifically, to a hybrid component for use in an automobile suspension, chassis, body or power train component such as but not limited to torsion beam, control arm, engine mount, sub-frame or transmission pump that is at least partially formed by using a cast-in-place operation.

BACKGROUND OF THE INVENTION

Typically, a conventional arm member for use as an automobile suspension arm is comprised of a machined aluminum casting, iron casting or formed steel structure and a pair of elastomeric bushings pressed in each end of the member. In the case of a tubular formed steel structure, various fusion welding (MIG welding, TIG welding or laser welding), or friction agitation welding, have been developed to connect the coupling members to the tubular member at a joined portion. Known casting methods include those disclosed in U.S. Pat. Nos. 5,332,026, 5,429,175, 5,660,223, 6,467,528, and 6,745,819, the entire contents being incorporated herein by reference.

However, a conventional suspension arm member, for example, in which the main body and the coupling member are joined by using a welding method, such as fusion welding (MIG welding, TIG welding, laser welding, or the like) or a solid-phase welding method (friction agitation welding), may cause cracks at or proximate to the joined portion when a tensile load is imparted thereto resulting in separation of the joined members and reduced functionality. Further, to achieve a reduction in mass of the connecting member, the connecting member may be tubular in shape. Conventionally, the connecting member and coupling members are of similar chemical composition or metallurgically compatible to permit use of a fusion welding process used to connect the members to achieve the strength and corrosion resistance requirements of the product. Thus, there is a need to provide a component for an automobile suspension, structure, body or power train application that is light in weight and void of potential quality issues related to strength, cracks and corrosion.

Conventional aluminium high pressure die casting utilizes a hydraulic cylinder to advance a shot tip, displacing molten aluminium from the shot sleeve into the die cavity, overcoming the resistance to flow through the restricted gate area. When the die cavity is filled with molten aluminium, the pressure applied to the hydraulic shot cylinder is transferred to the molten aluminium based upon the ratio of the shot cylinder and shot tip cross-sectional area. If the die cavity containing one end of a submerged member fills and becomes pressurized before the die cavity or region of the die containing the opposing end of the submerged member, a resultant force is imposed on the end of the submerged member. To avoid movement of the submerged member, a mechanism must be employed, such as a clamp or a friction or form fitting die, to resist the force. As the cross-sectional area of the member increases, the forces become very high and difficult to manage with such mechanisms. Subsequent to filling of the die cavity, the pressure applied to the hydraulic cylinder advancing the shot tip is typically increased (i.e., intensified) by, for example, a factor of two times to reduce the volume of entrapped air and increase the rate of heat transfer. Also, once the in-gates have frozen-off through solidifying, which usually occurs prior to the solidifying of the entire die cavity, even the increased pressure fails to reach the material within the cavities being molded.

U.S. Pat. No. 3,664,410 to Groteke and U.S. Pat. No. 4,779,666 to Ruhlandt et al., disclose each a die casting process and apparatus.

SUMMARY OF THE INVENTION

The inventors of the present invention have recognized these and other problems associated with conventional components. To alleviate such problems, an aspect of the invention relates to a method of forming a hybrid component that includes deforming an open end of a tubular member to seal the open end, and casting molten material about the deformed open end to form a coupling member.

The deforming step may further comprise crushing or pinching the open end to seal the open end. The deforming step may further comprise folding the sealed open end on itself to form a J-hook attachment feature. Also, the deforming step may further comprise folding the open end.

Another aspect of the invention relates to a method of forming a hybrid component that includes inserting a cap member into or around an open end of a tubular member, and casting molten material about the tubular member and cap member to form a coupling member.

The method may further comprise the steps of piercing the tubular member and an outer wall of the cap member, and inserting a pin into the pierced tubular member and cap member.

Another aspect of the invention relates to a hybrid component that includes a tubular member having a deformed open end, and a coupling member formed on the deformed open end of the tubular member by casting-in-place molten material about the deformed open end, thereby positively securing the coupling member to the tubular member.

The component may further comprise a plug partially received in the open end, and a pin received through holes formed in the tubular member and the plug.

Another aspect of the invention relates to a method that comprises the steps of rotary swedging the open end of a tubular member to seal the open end, and casting molten material about the deformed end to form a coupling member.

Another aspect of the invention relates to a method that comprises the steps of applying a nickel-based coating material onto the surface of the closed end of a tubular member to form a coupling member.

Another aspect of the invention relates to a hybrid component for lightweight, structural uses. The hybrid component includes a steel member and a cast coupling member cast on a portion of the steel member by casting-in-place aluminum about the portion of the steel member, thereby positively and rigidly securing the coupling member to the steel member.

The steel member may be a tubular member. The portion of the steel member on which the coupling member is cast may be an end portion of the tubular member. The end portion may include bent sections extending outwardly away from the steel member. The end portion may include a section having a non-circular cross-section. The portion of the steel member on which the coupling member is cast may be a mid portion of the tubular member. The mid portion may include a section having a non-circular cross-section.

Another aspect of the invention relates to an engine cradle for a motor vehicle. The engine cradle includes a frame assembly having a pair of spaced rails secured by spaced cross members. At least one of the spaced rails and the spaced cross members include a hybrid component including a steel member formed of a high strength steel and a cast coupling member cast on a portion of the steel member by casting-in-place aluminum about the portion of the steel member, thereby positively and rigidly securing the coupling member to the steel member.

Another aspect of the invention relates to a control arm for a motor vehicle. The control arm includes a hybrid component including a steel member formed of a high strength steel and curved in a longitudinal direction and cast coupling members cast on the steel member. Each of the coupling members are cast on a portion of the steel member by casting-in-place aluminum about the portion of the steel member, thereby positively and rigidly securing the coupling member to the steel member.

Another aspect of the invention relates to an instrument panel support structure for a motor vehicle. The instrument panel support structure includes a hybrid component in the form of a cross beam and a mount positioned on each end of the hybrid component. The hybrid component includes a steel member formed of a high strength steel and a cast coupling member cast on the steel member. The coupling member is cast on a portion of the steel member by casting-in-place aluminum about the portion of the steel member, thereby positively and rigidly securing the coupling member to the steel member. The cast coupling member includes a plurality of spaced brackets.

Another aspect of the invention relates to a bumper assembly for a motor vehicle. The bumper assembly includes a hybrid component including a steel member formed of a high strength steel and cast coupling members cast on the steel member. Each of the coupling members are cast on a portion of the steel member by casting-in-place aluminum about the portion of the steel member, thereby positively and rigidly securing the coupling members to the steel member. The steel member forms a longitudinally extending steel bumper member constructed to protect the vehicle from impact, and the coupling members form first and second aluminum members attached to the steel bumper member. The steel bumper member extends between the first and second aluminum members and the first and second aluminum members are positioned between the steel bumper member and the space frame of the vehicle.

Another aspect of the invention relates to a method of forming a hybrid component for lightweight, structural uses. The method includes forming a steel member formed of a high strength steel into a predetermined configuration and casting a coupling member on a portion of the steel member by casting-in-place aluminum about the portion of the steel member, thereby positively and rigidly securing the coupling member to the steel member.

The forming the steel member may include forming the steel member to have a yield strength of at least about 1300 MPa, and the casting the cast coupling may include forming the aluminum to have a yield strength of at least about 180 MPa. The forming the steel member may include forming the steel member as a tubular member. The method may further comprise heat treating the hybrid component to an elevated temperature. The heat treating the hybrid component to an elevated temperature may include heat treating the hybrid component to approximately 400° F.

Another aspect of the invention relates to a bumper assembly for a vehicle. The bumper assembly includes a longitudinally extending steel bumper member constructed to protect the vehicle from impact, and first and second aluminum members attached to the steel bumper member. The steel bumper member extends between the first and second aluminum members and the first and second aluminum members are positioned between the steel bumper member and the space frame of the vehicle.

The first and second aluminum members may be mounting brackets having a mounting plate configured to mount the bumper member to the space frame. Also, the first and second aluminum members may be plates. Further, the first and second aluminum members may be crush cans configured to absorb a collision force and deform in predetermined manner.

Another aspect of the invention relates to a method of manufacturing a bumper assembly for a vehicle. The method includes forming a longitudinally extending steel bumper member constructed for protecting the vehicle from impact, forming first and second aluminum members, attaching the first and second aluminum members to the steel bumper member such that the steel bumper member extends between the first and second aluminum members, and the first and second aluminum members being positioned between the steel bumper member and the space frame of said vehicle.

The forming of the bumper member may include forming the bumper member by one of roll-forming, stamping, and hot stamping. Also, the forming of the first and second aluminum members may include forming the first and second aluminum members by extrusion. Further, the forming of the first and second aluminum members may include forming the first and second aluminum member with an aluminum portion and a steel portion. Additionally, the method may further comprise attaching a nonmetallic impact-absorption device to the steel member.

Another aspect of the invention relates to a bumper assembly for a vehicle. The bumper assembly includes longitudinally extending tubular members constructed to protect the vehicle from impact, and first and second mounting members attached to the tubular members to mount the tubular members to the space frame of the vehicle. The tubular members extend between the first and second mounting members and the first and second mounting members are positioned between the tubular members and the space frame of the vehicle.

The tubular members may include two substantially parallel tubular members. The mounting members may be aluminum and each of the mounting members fully encapsulates an end of each of the two tubular members. The bumper assembly may further comprise a middle member attached to and extending between the tubular members. The middle member may extend substantially along the entire length of the tubular members. The bumper assembly may further comprise a nonmetallic impact-absorption device attached to the tubular members. Also, each of the tubular members may be hollow.

Another aspect of the invention relates to a method of manufacturing a bumper assembly for a vehicle. The method includes forming a longitudinally extending bumper member constructed to protect the vehicle from impact, casting a first mounting member on a first end of the steel bumper member, and casting a second mounting member on a second end of the steel bumper member.

The forming a longitudinally extending bumper member may include forming a steel bumper member. The casting of the first and second mounting members may include casting aluminum mounting members. The method may further comprise attaching the first and second mounting members to the space frame of the vehicle. The method may further comprise attaching a nonmetallic impact-absorption device to the bumper member. The forming of the bumper member may include forming the bumper member by hydroforming. Also, the forming the bumper member may include forming the bumper member by roll-forming.

Another aspect of the invention relates to a method of manufacturing a bumper assembly for a vehicle. The method includes forming a first longitudinally extending tubular bumper member constructed to protect the vehicle from impact, casting a first mounting member on a first end of the first tubular bumper member, and casting a second mounting member on a second end of the first tubular bumper member.

The method may further comprise forming a second longitudinally extending tubular bumper member constructed to protect the vehicle from impact, and wherein the casting of the first and second mounting members may include casting the first mounting member on a first end of the second tubular bumper member and casting the second mounting member on a second end of the second tubular bumper member. The forming a longitudinally extending tubular bumper member may include forming a steel tubular bumper member. The casting of the first and second mounting members may include casting aluminum mounting members. The method may further comprise attaching the first and second mounting members to the space frame of the vehicle. The method may further comprise attaching a nonmetallic impact-absorption device to the bumper member. The forming the first tubular bumper member may include forming the tubular bumper member by hydroforming. The forming of the first tubular bumper member may include forming the tubular bumper member by roll-forming. Also, the forming of the first tubular bumper member may include forming a hollow tubular bumper member.

Another aspect of the invention relates to a method of forming composite metal castings, in which a first end of a structural member is positioned in a first mold cavity and a second end of the structural member is positioned in a second mold cavity. The first and second mold cavities are fluidly coupled to a reservoir of molten metal. A main pressure is applied to the molten metal in the reservoir to force the molten metal into the first mold cavity and the second mold cavity. A first auxiliary pressure is applied to the molten metal in the first mold cavity and a second auxiliary pressure is applied to the molten metal in the second mold cavity to densify the casting formed in the first mold cavity and in the second mold cavity.

Another aspect of the invention relates to a method of forming metal castings, comprising: positioning a first end of a structural member in a first mold cavity, the first mold being fluidly coupled to a reservoir of molten metal; applying a main pressure to the molten metal in the reservoir at an initial, mold-filling pressure to force the molten metal into the first mold cavity; applying a first auxiliary pressure to the molten metal in the first mold cavity; and maintaining the main pressure at or less than the initial, mold-filling pressure after the first mold cavity has been filled.

Another aspect of the invention is a method of forming metal castings, comprising: positioning a first end of a structural member in a first mold cavity, the first mold cavity being fluidly coupled to a reservoir of molten metal; applying a main pressure to the molten metal in the reservoir to force the molten metal into the first mold cavity; detecting whether the first mold cavity is sufficiently filled with molten metal by monitoring a moveable element; and applying a first auxiliary pressure to the first mold cavity after detecting that the first mold cavity is sufficiently filled.

Another aspect of the invention relates to a twist axle assembly for a motor vehicle. The twist axle assembly includes a hybrid component including a steel member formed of a high strength steel and curved in a longitudinal direction and cast coupling members cast on the steel member. Each of the coupling members are cast on a portion of the steel member by casting-in-place aluminum about the portion of the steel member, thereby positively and rigidly securing the coupling member to the steel member.

The steel member may have a yield strength of at least about 1300 MPa, and each of the cast couplings may have a yield strength of at least about 180 MPa. The steel member may be a tubular member.

Another aspect of the invention relates to a hybrid component for an automobile, comprising: a steel member; and a cast coupling member cast on a portion of said steel member by casting-in-place a casting material about said portion of said steel member, thereby positively and rigidly securing said coupling member to said steel member.

Another aspect of the invention relates to a composite casting, comprising: a steel member; an end cap fixedly secured to an end portion of the steel member and having an outwardly projecting flange, the flange having one of a circular and a non-circular configuration; and a cast coupling member cast about the end portion of the steel member including the end cap, thereby positively and rigidly locking and securing said cast coupling member to said steel member.

Another aspect of the invention relates to a hybrid torsion beam axle assembly, comprising: a steel torsion beam; an end cap fixedly secured to an end portion of the steel torsion beam; and a cast trailing arm cast about the end portion of the steel torsion beam including the end cap, thereby positively and rigidly securing the cast trailing arm to the steel torsion beam.

Another aspect of the invention relates to a method of forming a hybrid component, comprising: forming a steel member into a predetermined configuration; providing an anchor structure on a portion of the steel member; and casting a coupling member about the anchor structure by casting-in-place a casting material about the anchor structure, thereby positively and rigidly securing the coupling member to the steel member.

BRIEF DESCRIPTION OF THE DRAWINGS

Exemplary embodiments of the invention will now be described in conjunction with the following drawings, wherein similar reference numerals denote similar elements throughout the several views, in which:

FIG. 14 is a side view of a hybrid component according to another embodiment of the invention;

FIG. 15 is a cross-sectional view through line 15-15 of FIG. 14;

FIG. 16 is a cross-sectional view through line 16-16 of FIG. 14;

FIG. 17 is a cross-sectional view through line 17-17 of FIG. 14;

FIG. 18 is a cross-sectional view through line 18-18 of FIG. 14;

FIG. 19 is a cross-sectional view through line 19-19 of FIG. 14;

FIG. 20 is a side view of a hybrid component according to another embodiment of the invention;

FIG. 21 is a cross-sectional view through line 21-21 of FIG. 20;

FIG. 22 is a cross-sectional view through line 22-22 of FIG. 20;

FIG. 23 is a cross-sectional view through line 23-23 of FIG. 20;

FIG. 24 is a cross-sectional view through line 24-24 of FIG. 20;

DETAILED DESCRIPTION OF ILLUSTRATED EMBODIMENTS

The subject application discloses a method employing a casting process to fabricate structural components, e.g., automotive structural components, comprised of a preformed steel insert and cast aluminum. The method involves placing a preformed steel member, e.g., a tube, into a conventional steel casting die, casting aluminum around specific sections of the steel member, and creating a component comprised of dissimilar materials (e.g., steel and aluminum). Examples of suitable aluminum casting processes include high pressure aluminum die casting, low pressure permanent mold, lost foam casting, squeeze cast, vacuum die cast, semi-solid casting, or the like. The hybrid material (aluminum/steel) structural component may be subsequently heat treated (artificially aged at an elevated temperature of approximately 400° F.) to a T5 heat treatment specification to improve the mechanical properties of the cast aluminum. Subsequent to the heat treatment process, the component may be machined and assembled using conventional processing and methods. (It should be understood that the reference to "steel" and "aluminum" are intended to encompass materials that include steel and aluminum, respectively, and to include various alloys of steel and aluminum being made of various chemical elements).

When the aluminum castings are manufactured using the semi-solid casting process, a solution heat treatment cycle is not required to achieve an acceptable yield strength, typically greater than 180 MPa. Semi-solid castings have yield strength greater than 180 MPa with merely an artificial aging (T5) heat treatment cycle, which involves exposing the aluminum casting to a temperature of approximately 400° F. (220° C.). Thus, the components of the subject application as described in the illustrated embodiments discussed below have the ability to be fabricated from a cast aluminum/steel hybrid component having a yield strength of a cast aluminum greater than about 180 MPa and a steel yield strength greater than about 1,300 MPa. This can be accomplished if the cast aluminum/steel hybrid component is not exposed to the aluminum solution heat treatment temperature (typically 1000° F.). As noted above, the semi-solid aluminum casting process provides the ability to obtain a minimum yield strength of 180 MPa by subjecting the hybrid component to a T5 artificial age heat treatment (typically 400° F.), thus avoiding degradation of the steel material properties which results from "overtempering" during the aluminum solution heat treatment processing. Thus, the subject application discloses apparatus and methods that provide components that are relatively strong yet relatively lightweight.

Figure 1:
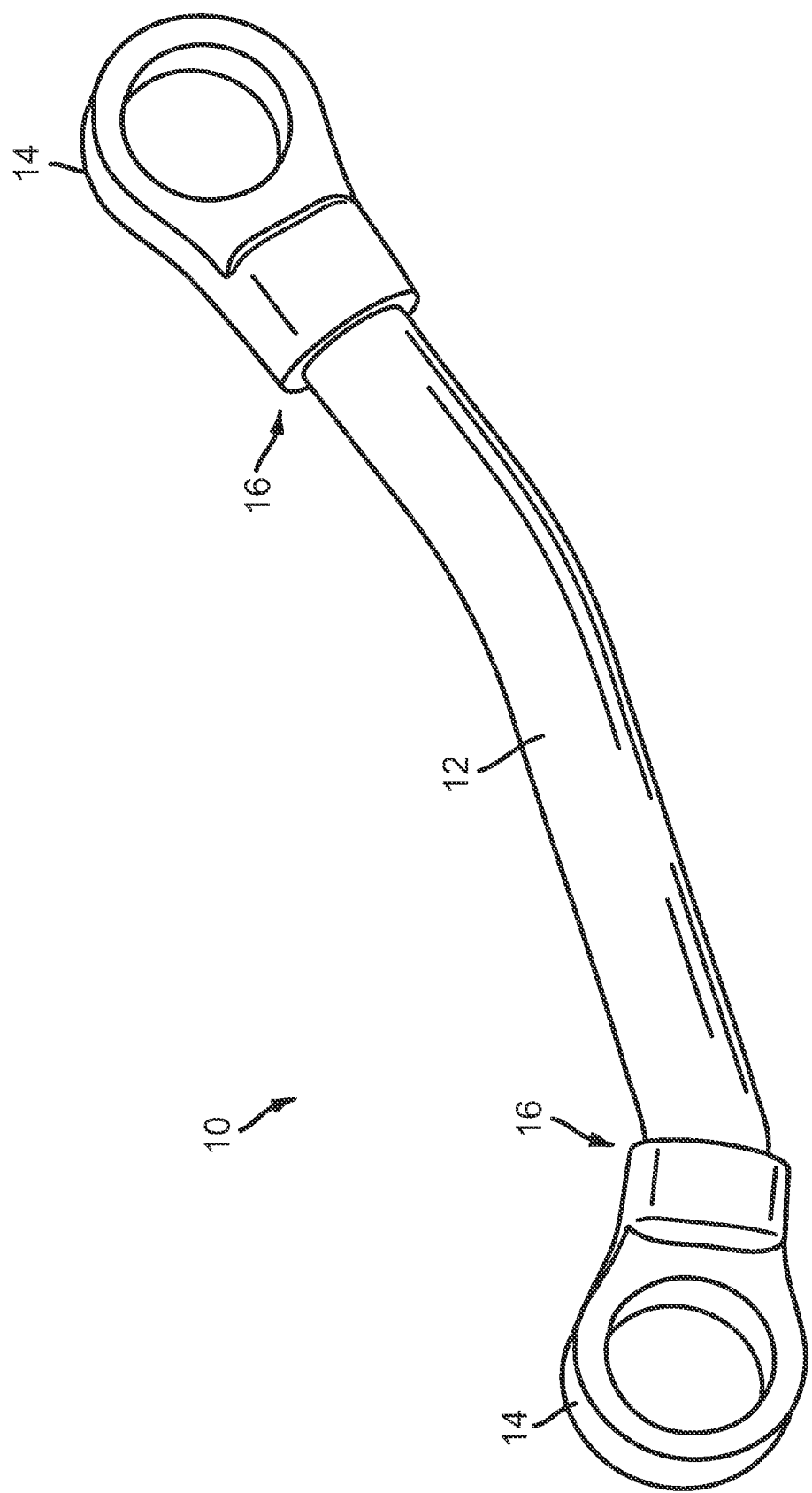
FIG. 1 is a perspective view of a hybrid component according to an embodiment of the invention.

Referring now to FIG. 1, a hybrid component 10 is shown according to an embodiment of the invention. In the illustrated embodiment, the hybrid component 10 can be used as a suspension arm 10 in a vehicle. The hybrid component 10 comprises a tubular member 12 made of a metal material, such as steel, aluminum, or the like. The tubular member 12 may be heat treated. The tubular member 12 can be formed to any desired shaped by using any conventional process. For example, the tubular member 12 can be formed using a hydroforming process, or the like, thereby forming a hydrocast hybrid component. The hybrid component 10 also includes a pair of substantially identical attachment or coupling members 14 made of aluminum die casting and connected to longitudinal opposite end portions 16 of the tubular member 12. As used herein, the term "aluminum" denotes aluminum and its alloys. A bushing 18 may be forcibly fitted into and secured by each coupling member 14, and a sleeve 20 may be fitted within the bushing 18, as shown in FIG. 2.

Figure 2:
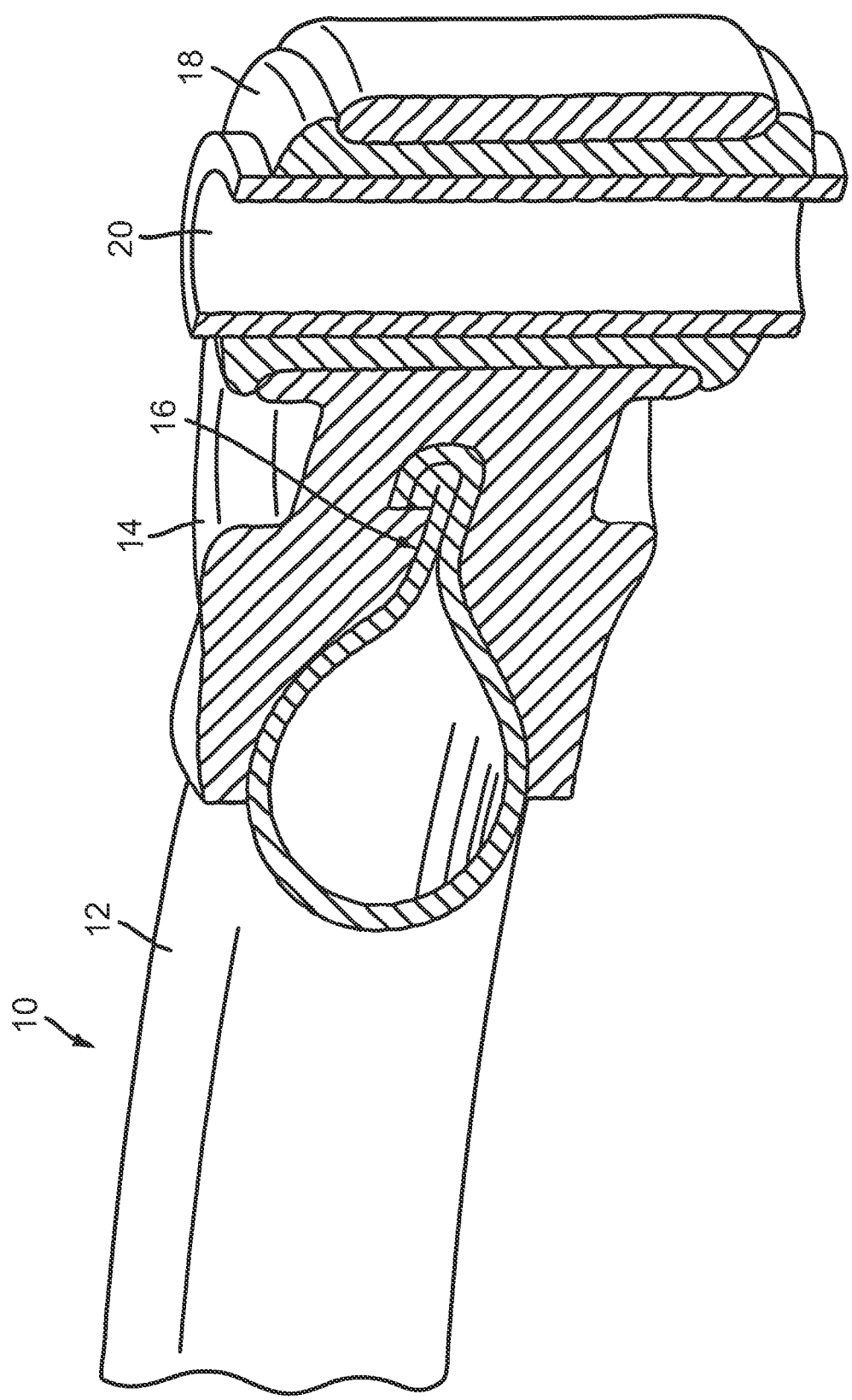
FIG. 2 is a partial cutaway view of a hybrid component according to an embodiment of the invention in which an end portion is crushed and folded over on itself to form a J-hook attachment feature.
Figure 3:
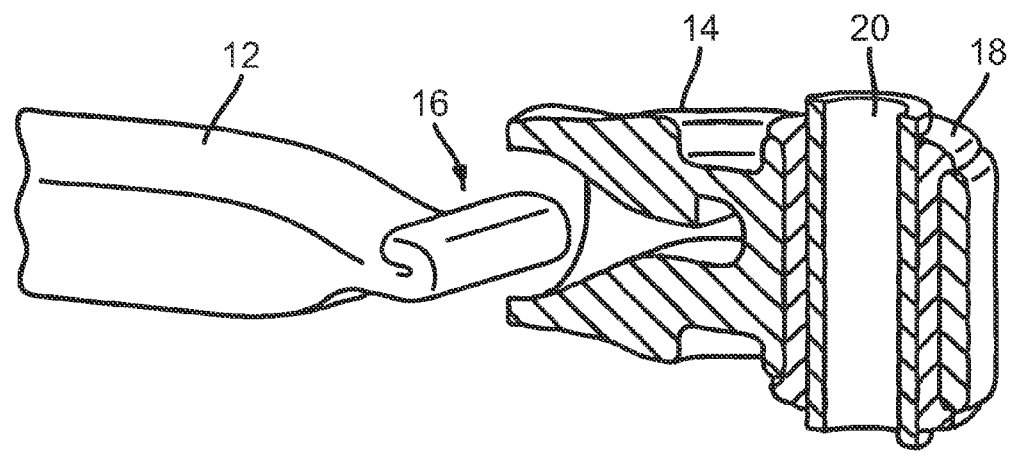
FIG. 3 is an exploded view of the hybrid component of FIG. 2.

Referring now to FIGS. 2 and 3, one aspect of the invention is the method in which the coupling member 14 is secured to the tubular member 12. Specifically, the invention contemplates a method of securing the coupling member 14 to the tubular member 12 using a cast-in-place technique, rather than using a conventional welding technique. The cast technology used to form the coupling member 14 can be, for example, high pressure aluminum die casting, low pressure permanent mold, lost foam casting, squeeze cast, vacuum die cast, semi-solid casting, or the like. As shown in FIGS. 2 and 3, one or both end portions 16 of the tubular member 12 is deformed by crushing or pinching such that the end portion 16 of the tubular member 12 is sealed to prevent the ingress or influx of the molten casting material into the tubular member 12 during the cast-in-place technique, and to eliminate any gaps between the tubular member 12 and each end portion 16. Also, the crush forming operation also distorts the shape of tubular member 12 and, thus, increases the torsional strength of the hybrid assembly. In addition, the end portion 16 is folded upon itself to form a J-hook attachment feature that provides a mechanical lock or joint between the coupling member 14 and the tubular member 12. In this manner, the coupling member 14 is positively secured to the tubular member 12. Also, the J-hook increases the tensile strength of the hybrid assembly. In addition, to increase the strength of the joint between the deformed tubular member 12 and the coupling member 14, single or multiple openings may be created in the deformed tubular member 12 using conventional drill, pierce or cutting processes which are filled with cast material during the cast-in place technique.

It should be understood that the form of the crushed ends of tubular member 12 illustrated in the figures provides examples of crushed forms, but that the form and shape of the crushed ends can be tailored based upon the functional use of the part, such as the arm 10 and its function requirements.

Figure 4:
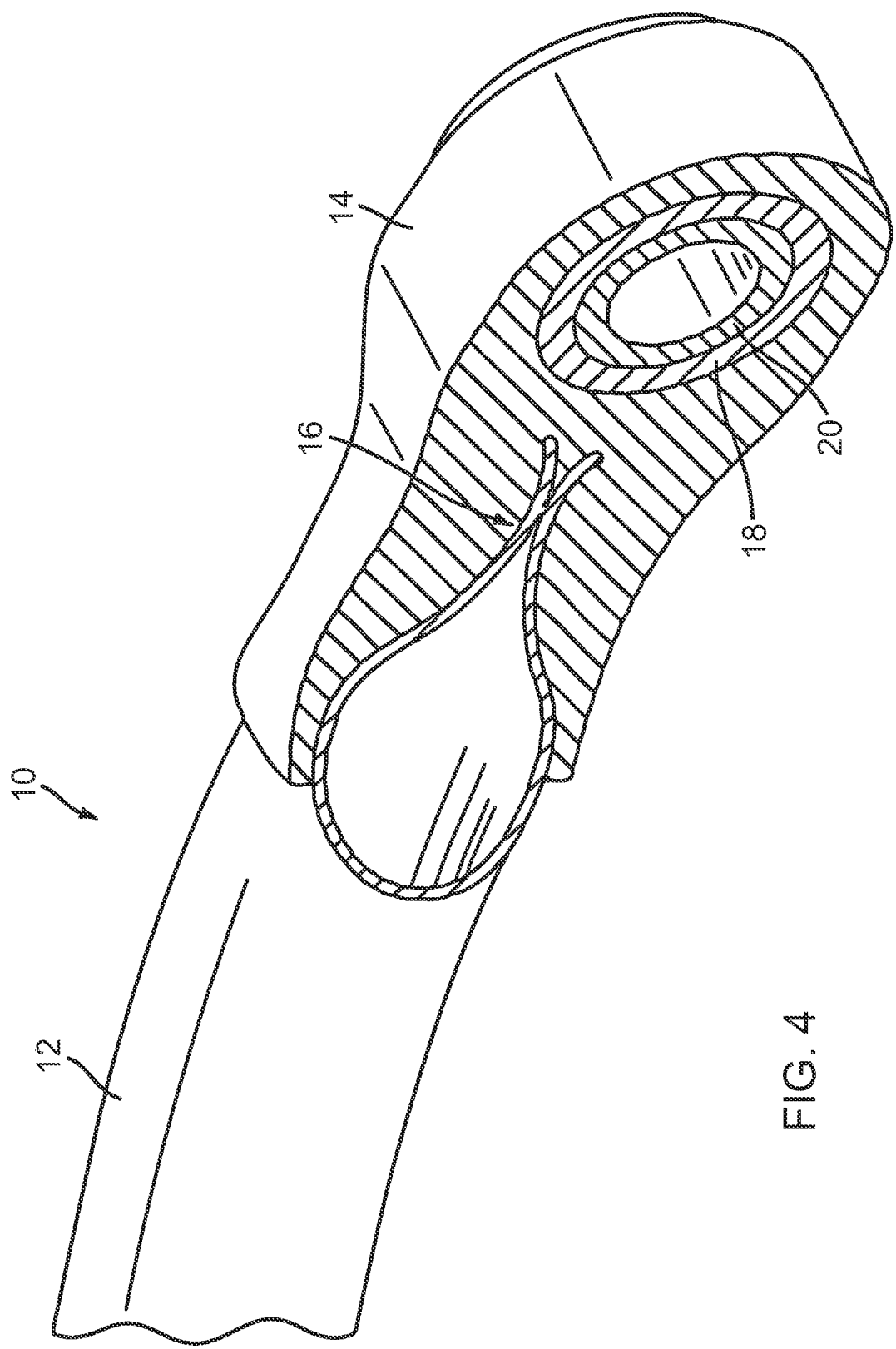
FIG. 4 is a partial cutaway view of a hybrid component according to an embodiment of the invention in which an end portion is crushed to form a Y-hook attachment member.

Referring now to FIG. 4, another embodiment of the invention is shown in which the cast-in-place coupling member 14 is secured to the tubular member 12. Specifically, the tubular member 12 is deformed by crushing the end portion 16 of the tubular member 12 to completely seal and prevent the ingress or influx of the molten casting material into the tubular member 12 during the cast-in-place technique. In addition, the end portion 16 forms a Y-hook attachment feature that provides a mechanical lock or joint between the coupling member 14 and the tubular member 12. In this manner, the coupling member 14 is positively secured to the tubular member 12 and attachment between the end portion and the tubular member can be accomplished without crevices or openings between the two elements that could cause galvanic corrosion.

Figure 5:
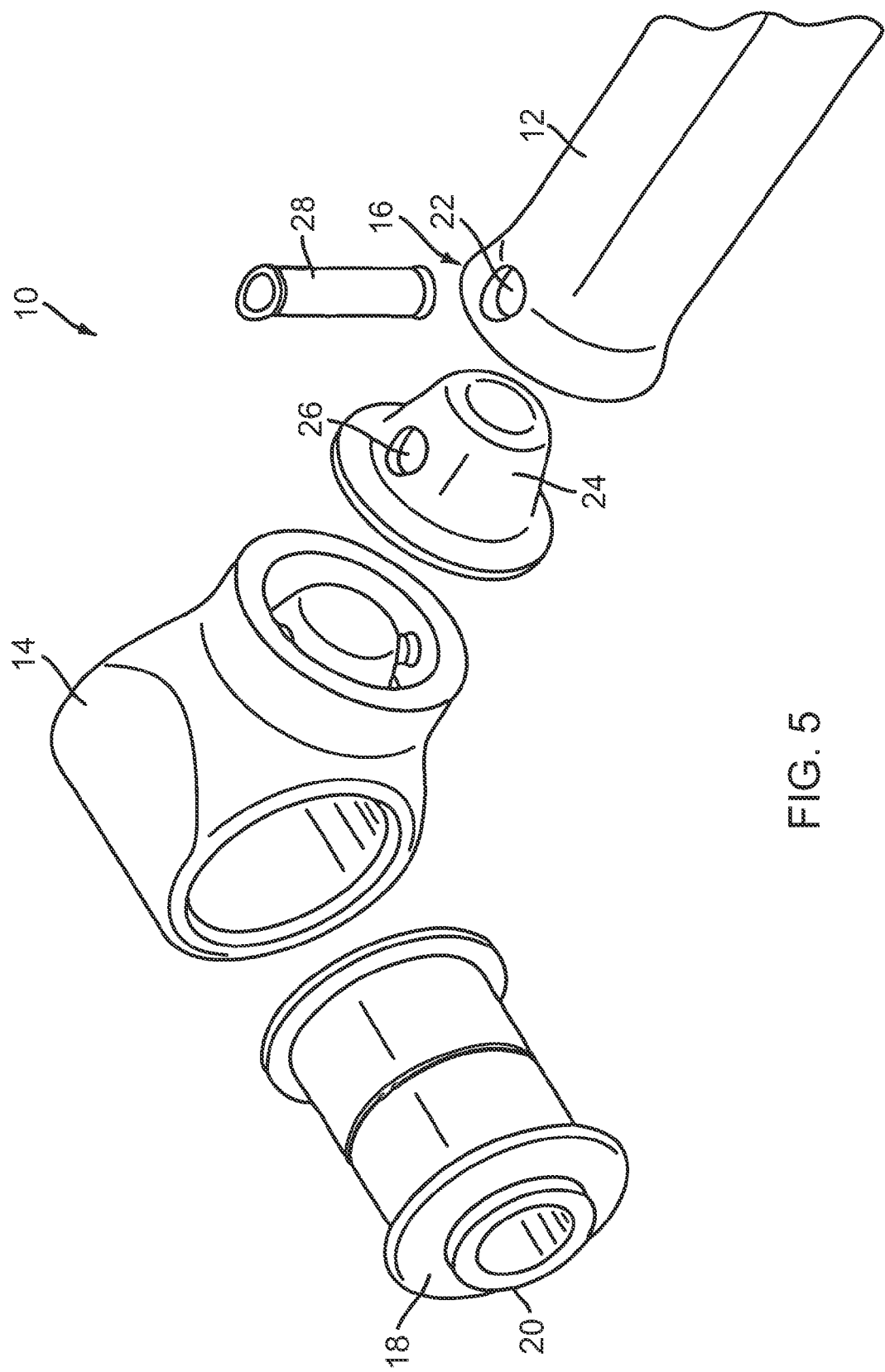
FIG. 5 is an exploded view of a hybrid component according to another embodiment of the invention.
Figure 6:
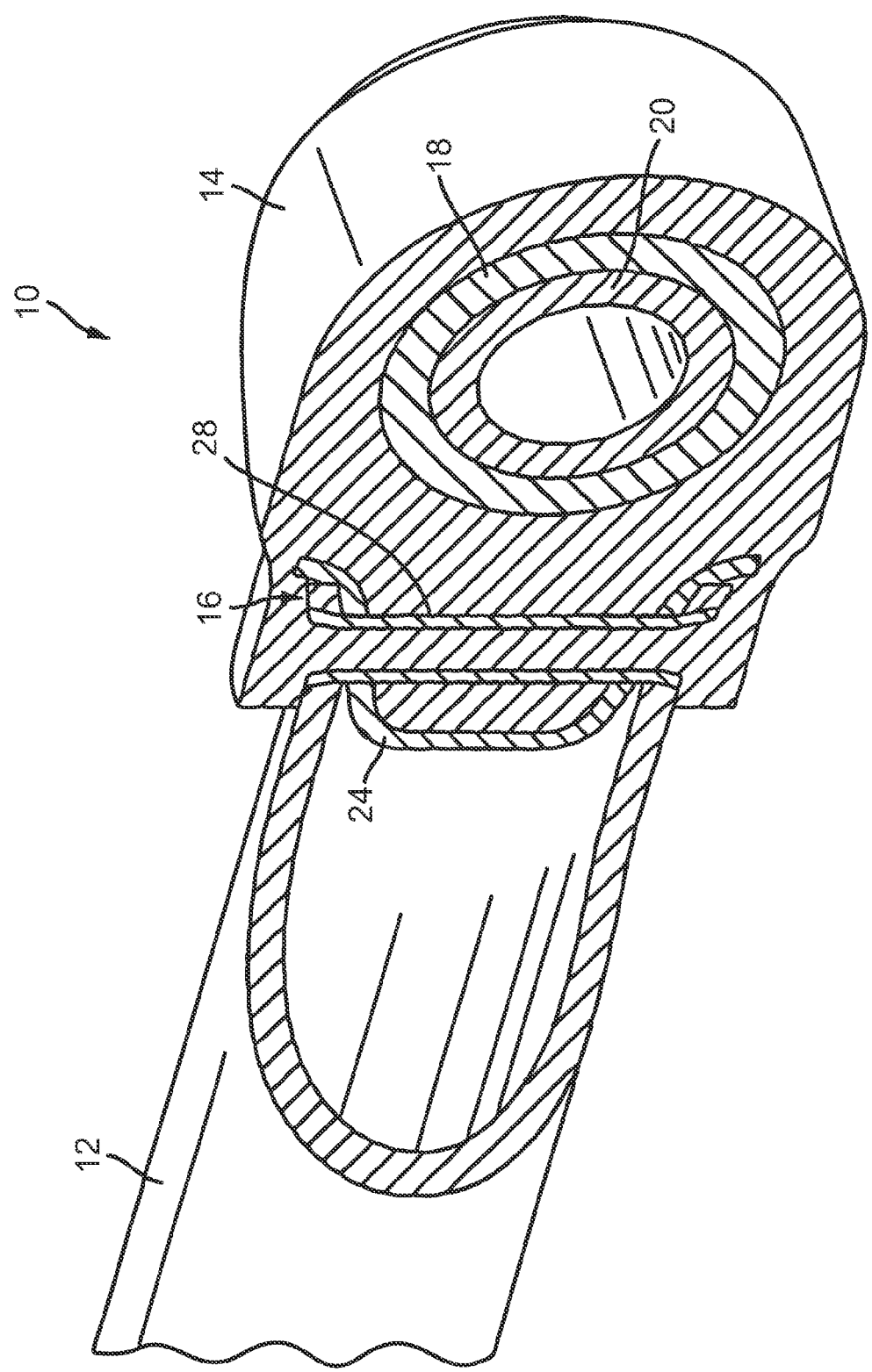
FIG. 6 is a partial cutaway view of the hybrid component of FIG. 5 in which a pin is inserted into holes in the tubular member and the cap member.
Figure 7:
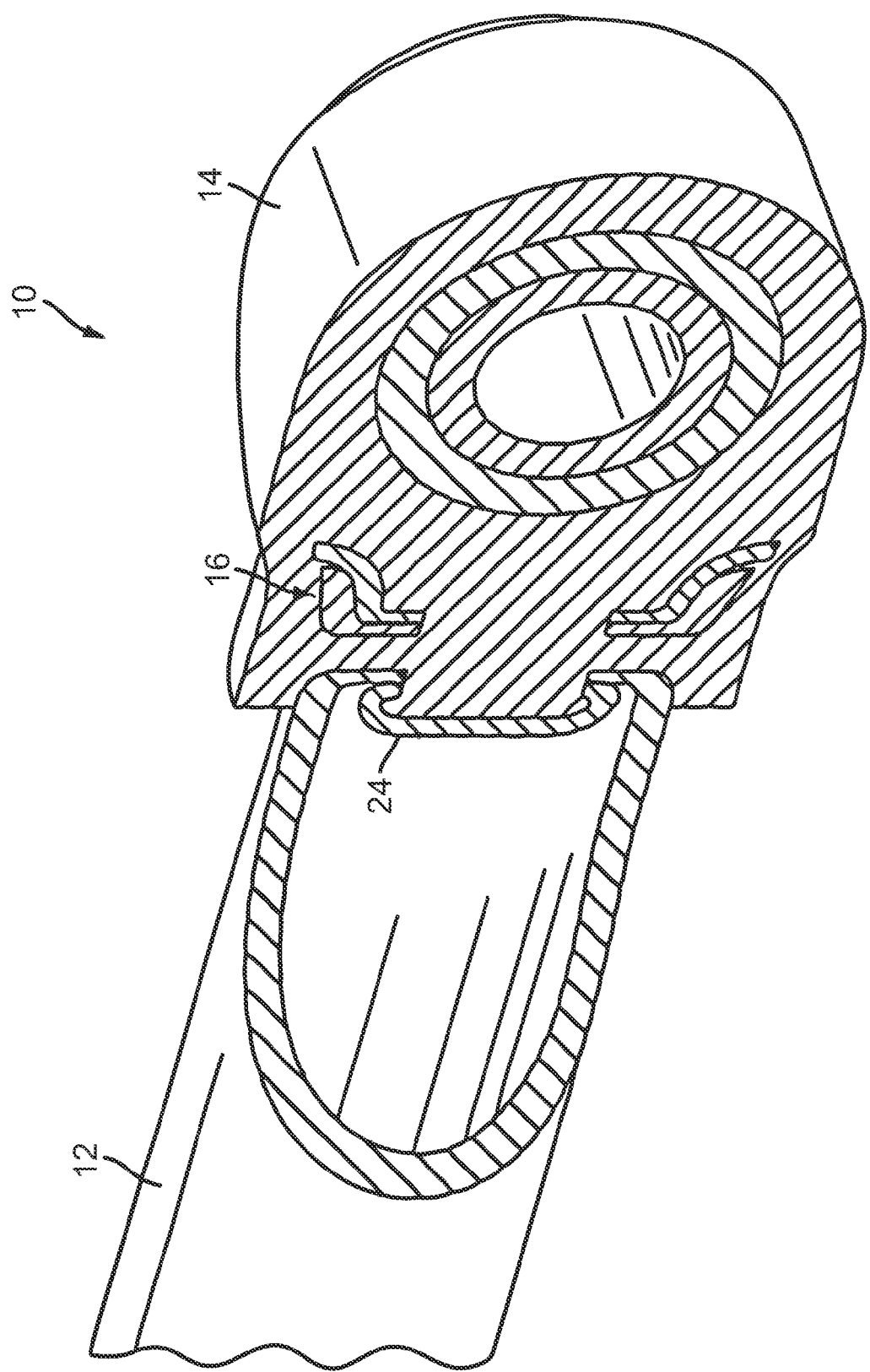
FIG. 7 is a partial cutaway view of the hybrid component of FIG. 5 in which the pin and holes in the tubular member and the cap member are omitted.

Referring now to FIGS. 5-7, another embodiment of the invention is shown in which the cast-in-place coupling member 14 is secured to the tubular member 12. As best shown in FIG. 5, the end portion 16 of the tubular member 12 is pierced to form a hole 22. In addition, the end portion 16 is slightly flared outwardly for receiving a cup-shaped cap member or plug 24 having a hole 26. The hole 22 of the tubular member 12 substantially aligns with the hole 22 in the plug 24 when the plug 24 is inserted into the end portion 16 of the tubular member 12. The plug 24 can be held in place by a friction force (interference fit), by a piercing or drilling operation, or mechanically via a hollow sleeve or pin. In the illustrated embodiment, at least a hollow pin is employed. Once the holes 22, 26 are aligned with each other, a pin 28 can be inserted through both holes 22, 26 to hold the plug 24 in place. As best shown in FIG. 6, the molten aluminum is allowed to flow into the plug 24 and the pin 28 to positively secure the coupling member 14 to the tubular member 12. It will be appreciated that the holes 22, 26 and the pin 28 are optional and may be omitted, as shown in FIG. 7. The plug 24 has a melting point greater than that of the molten cast metal and sufficient strength to avoid mechanical failure associated with the pressure casting process. Also, the plug may extend into the end portion 16 as described above, or the plug may be structured such that it extends around the outside diameter of the end portion 16.

Referring now to FIGS. 9-13, another embodiment of the invention is shown in which the cast-in-place coupling member 14 is secured to the tubular member 12. In this embodiment, the open end portion 16 of the tubular member 12 is closed and sealed by a rotary swedging process, and then molten material is cast about the deformed end to form the coupling member 14. The rotary swedging process, hammers the periphery of the tubular member 12 to deform and close the end of the tubular member 12 without the use of a cap member. Further, the rotary swedging process forms a non-uniform shape or undercut 32 in the tubular member 12. The non-uniform shape 32 provides a mechanical lock or joint between the coupling member 14 and the tubular member 12 to prevent the coupling member 14 from slipping off the tubular member 12. Also, the non-uniform shape 32 increases tensile strength of the joint.

Figure 10:
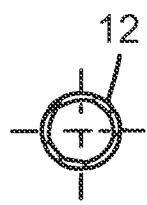
FIG. 10 is a cross-sectional view through line 10-10 of FIG. 9.
Figure 11:
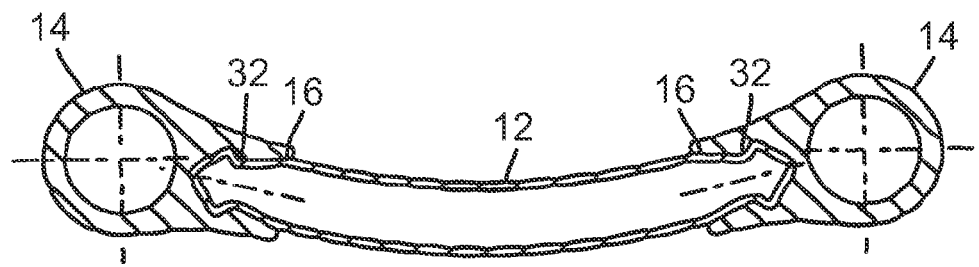
FIG. 11 is a cross-sectional view through line 11-11 of FIG. 9.
Figure 12:
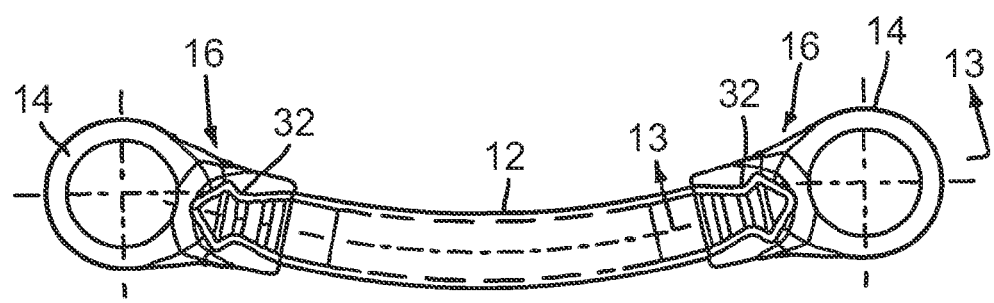
FIG. 12 is a top view of the hybrid component shown in FIG. 9.
Figure 13:
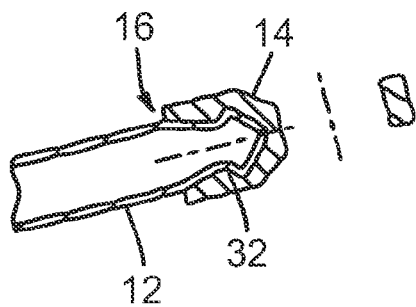
FIG. 13 is a cross-sectional view through line 13-13 of FIG. 12.

In the illustrated embodiment, the rotary swedging process also forms a non-circular shape, e.g., hexagon, octagon, etc, on the tubular member 12 including the end portions 16 as shown in FIG. 10. This provides a radial lock between the coupling member 14 and the tubular member 12 and increases the torsional strength of the joint.

Also, the rotary swedging process may be used around a loose piece plug to secure the plug to the open end of the tubular member. This results in closure of the open end portion of the tubular member at a low cost and weight. Further, this arrangement provides an opportunity to close large diameter tubular sections.

In addition, to increase the strength of the joint between the deformed or capped tubular member and the coupling member, single or multiple openings may be created in the tubular member using conventional drill, pierce or cutting processes which are filled with cast material during the cast-in place technique.

In addition, to increase the strength of the joint between the deformed or capped tubular member and the coupling member, a nickel-based alloy may be applied to the surface of the tubular member using conventional coating processes such as laser deposition (DMD), Plasma Transfered Arc (PTA), oxygen-fuel thermal spray processes. In some cases, the coated tubular member may be heat treated after the nickel-alloy coating is applied to the end of the tubular member. The nickel-based coating also increases the corrosion resistance.

Also, it should be understood that a coupling member may be cast onto the end portion of a tubular member as discussed above or a coupling member may be cast anywhere along the length or major axis of a tubular member, e.g., in the middle of the tubular member. Thus, the casting is not limited to the ends of the tubular member.

For example, FIGS. 14-19 illustrate an embodiment of a tubular member 40 wherein the end portions 42, 44 are closed by a rotary swedging process. Moreover, an intermediate portion 46 is formed with a non-circular shape, e.g., hexagon, by the rotary swedging process (see FIG. 17). Thus, the tubular member 40 includes a non-circular shape in multiple areas, not just the end portions. As illustrated, the non-circular shapes are formed in localized areas and include reduced cross-sectional areas. This arrangement provides flexibility to add joints in areas other than the end portions. That is, a coupling member may be cast over the non-circular intermediate portion 46 of the member. Also, the non-circular shape provides a mechanical lock to increase tensile and compressive strength of the joint, and the non-circular shape increases the torsional strength of the joint.

FIGS. 20-24 illustrate another embodiment of a tubular member 50 having end portions 52, 54 and an intermediate portion 56 deformed by a swedging process. As illustrated, the end portions 52, 54 are closed by the swedging process, and the intermediate portion 56 is deformed by the swedging process to include a non-circular shape, e.g., hexagonal (see FIG. 22).

In another embodiment, the hybrid component may include a hollow tubular member having two or more components formed by a conventional process, e.g., stamping, roll forming, etc. The two or more components may be joined using conventional welding processes. The tubular member may also include an extended section, e.g., flange, on one or both ends of the tubular member to close the end(s) of the tubular member. The extended section may be welded to close the end(s) of the tubular member. The size of the extended section used to close the end(s) of the tubular member may be larger than the closure area in one or both dimensions to create an undercut feature, increasing the "pull-off" strength of the hybrid cast component. Optionally, the joint area of the tubular member may include depressions formed during the stamping/forming process to provide an undercut feature to increase the tensile strength ("pull-off" force) of the hybrid component.

Also, the tubular member may include hollow tubular/hydroformed shapes as discussed above, or may include solid geometric shapes. For example, coupling members may be cast on the end portions and/or intermediate portions of a solid geometric shaped member. An example is an I-beam shape with cast nodes on the end(s) or along the major axis of the I-beam shape.

Figure 8:
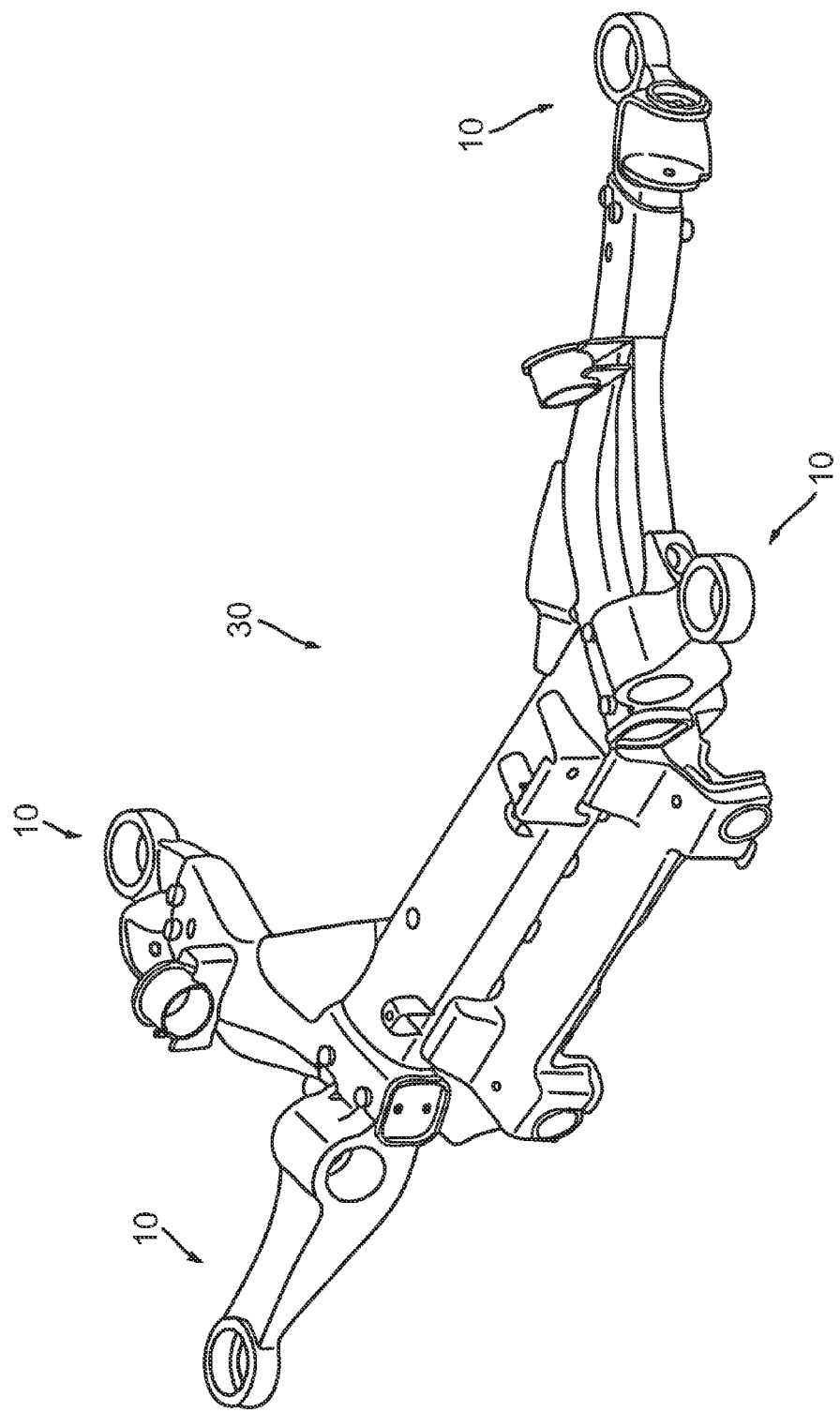
FIG. 8 is a perspective view of an engine mount incorporating hybrid components according the principles of the invention.
Figure 9:
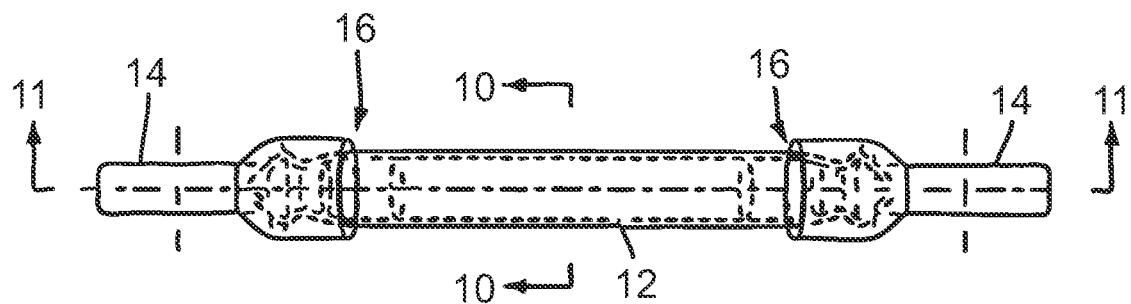
FIG. 9 is a side view of a hybrid component according to another embodiment of the invention.
Figure 64:
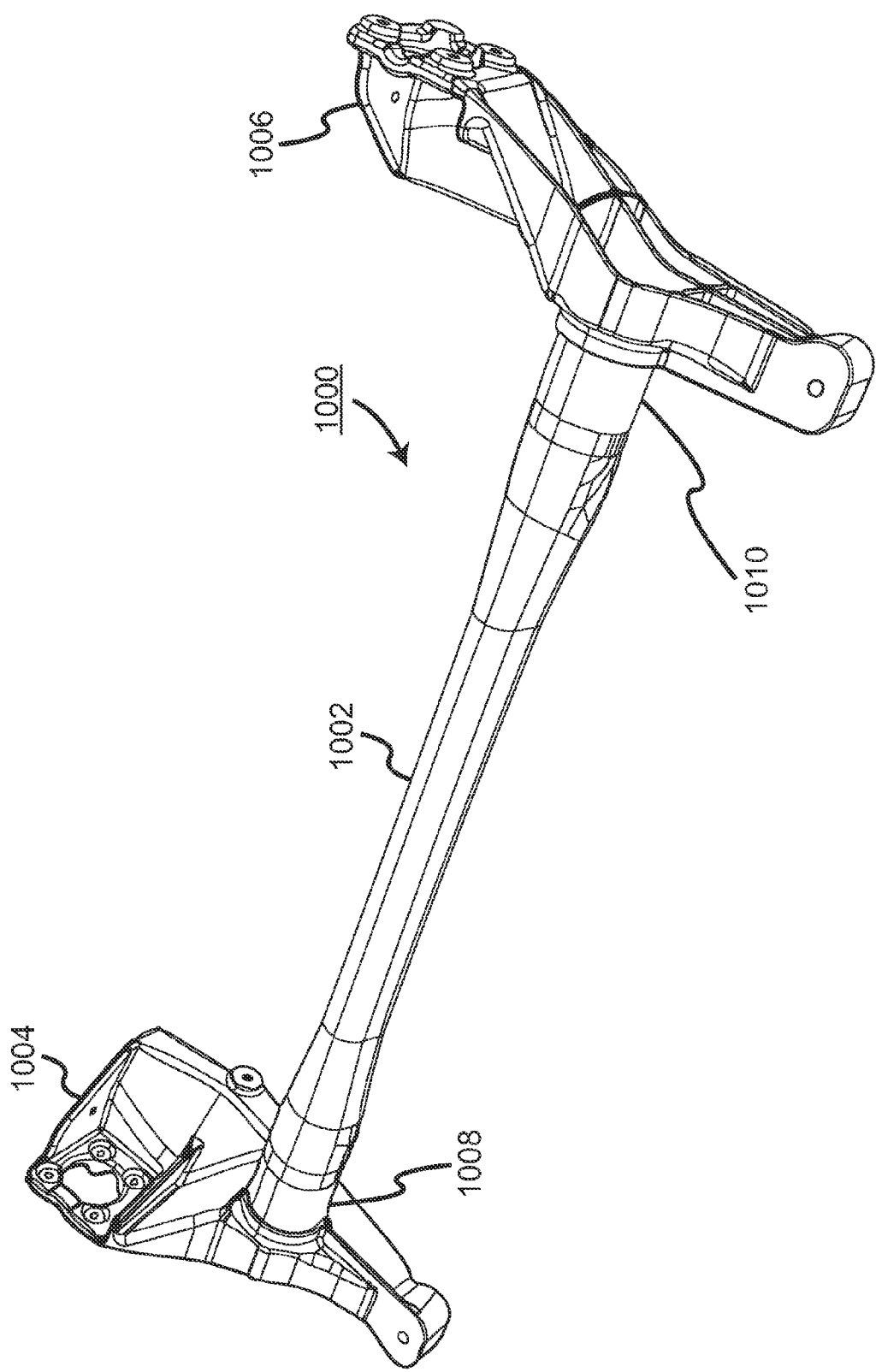
FIG. 64 shows a hybrid torsion beam axle assembly according to an embodiment of the instant invention.

The hybrid component 10 of the present invention is not limited to a suspension arm, as shown in the above-mentioned embodiments of the invention. For example, the hybrid component 10 of the present invention may also be used as an engine mount 30, as shown in FIG. 8. Further, the hybrid component may be used in chassis, body, and power train automotive components. Additionally, the hybrid component may be used as a twist axle assembly 1000, as shown in FIG. 64.

Figure 25:
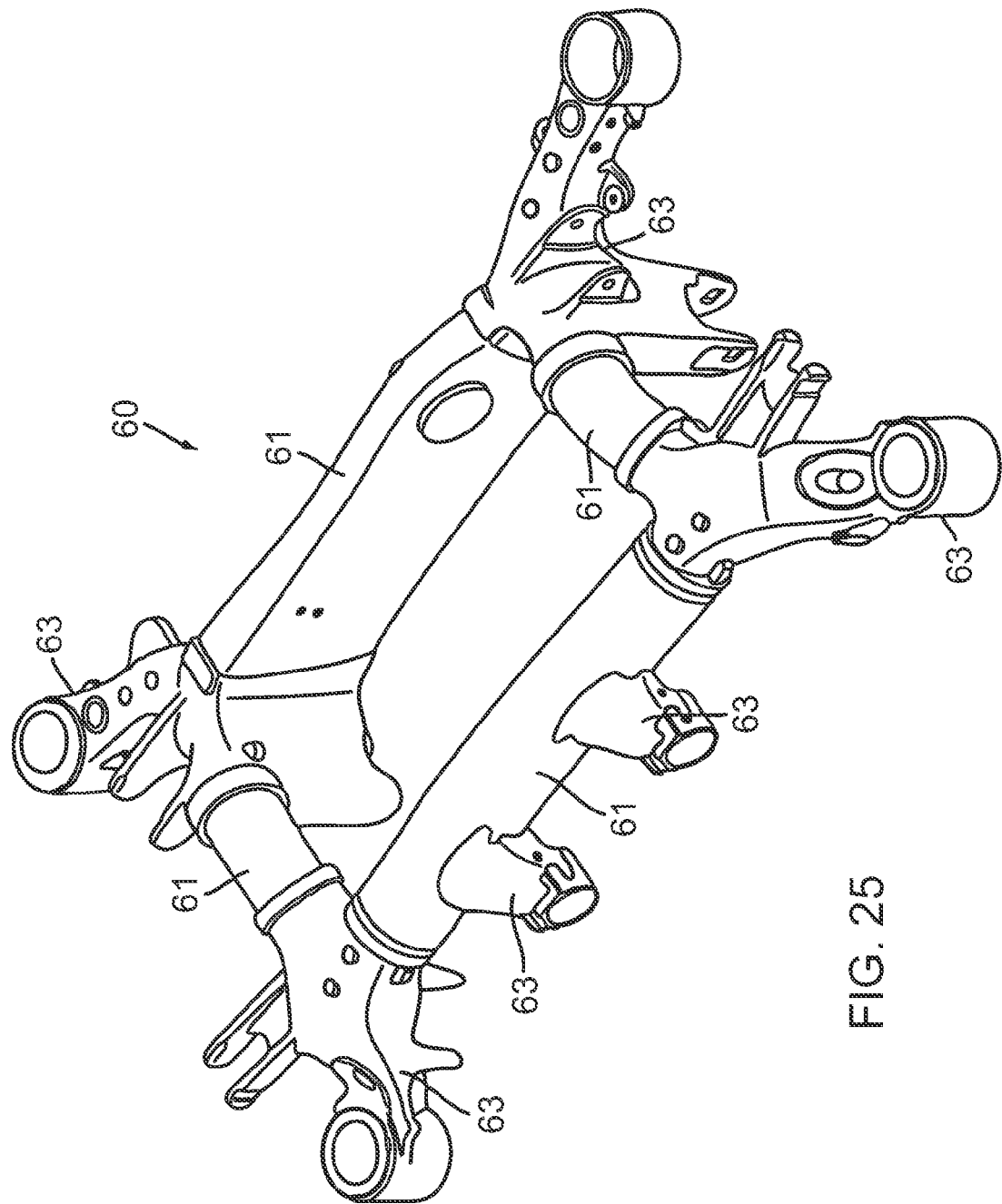
FIG. 25 is a perspective view of an automotive rear cradle incorporating hybrid components according an embodiment of the invention.
Figure 26:
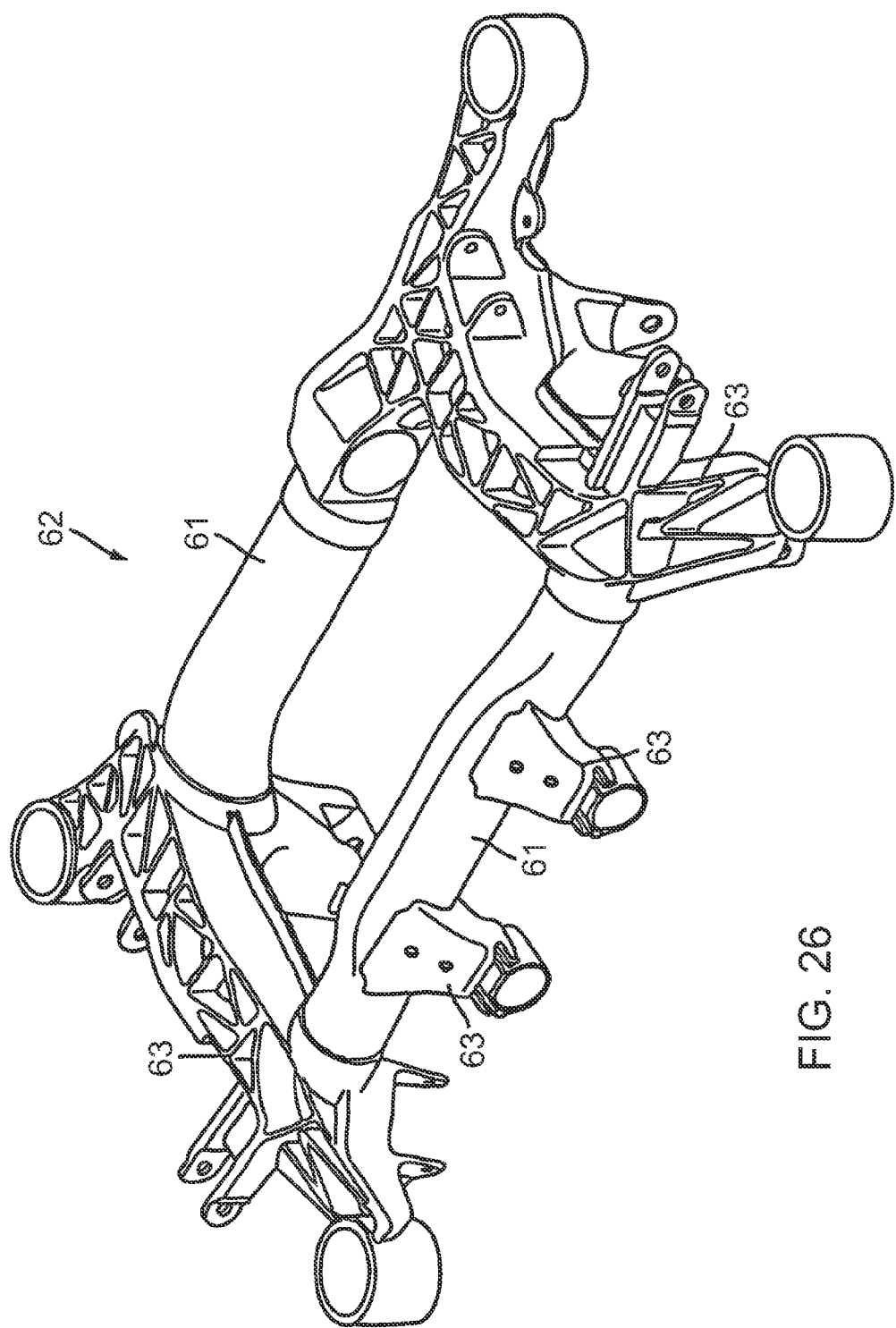
FIG. 26 is a perspective view of an automotive rear cradle incorporating hybrid components according an embodiment of the invention.

Also, FIGS. 25 and 26 illustrate embodiments of an automotive rear cradle 60, 62, respectively, incorporating hybrid components. As illustrated, the rear cradles 60, 62 are each formed with tubular members 61 and coupling members 63 cast onto the tubular members 61. The rear cradles 60, 62 incorporate hybrid components to provide a structure that results in reduced cost and weight, while maintaining high strength. For example, a cradle having a shape similar to cradles 60, 62 comprised of 100% steel has a mass of about 22 kg and a cost of about $80. A cradle having a shape similar to cradles 60, 62 comprised of 100% aluminum has a mass of about 15.2 kg and a cost of about $125. The cradles 60, 62 are comprised of about 47% aluminum and 53% steel, and have a mass of about 15.6 kg and a cost of about $100.

Figure 27:
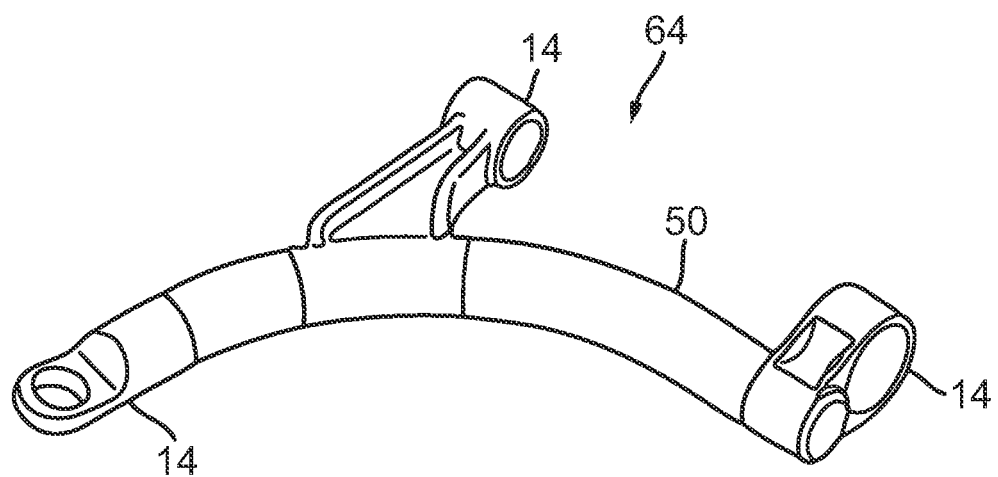
FIG. 27 is a perspective view of a hybrid control arm constructed according to an embodiment of the invention.
Figure 28:
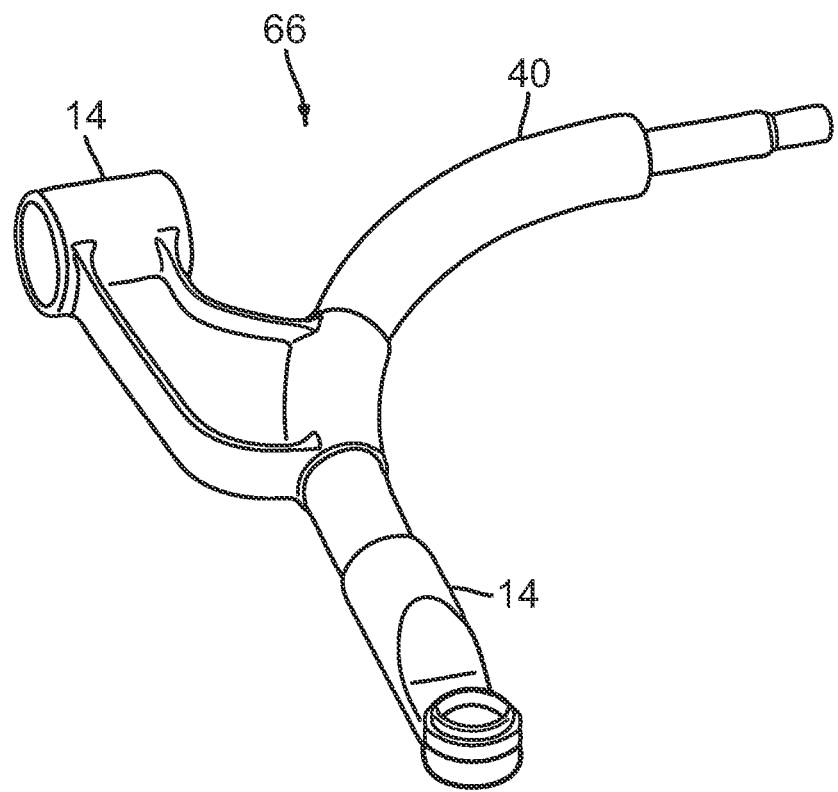
FIG. 28 is a perspective view of a hybrid control arm constructed according to an embodiment of the invention.
Figure 29:
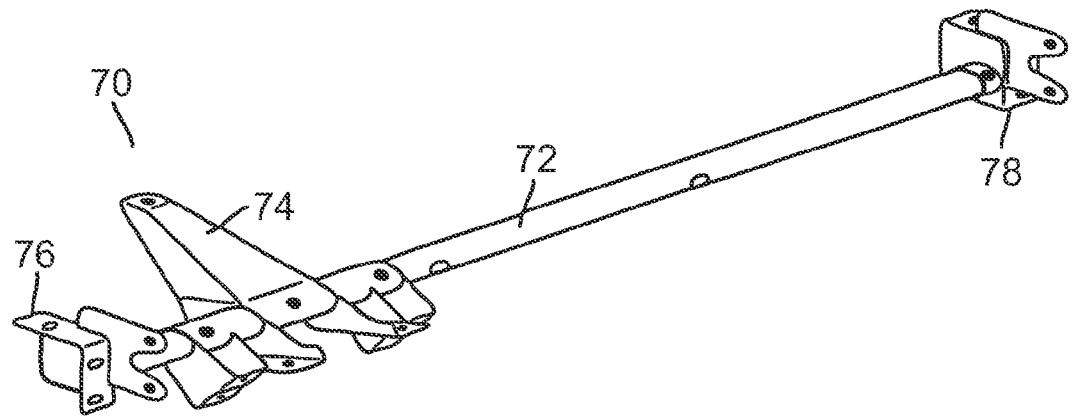
FIG. 29 is a perspective view of an instrument panel support system constructed according to an embodiment of the invention.

Additionally, FIGS. 27 and 28 illustrate embodiments of hybrid control arms 64, 66, respectively. As illustrated, the control arm 64 includes a tubular member similar to tubular member 50 discussed above (the tubular member 50 may have a curved configuration as illustrated in FIG. 27), and coupling members 14 cast onto the tubular member 50 at end portions and an intermediate portion thereof. As illustrated, the control arm 66 includes a tubular member similar to tubular member 40 discussed above (the tubular member 40 may have a curved configuration as illustrated in FIG. 28), and coupling members 14 cast onto the tubular member 50 at an end portion and an intermediate portion thereof.

The control arm 64 incorporates hybrid components to provide a structure that results in reduced cost and weight, while maintaining high strength. For example, a control arm having a shape similar to control arm 64 comprised of 100% iron has a mass of about 6.2 kg and a cost of about $11. A control arm having a shape similar to control arm 64 comprised of 100% aluminum has a mass of about 2.4 kg and a cost of about $13.50. The control arm 64 is comprised of about 35% aluminum and 65% steel, and has a mass of about 2.7 kg and a cost of about $11.80.

Similarly, the control arm 66 incorporates hybrid components to provide a structure that results in reduced cost and weight, while maintaining high strength. For example, a control arm having a shape similar to control arm 66 comprised of 100% steel has a mass of about 4.13 kg. A control arm having a shape similar to control arm 66 comprised of 45% aluminum and 55% steel and formed by aluminum casting and steel attachments has a mass of about 2.4 kg and a cost of about $12.50. The control arm 66 is comprised of about 33% aluminum and 67% steel, and has a mass of about 2.13 kg and a cost of about $11.50.

FIGS. 29-33 illustrate an instrument panel support system 70 that incorporates hybrid components. Specifically, the instrument panel support system 70 includes a tubular cross-beam 72, a main steering column/instrument cluster bracket 74, and left-hand and right-hand mounting brackets 76, 78. The mounting brackets 76, 78 are structured to mount the support system 70 within a vehicle, and the main steering column/instrument cluster bracket 74 is structured to mount a number of vehicle components, e.g., steering column, instrument panel, console mount, glove box mount, etc. The instrument panel support system 70 is structured such that the brackets 74, 76, 78 are molded, e.g., from aluminum alloy, directly onto the cross-beam 72.

Figure 30:
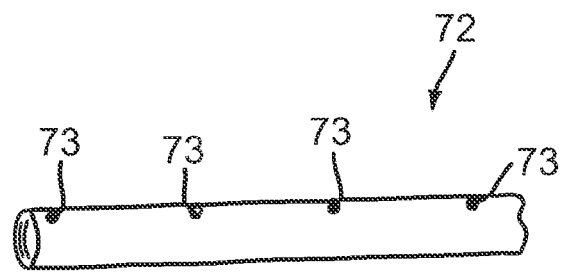
FIG. 30 is a perspective view of tubular cross-beam of the support system shown in FIG. 29.

As shown in FIG. 30, the cross-beam 72 is formed from a single diameter tube, e.g., steel tube, and anti-rotation devices, e.g., protrusions 73, for "as cast" brackets are incorporated onto the cross-beam 72. Also, the cross-beam 72 may include cap devices to prevent cast material, e.g., aluminum alloy, from entering the cross-beam 72.

Figure 31:
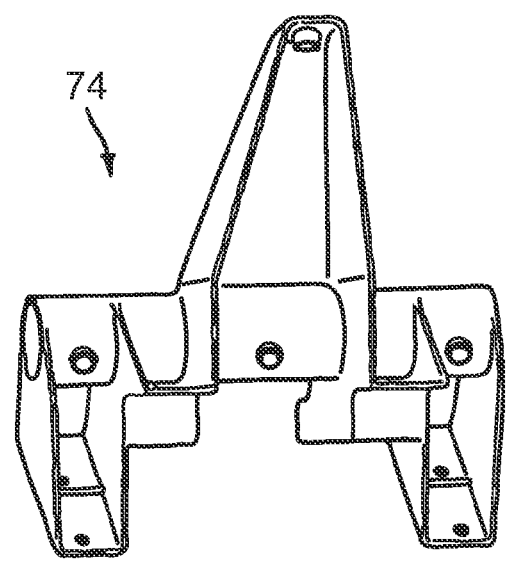
FIG. 31 is a perspective view of a main steering column/instrument cluster bracket of the support system shown in FIG. 29.
Figure 32:
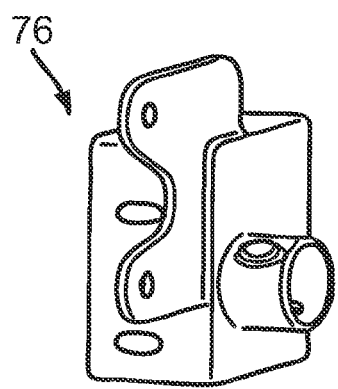
FIG. 32 is a left-hand mounting bracket of the support system shown in FIG. 29.
Figure 33:
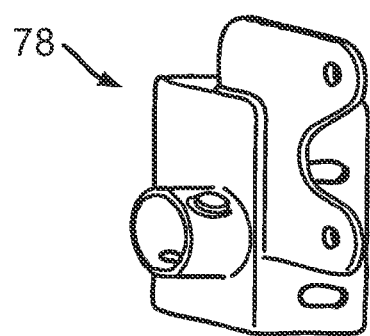
FIG. 33 is a right-hand mounting bracket of the support system shown in FIG. 29.

As shown in FIGS. 31-33, each bracket 74, 76, 78 forms a one-piece structure with multiple component attachment elements. By combining attachment elements into a single structure, the number of parts can be reduced. Each bracket 74, 76, 78 is molded from a lightweight material, e.g., aluminum alloy, directly onto the cross-beam 72. This arrangement allows each of the brackets 74, 76, 78 to have a lower mass than the combination of steel component attachment brackets, e.g., due to the lighter mass properties of aluminum. The wall thickness of the brackets 74, 76, 78 may be cast thicker than steel thereby providing a more rigid bracket. Also, with the brackets 74, 76, 78 being cast onto the cross-beam 72, welding operations can be reduced which reduces manufacturing complexity. This will reduce part distortion. Additionally, all the brackets 74, 76, 78 can be molded onto the cross-beam 72 in a common operation allowing for consistent bracket to bracket dimensional integrity. The NVH qualities of the brackets 74, 76, 78 are also improved.

The present invention is not limited to the above-mentioned embodiments of the invention. For example, the main body 12 and the coupling member 14 may be made of an extruded article, casting, iron materials or other metallic materials, or synthetic resin. Further, the present invention is not limited by the use of the hybrid component 10 with a vehicle.

The hybrid component 10 of the invention allows the manufacturer to use less expensive materials for the tubular member 12, such as steel, or the like, while using a relatively more expensive material, such as aluminum, or the like, for the coupling member 14, thereby reducing the cost of the hybrid component 10 as compared to conventional components made entirely of aluminum. However, the entire hybrid component 10 can be made of aluminum, or the like, if desirable.

It will be appreciated that the embodiments of the invention are only illustrative in nature, and that the principles of the invention can be practiced in many different ways. For example, the principles of the invention can be practiced with any type of attachment configuration beside a J-hook or Y-hook configuration shown in the illustrative embodiments, such as an X-hook, T-hook, or the like, to positively secure the coupling member to the tubular member.

In addition to the methods disclosed above, other methods can be used, together with the methods mentioned above to avoid the presence of a crevice between the tubular member 12 and the coupling member 14. For example, the tube surface can be coated prior to or after the casting operation in the "joint area" to avoid any crevices that would cause galvanic corrosion. Another example is to apply pressure to the outside surface of the tubular member when the casting die closes and during the metal casting process, effectively reducing the physical dimension of the tubular member within the elastic range. When the casting die opens the compressive force on the tubular member is removed and the tube expands within the constraint of the casting, thus minimizing the "gap" between the tubular member and the casting, avoiding any crevice that could result in galvanic corrosion. A further example is to metallurgically bond the tubular member and cast metal to avoid any crevices that would cause galvanic corrosion. The bonding agent may be applied using thermal spray processing. Examples of metallurgically compatible materials which can be sprayed include zinc-based, copper-based, and nickel-based alloys.

The embodiments of the subject application illustrated herein employ the concept of fabricating hybrid "Hydrocast" modules, comprising one or more high strength tube(s) or hydroformed components with cast connection or attachment points, and can yield significant weight and cost benefits. Weight savings can be realized by utilizing the high strength-to-weight ratio inherent of tubular construction and the light weight, machinability, near net shape, and ductility of cast metal alloys. The use of high strength cast alloys and processes which do not require heat treatment or which require only age hardening provide cost saving potential through energy avoidance.

Typical cast aluminum materials for automotive structural applications include aluminum, silicon and magnesium elements (AlSiMg 356 alloy) and aluminum, silicon, copper and magnesium elements (AlSiCuMg 357 alloy). The desired mechanical properties are achieved by solution heat treatment and artificial aging referred to as T6 or T7 heat treatment. The solution heat treatment process includes heating the aluminum to approximately 1,000° F. (538° C.) followed by a water quench and an artificial age at a temperature of 400° F. (220° C.). Aluminum castings manufactured specifically using the semi-solid casting process do not require a solution heat treatment cycle to achieve an acceptable yield strength, typically greater than 180 MPa. Semi-solid castings have yield strength greater than 180 MPa with only an artificial aging (T5) heat treatment cycle, which involves exposing the aluminum casting to a temperature of 400° F. (220° C.).

The preformed steel component of the hybrid material casting may be an ultra high strength steel (UHSS), boron steel or stainless steel having a minimum yield strength of 1,300 MPa. The yield strength associated with the steel component is achieved by heat treatment quench and temper. Exposure of the steel component to elevated temperatures of 1,000° F., typical to that of aluminum solution heat treatment temperatures, results in a significant reduction in yield strength, below the 1,306 MPa design guideline. TABLE-US-00001 Yield Strength Yield Strength Grade Description 400° F. 1,000° F. 15B21 Boron Steel 840 MPa 1,340 MPa 4130 UHHS 1860 MPa 1,160 MPa 4340 UHHS 1670 MPa 1,050 MPa 420 Stainless Steel 1300 MPa 1,000 MPa.

The ability to fabricate a cast aluminum/steel hybrid component having a yield strength of a cast aluminum greater than about 180 MPa and a steel yield strength greater than about 1,300 MPa can be accomplished if the cast aluminum/steel hybrid component is not exposed to the aluminum solution heat treatment temperature (typically 1000° F.). The semi-solid aluminum casting process enables the ability to obtain a minimum yield strength of 180 MPa by subjecting the hybrid component to a T5 artificial age heat treatment (typically 400° F.), thus avoiding degradation of the steel material properties which results from "overtempering" during the aluminum solution heat treatment processing.

Traditional aluminum casting methods require a T6 solution heat treatment (1,000° F.), quench and artificial age (400° F.) to realize a yield strength greater than that of 180 MPa. Exposure of high strength steel to a temperature of 1,000° F. reduces the yield strength to a level below 1,300 MPa. Therefore, it is not possible using conventional casting methods to fabricate an aluminum/steel hybrid structure comprised of a cast aluminum alloy having a minimum yield strength of 180 MPa and a steel component having a yield strength greater than 1,300 MPa. It is possible to fabricate a cast aluminum/steel hybrid component using the semi-solid casting process by subjecting the steel to only a T5 artificial age heat treatment.

If a cast aluminum/steel hybrid component is manufactured using traditional casting processes and the steel is subjected to the solution heat treatment temperature of 1,000° F., the section size of the steel component should be increased proportionally to compensate for the reduction in yield strength imposed by the heat treatment process. This increase in section size may result in additional cost and weight of the steel component, which offsets the advantage of making a cast aluminum hybrid component.

If a cast aluminum/steel hybrid component is manufactured using traditional casting processes and the cast aluminum is subjected to only an artificial age heat treatment temperature of 400° F., the section size of the aluminum component should be increased proportionally to compensate for the yield strength obtained by the T5 heat treatment process. This increase in section size results in additional cost and weight of the aluminum component, which offsets the advantage of making a cast aluminum hybrid component.

Figure 34:
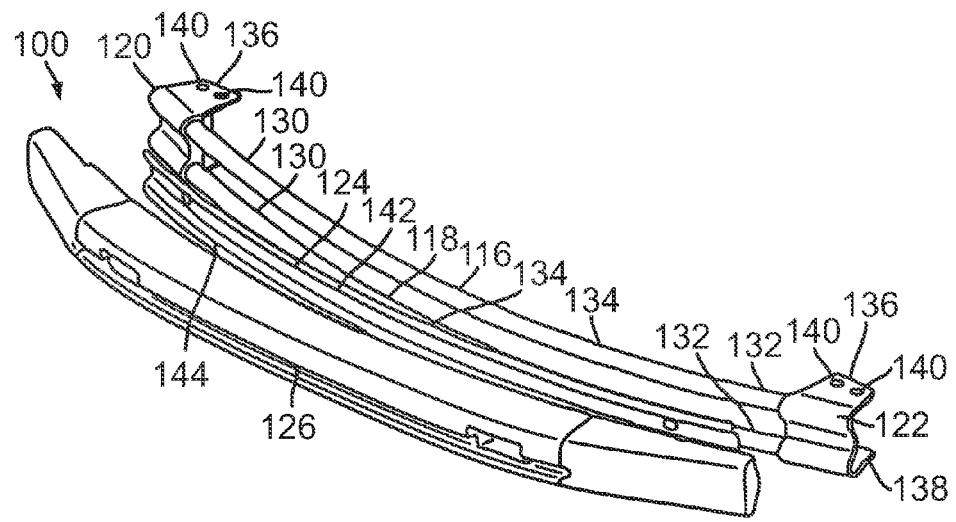
FIG. 34 is an exploded view illustrating a bumper assembly constructed in accordance with an embodiment of the invention.
Figure 35:
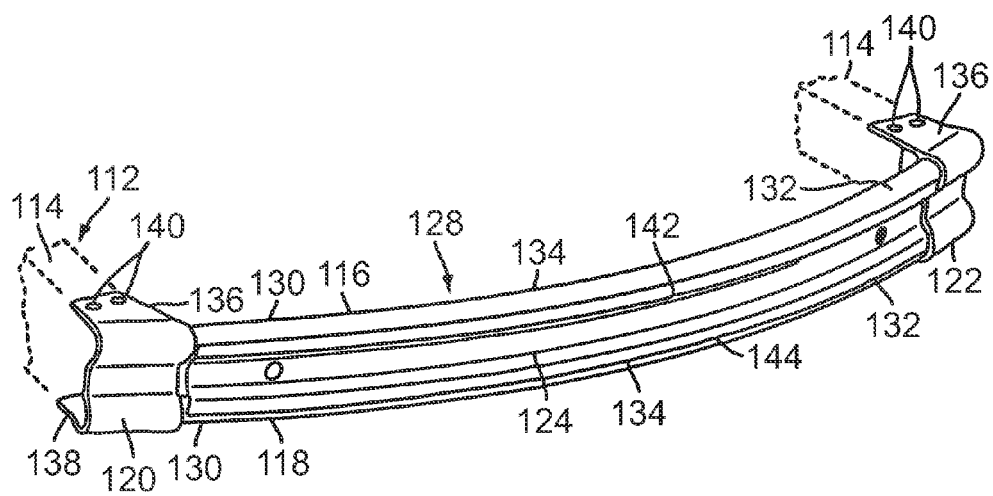
FIG. 35 is a front perspective view illustrating a middle member of the bumper assembly shown in FIG. 34 attached to tubular members of the bumper assembly shown in FIG. 34.
Figure 36:
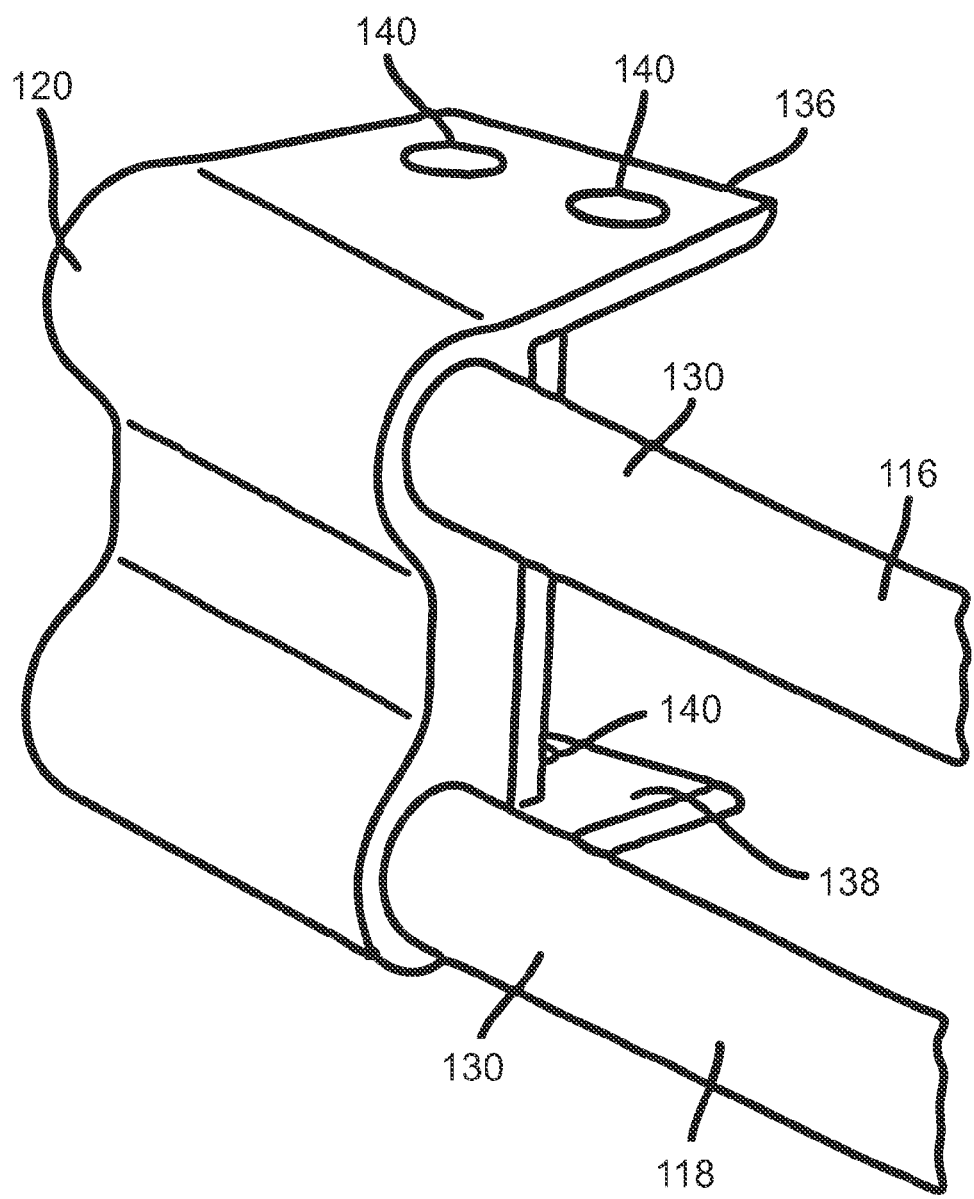
FIG. 36 is an enlarged front perspective view illustrating a mounting member of the bumper assembly shown in FIG. 34 attached to tubular members of the bumper assembly shown in FIG. 34.

FIGS. 34-44 illustrate additional embodiments of the invention that can employ any suitable casting process as discussed herein. FIGS. 34-36 illustrate a bumper assembly 100 for a vehicle 112 constructed according to an embodiment of the present invention. As illustrated herein, the bumper assembly 100 illustrates one example of a bumper assembly that uses a combination of heavier materials, such as steel, along with lighter materials to decrease the overall weight of the bumper assembly. The bumper assembly 100 is structured to be mounted to a space frame 114 of the vehicle 112 at either the front end or the rear end of the vehicle 112. The bumper assembly 100 may be utilized on any suitable vehicle. An example of a prior art vehicle space frame is disclosed in U.S. Pat. No. 6,092,865 to Jaekel et al., which is incorporated herein by reference thereto.

The main components of the bumper assembly 100 are longitudinally extending tubular members 116, 118, first and second mounting members 120, 122 attached to the tubular members 116, 118, a middle member 124 attached to and extending between the tubular members 116, 118, and an impact-absorption device 126 attached to the tubular members 116, 118. The tubular members 116, 118 and the middle member 124 may together constitute a bumper member 128 constructed to protect the vehicle 112 from impact.

In the illustrated embodiment, the first and second mounting members 120, 122 are rigidly mounted to the tubular members 116, 118 in spaced-apart relation such that the tubular members 116, 118 extend between the first and second mounting members 120, 122. Further, the first and second mounting members 120, 122 are positioned between the tubular members 116, 118 and the space frame 114 of the vehicle 112. The impact absorption device 126 is rigidly mounted on the other side of the tubular members 116, 118 and extends along the length of the bumper assembly 100. The bumper assembly 100 is mounted to the space frame 114 of the vehicle 112 by rigidly mounting each mounting member 120, 122 to the space frame 114. In use, the impact absorption device 126 is positioned to receive collision forces during a front end or rear end collision. The impact absorption device 126 collapses during the collision in order to dissipate energy and thus reduce the magnitude of collision forces being transmitted to the bumper member 128 (tubular members 116, 118 and middle member 124) and the space frame 114. Examples of prior art bumper assemblies are disclosed in U.S. Pat. No. 6,663,150 to Evans and U.S. Pat. No. 6,672,635 to Weissenborn et al., the entireties of both being incorporated herein by reference.

In the illustrated embodiment, the bumper assembly 100 is structured such that the mounting members 120, 122 are constructed of aluminum rather than steel. By using lighter mounting members 120, 122, the weight of the bumper assembly 100 is significantly reduced with respect to conventional bumper assemblies. In embodiments, the bumper assembly's weight is about 45% less than conventional bumper assemblies. Additionally, aluminum mounting members 120, 122 also reduce manufacturing costs.

Further to modify the bumper assembly 100 for different vehicles, the manufacturer can simply modify the mounting members 120, 122 to correspond to the specific bumper mounting arrangement of a vehicle. This allows the tubular members 116, 118, the middle member 124, and the impact-absorption device 126 to remain as common parts. Thus, the interchangeability of mounting members 120, 122 for different vehicles simplifies the manufacturing process and reduces manufacturing costs.

As illustrated, the tubular members 116, 118 include two substantially parallel tubular members. Each of the tubular members 116, 118 has a generally circular cross-sectional configuration. Also, each of the tubular members 116, 118 is formed from steel and may have a hollow or solid construction. However, each of the tubular members 116, 118 may have any other suitable configuration. Also, any number of tubular members can be employed, as desired.

The tubular members 116, 118 are bent to provide each tubular member 116, 118 with opposing end portions 130, 132 and a centrally disposed intermediate portion 134 extending between the end portions 130, 132. The tubular members 116, 118 are bent to impart a longitudinal curvature to the bumper assembly 100. The tubular members 116, 118 may be bent into the desired shape in any suitable manner, e.g., roll forming, hydroforming. Further details of the hydroforming process are provided in U.S. Pat. No. 6,092,865 to Jaekel, which is incorporated herein by reference thereto. Also, the tubular members 116, 118 may vary in length and longitudinal curvature to suit various vehicle widths and contours.

The mounting members 120, 122 are constructed of aluminum and each of the mounting members 120, 122 fully encapsulates an end of each of the two tubular members 116, 118. Specifically, the mounting member 120 fully encapsulates the end portions 130 of the tubular members 116, 118, and the mounting member 122 fully encapsulates the opposing end portions 132 of the tubular members 116, 118. In the illustrated embodiment, the mounting members 120, 122 encapsulate the tubular members 116, 118 by being cast onto the tubular members 116, 118. That is, when manufacturing the bumper assembly 100, the steel tubular members 116, 118 are first formed, and then the aluminum mounting member 120 is cast onto the end portions 130 of the tubular members 116, 118 and the aluminum mounting member 122 is cast onto the opposing end portions 132 of the tubular members 116, 118. However, the mounting members 120, 122 may be attached to the tubular members 116, 118 in any other suitable manner, e.g., welding.

As shown in FIG. 36, each mounting member 120, 122 is in the form of a bracket that provides upper and lower mounting plates 136, 138 configured to mount the tubular members 116, 118 to the vehicle space frame 114. In the illustrated embodiment, each of the mounting plates 136, 138 includes one or more openings 140 for mounting each mounting member 120, 122 to the space frame 114, e.g., by fasteners. However, the mounting members 120, 122 may be secured to the space frame 114 in any other suitable manner, e.g., welding. Moreover, the mounting members 120, 122 may have any other suitable structure to facilitate connection to the vehicle 112.

The middle member 124 may be constructed of any suitable material, e.g., steel, plastic composite, etc., and extends substantially along the entire length of the tubular members 116, 118. The middle member 124 is bent to provide the middle member 124 with upper and lower mounting portions 142, 144. The middle member 124 is also bent to impart a longitudinal curvature to the middle member 124 that corresponds to the longitudinal curvature of the tubular members 116, 118. The middle member 124 is attached to the tubular members 116, 118 such that the upper mounting portion 142 engages the tubular member 116 and the lower mounting portion 144 engages the tubular member 118. The middle member 124 may be secured to the tubular members 116, 118 by welding, or in any other suitable manner. The middle member 124 adds rigidity and reinforces the tubular members 116, 118. Further, the middle member 124 distributes load being transmitted to the tubular members 116, 118.

In the illustrated embodiment, the impact-absorption device 126 is constructed from a non-metallic material, e.g., foam. The impact-absorption device 126 extends substantially along the entire length of the bumper assembly 100 to cover the tubular members 116, 118, the middle member 124, and the mounting members 120, 122. The impact-absorption device 126 may be securely mounted to the tubular members 116, 118 and/or the middle member 124 in any suitable manner, e.g., by fasteners, welding, etc. The impact-absorption device 126 is also formed with a longitudinal curvature that corresponds to the longitudinal curvature of the tubular members 116, 118. In use, the impact-absorption device 126 dissipates energy being transmitted to the tubular members 116, 118, the middle member 124, and the space frame 114 during a vehicle collision.

Figure 37:
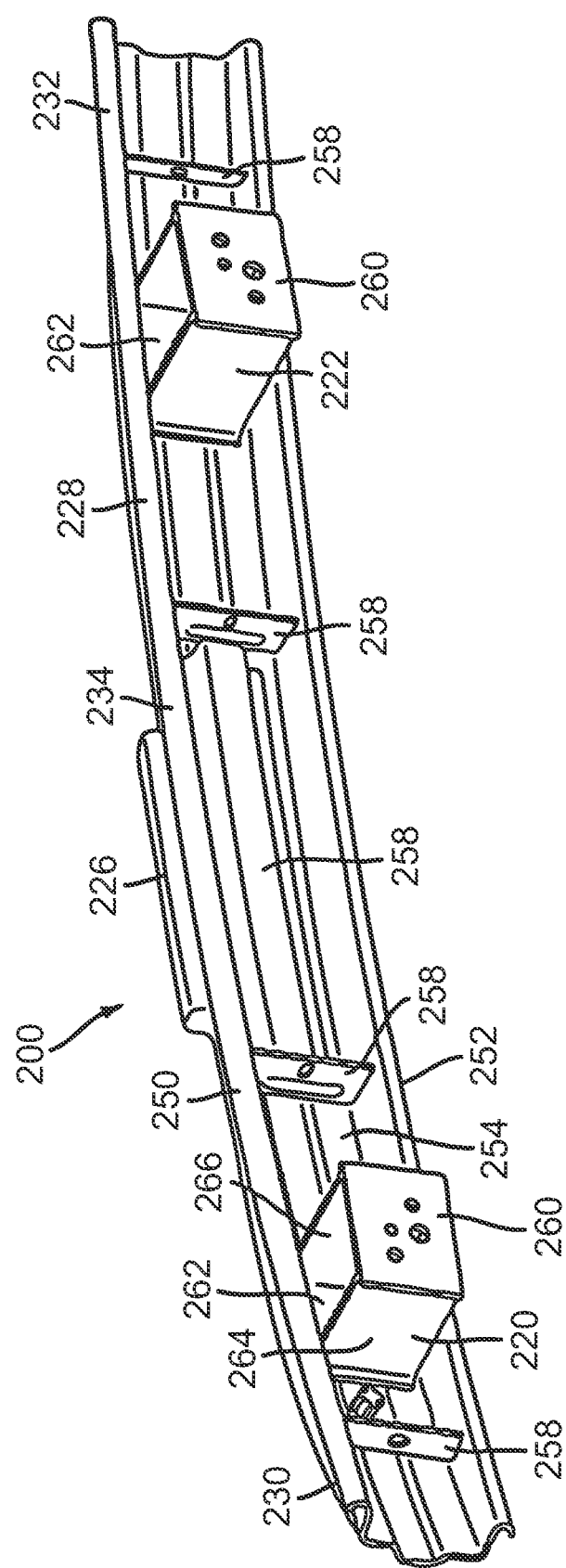
FIG. 37 is a rear perspective view illustrating another embodiment of a bumper assembly.
Figure 38:
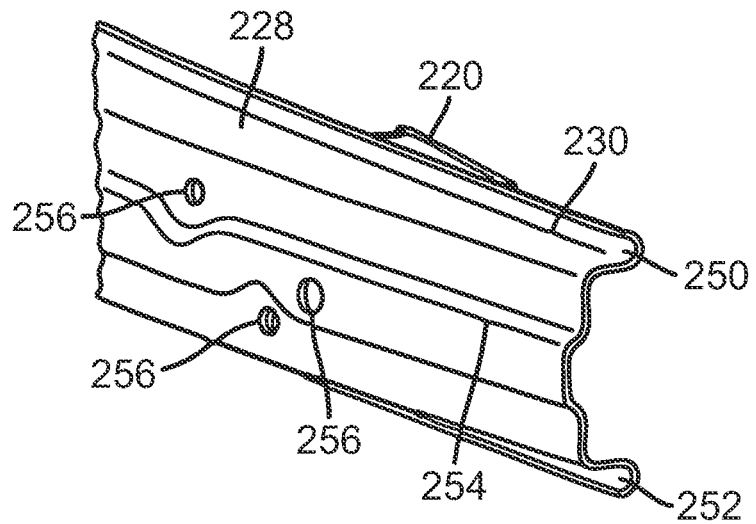
FIG. 38 is an enlarged front perspective view illustrating a mounting member of the bumper assembly shown in FIG. 37 attached to a middle member of the bumper assembly shown in FIG. 37.
Figure 39:
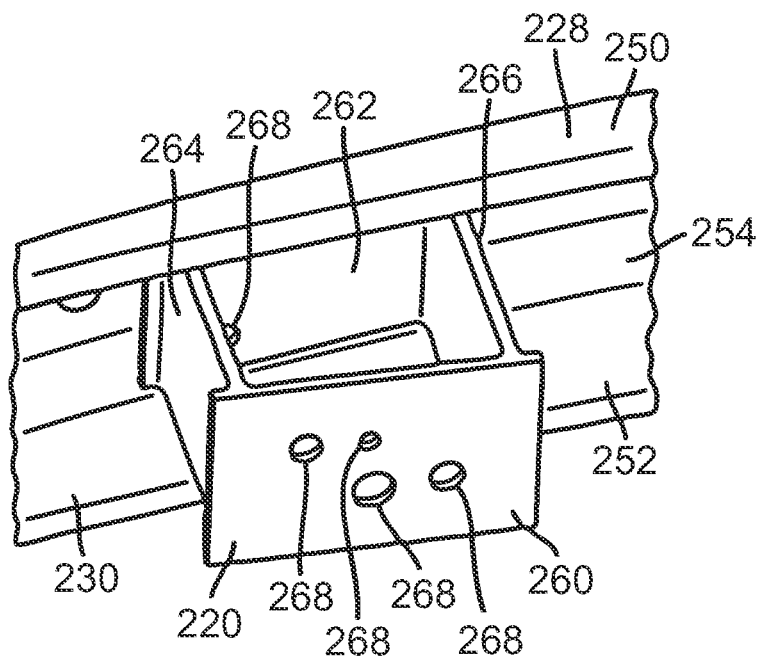
FIG. 39 is an enlarged rear perspective view illustrating a mounting member of the bumper assembly shown in FIG. 37 attached to a middle member of the bumper assembly shown in FIG. 37.

FIGS. 37-39 illustrate another embodiment of a bumper assembly 200. As illustrated, the bumper assembly 200 includes a longitudinally extending steel bumper member 228 constructed to protect the vehicle from impact, first and second aluminum mounting members 220, 222 attached to one side of the steel bumper member 228, and an impact-absorption device 226 attached to an opposite side of the steel bumper member 228.

In the illustrated embodiment, the first and second mounting members 220, 222 are rigidly mounted to the bumper member 228 in spaced-apart relation such that the bumper member 228 extends between the first and second mounting members 220, 222. Further, the first and second mounting members 220, 222 are positioned between the bumper member 228 and the vehicle space frame. The bumper assembly 200 is mounted to the space frame of the vehicle by rigidly mounting each mounting member 220, 222 to the space frame. In use, the impact absorption device 226 is positioned to receive collision forces during a front end or rear end collision. The impact absorption device 226 collapses during the collision in order to dissipate energy and thus reduce the magnitude of collision forces being transmitted to the bumper member 228 and the space frame of the vehicle.

The bumper member 228 is preferably formed from an elongated piece of sheet metal, e.g., high strength steel. The sheet metal is bent to provide a one-piece bumper member 228 with opposing end portions 230, 232 and a centrally disposed intermediate portion 234 extending between the end portions 230, 232. The sheet metal is also bent to impart a longitudinal curvature to the bumper member 228. The sheet metal may be bent into the desired shape of the bumper member 228 in any suitable manner, e.g., roll forming, stamping, hot stamping, hydroforming. Further details of the hydroforming process are provided in U.S. Pat. No. 6,092,865 to Jaekel, which is incorporated herein by reference thereto. Also, the bumper member 228 may vary in length and longitudinal curvature to suit various vehicle widths and contours.

The end portions 230, 232 and intermediate portion 234 of the bumper member 228 cooperate to define an upper wall 250, a lower wall 252, and a central wall 254 between the upper and lower walls 250, 252. As shown in FIG. 38, one or more openings 256 are provided in the central wall 254 for mounting the bumper member 228 to the impact absorption device 226 and the mounting members 220, 222. Additionally, brackets and/or stiffening members 258 are attached between the upper and lower walls 250, 252, e.g., by welding, to add rigidity/reinforcement to the bumper member 228. For example, FIG. 37 shows bracket/stiffening members 258 in the intermediate portion 234 of the bumper member 228.

The first and second aluminum mounting members 220, 222 are formed separately from the bumper beam 228 and rigidly attached thereto. In the illustrated embodiment, the mounting members 220, 222 are attached to the intermediate portion 234 of the bumper beam 228 between the end portions 230, 232. Each mounting member 220, 222 is in the form of a mounting bracket that provides mounting plates 260, 262 and connecting walls 264, 266 between the mounting plates 260, 262. The mounting plate 260 of each mounting member 220, 222 is configured to mount to the vehicle space frame, and the mounting plate 262 is configured to mount to the central wall 254 of the bumper member 228. In the illustrated embodiment, the mounting plates 260, 262 include one or more openings 268 for mounting, e.g., by fasteners. However, the mounting plates 260, 262 may be secured in position in any other suitable manner, e.g., welding. Moreover the mounting members 220, 222 may have any other suitable structure to facilitate connection to the vehicle and bumper member 228.

The first and second aluminum mounting members 220, 222 may be formed in any suitable manner, e.g., extrusion. Also, the first and second aluminum members 220, 222 may be formed with an aluminum portion and a steel portion. Moreover, the aluminum mounting members 220, 222 are connected to the steel bumper member 228 to prevent corrosion. For example, the members 220, 222, 228 may be coated with an anti-corrosive material. Additionally, the mounting members 220, 222 may be other structural members such as crush cans configured to absorb a collision force and deform in predetermined manner. For example, the connecting walls 264, 266 of each mounting member 220, 222 may be structured to deform in a predetermined manner. Additionally, the aluminum members may be made of any appropriate material that is lighter than steel (or the stronger material used for providing the strength to the bumper) and be formed as any element of the bumper assembly that can be made of a lighter material to decrease weight while maintaining other elements of the bumper assembly of a stronger material such as steel.

The impact-absorption device 226 is constructed from a non-metallic material, e.g., foam. The impact-absorption device 226 extends substantially along the entire length of the bumper member 228. The impact-absorption device 226 may be securely mounted to the bumper member 228 in any suitable manner, e.g., by fasteners or welding. The impact-absorption device 226 is also formed with a longitudinal curvature that corresponds to the longitudinal curvature of the bumper member 228. In use, the impact-absorption device 226 dissipates energy being transmitted to the bumper member 228 and the space frame during a vehicle collision.

Figure 40:
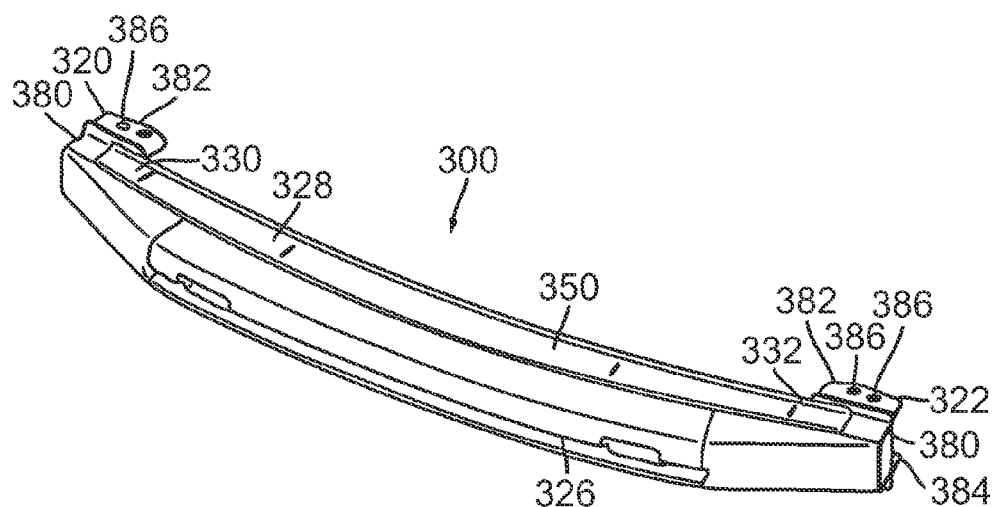
FIG. 40 is a front perspective view illustrating another embodiment of a bumper assembly.
Figure 41:
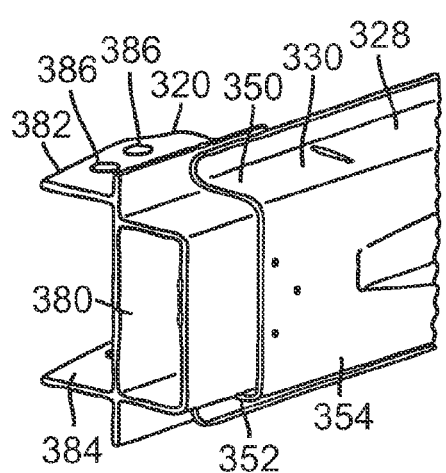
FIG. 41 is an enlarged front perspective view illustrating a mounting member of the bumper assembly shown in FIG. 40 attached to a middle member of the bumper assembly shown in FIG. 40.
Figure 42:
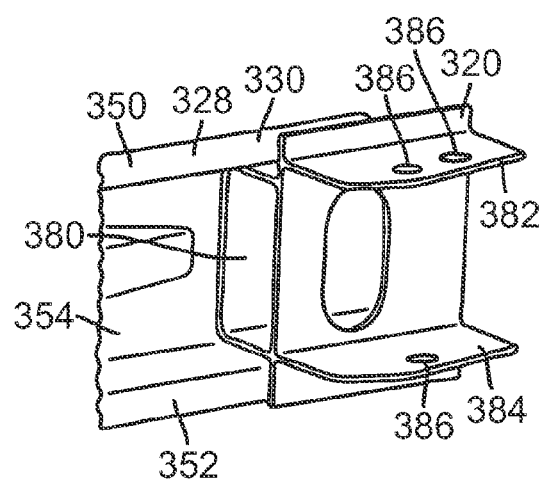
FIG. 42 is an enlarged rear perspective view illustrating a mounting member of the bumper assembly shown in FIG. 40 attached to a middle member of the bumper assembly shown in FIG. 40.

FIGS. 40-42 illustrate another embodiment of a bumper assembly 300. As illustrated, the bumper assembly 300 includes a longitudinally extending steel bumper member 328 constructed to protect the vehicle from impact, first and second aluminum mounting members 320, 322 attached to one side of the steel bumper member 328, and an impact-absorption device 326 attached to an opposite side of the steel bumper member 328.

The bumper assembly 300 is substantially similar to the bumper assembly 200. In contrast, the mounting members 320, 322 have a different configuration and are attached to end portions 330, 332 of the bumper member 328.

The first and second aluminum mounting members 320, 322 are formed separately from the bumper beam 328 and rigidly attached thereto. In the illustrated embodiment, the mounting members 320, 322 are attached to the opposing end portions 330, 332 of the bumper beam 328. Specifically, as shown in FIG. 41, each mounting member 320, 322 is attached to the bumper member 328 such that a portion of the mounting member 320, 322 is attached to the respective end portion 330, 332 and a remaining portion of the mounting member 320, 322 extends past the respective end portion 330, 332. Thus, the bumper beam 328 is cut short of the mounting area such that it is positioned inboard of the outer attachment points of the mounting members 320, 322.

Each mounting member 320, 322 is in the form of a mounting bracket that provides a tubular portion 380 and upper and lower mounting plates 382, 384 extending from the tubular portion 380. The upper and lower mounting plates 382, 384 of each mounting member 320, 322 is configured to mount to the vehicle space frame, and the tubular portion 380 is configured to mount to the bumper member 328. In the illustrated embodiment, the upper and lower mounting plates 382, 384 include one or more openings 386 for mounting, e.g., by fasteners, to the space frame. However, the mounting plates 382, 384 may be secured to the space frame in any other suitable manner, e.g., welding. The tubular portion 380 is received within the space defined by the upper, lower, and central walls 350, 352, 354 of the bumper member 328. The tubular portion 380 may be secured to the walls 350, 352, 354 by welding or in any other suitable manner. Moreover, the mounting members 320, 322 may have any other suitable structure to facilitate connection to the vehicle and bumper member 328.

Similar to the mounting members 220, 222, the mounting members 320, 322 may be formed in any suitable manner, e.g., extrusion. Also, the mounting members 320, 322 may be formed with an aluminum portion and a steel portion. Moreover, the mounting members 320, 322 are connected to the steel bumper member 328 to prevent corrosion. For example, the members 320, 322, 328 may be coated with an anti-corrosive material. Additionally, the mounting members 320, 322 may be crush cans configured to absorb a collision force and deform in predetermined manner. For example, the tubular portion 380 of each mounting member 320, 322 may be structured to deform in a predetermined manner.

Figure 43:
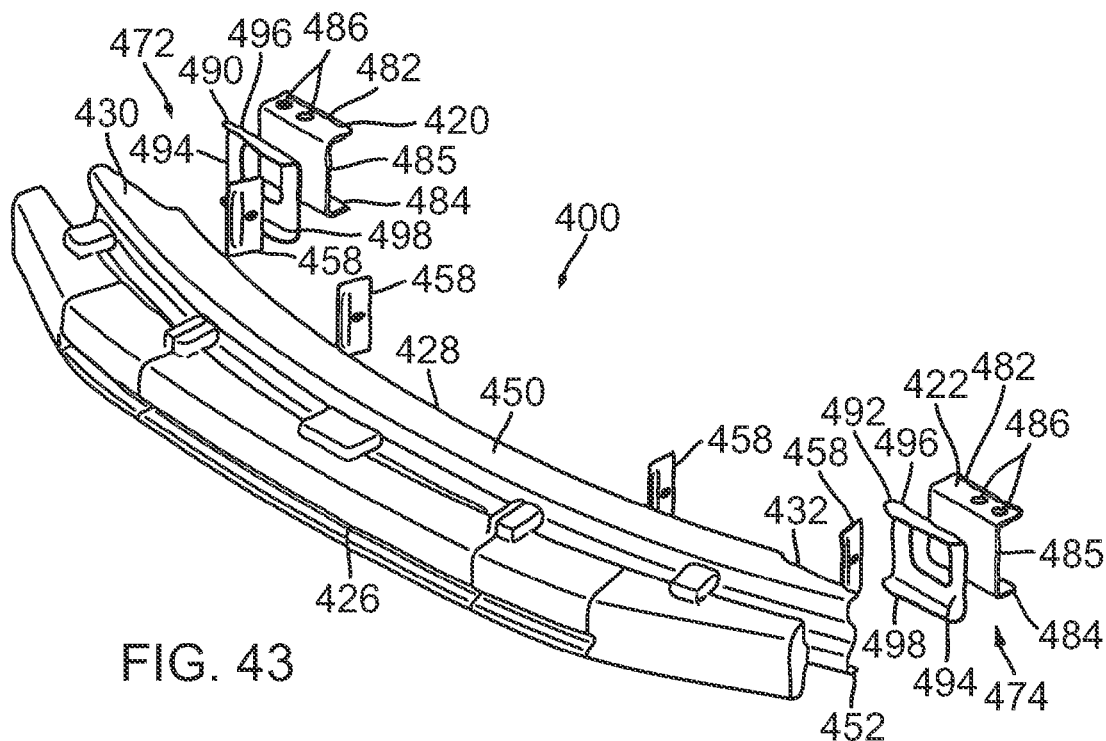
FIG. 43 is an exploded view illustrating another embodiment of a bumper assembly.
Figure 44:
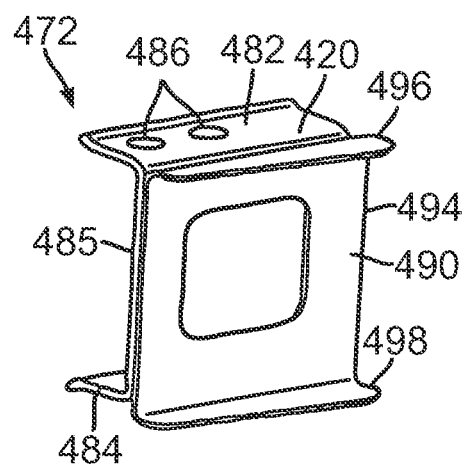
FIG. 44 is an enlarged perspective view illustrating a mounting member of the bumper assembly shown in FIG. 43 attached to a connecting member of the bumper assembly shown in FIG. 43.

FIGS. 43 and 44 illustrate another embodiment of a bumper assembly 400. As illustrated, the bumper assembly 400 includes a longitudinally extending steel bumper member 428 constructed to protect the vehicle from impact, first and second aluminum mounting members 420, 422 attached to one side of the steel bumper member 428, and an impact-absorption device 426 attached to an opposite side of the steel bumper member 428. Additionally, brackets and/or stiffening members 458 are attached to the bumper member 428, e.g., by welding, to add rigidity/reinforcement to the bumper member 428.

The bumper assembly 400 is substantially similar to the bumper assembly 200. In contrast, the mounting members 420, 422 have a different configuration and are attached to end portions 430, 432 of the bumper member 428 with connecting members 490, 492 formed of another material, e.g., a heavier material such as steel. Thus, a mounting bracket assembly 472 formed of bracket 420 and member 490 and a mounting bracket assembly 474 formed of bracket 422 and member 492, as illustrated in FIG. 44, can be used to attach the bumper assembly 400 to the space frame.

The first and second aluminum mounting members 420, 422 are formed separately from the bumper beam 428 and rigidly attached to opposing end portions 430, 432 of the bumper beam 428 by connecting members 490, 492. Each mounting member 420, 422 is in the form of a mounting bracket that provides upper and lower mounting plates 482, 484 and a connecting plate 485 extending between the upper and lower mounting plates 482, 484. The upper and lower mounting plates 482, 484 of each mounting member 420, 422 are configured to mount to the vehicle space frame, and the connecting plate 485 is configured to mount to a respective connecting member 490, 492. In the illustrated embodiment, the upper and lower mounting plates 482, 484 include one or more openings 486 for mounting, e.g., by fasteners, to the space frame. However, the mounting plates 482, 484 may be secured to the space frame in any other suitable manner, e.g., welding. The connecting plate 485 is attached to a connecting wall 494 of a respective connecting member 490, 492, e.g., by welding. The connecting member 490, 492 also includes upper and lower walls 496, 498 that are secured to the upper and lower walls 450, 452 of the bumper member 428 by welding or in any other suitable manner. Moreover, the mounting members 420, 422 and connecting members 490, 492 may have any other suitable structure to facilitate connection to the vehicle and bumper member 428.

Similar to the mounting members 220, 222 320, 322, the mounting members 420, 422 may be formed in any suitable manner, e.g., extrusion. Also, the mounting members 420, 422 may be formed with an aluminum portion and a steel portion. Moreover, the mounting members 420, 422 are connected to the steel bumper member 428 to prevent corrosion. For example, the members 420, 422, 428 may be coated with an anti-corrosive material. Additionally, the mounting members 420, 422 may be crush cans configured to absorb a collision force and deform in predetermined manner.

The bumper assemblies illustrated herein illustrate a few examples of a bumper assembly that uses a combination of heavier materials, such as steel, along with lighter materials to decrease the overall weight of the bumper assembly. In the illustrated embodiment, the lighter material is aluminum and the heavier material is steel. It should be understood that other materials could be used as desired. Also, the lighter material is illustrated primarily in the form of attachments for the heavier material such as mounting brackets. However, the lighter material can be any element of the bumper assembly, for example, the lighter material can be used for things such as panels or crush cans.

Figure 45:
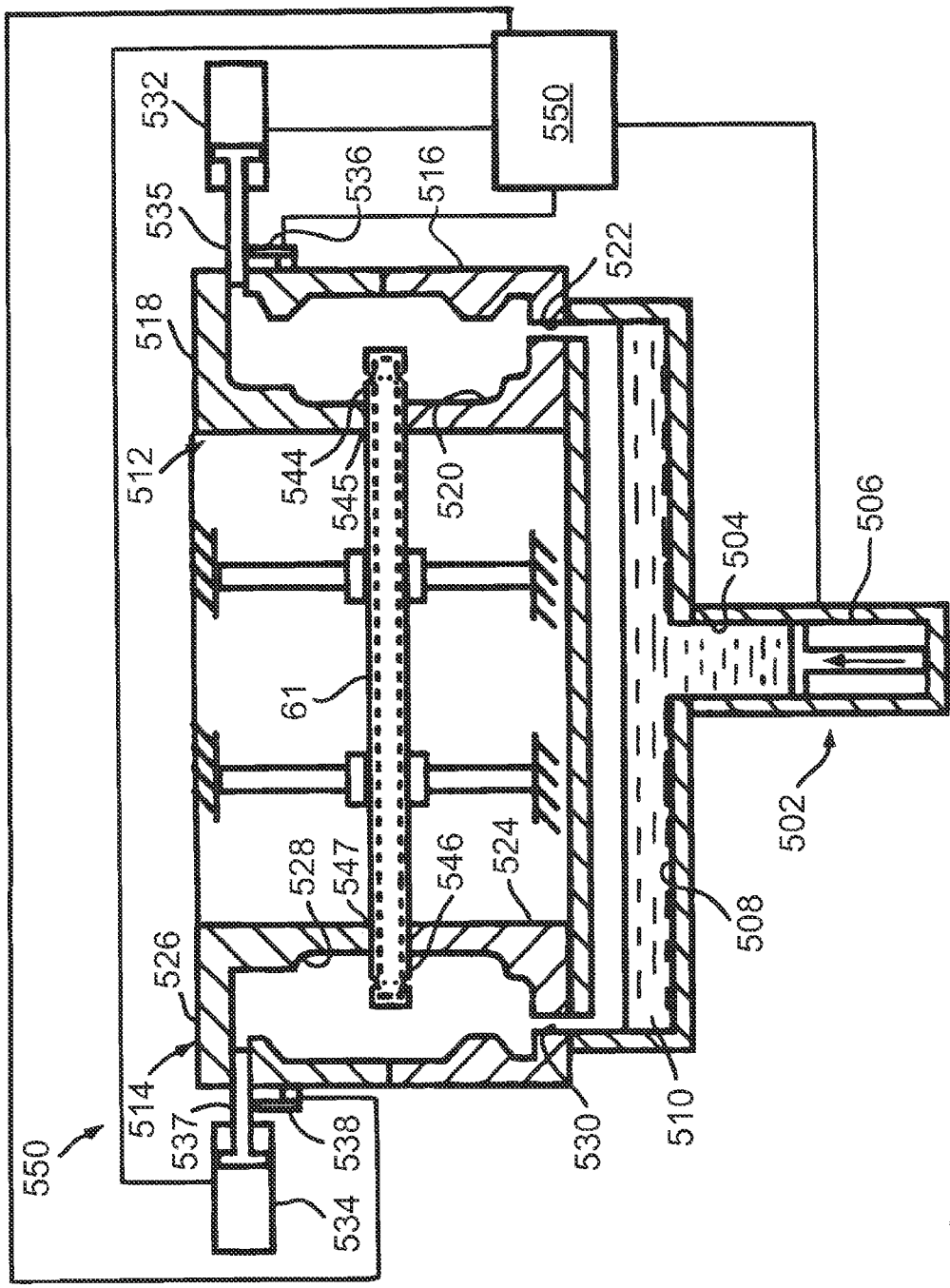
FIG. 45 illustrates a schematic of one illustrated embodiment of the present invention.

FIGS. 45-49 illustrate another embodiment of the present invention. FIG. 45 illustrates, schematically an assembly 500 for casting metal parts, such as a vehicle cradle 62 as seen in FIG. 26. The assembly 500 includes a main or shot tip pressure source 502 illustrated in the form of a shot tip 504 and a hydraulic cylinder 506. The shot tip 504 is fluidly coupled to a reservoir or biscuit 508 and contains, along with the reservoir 508 a quantity of molten metal 510. The reservoir 508 forms a shot sleeve that is fluidly connected to two die assemblies 512 and 514. Die assembly 512 is comprised of at least two die elements 516 and 518, which form a first die cavity or casting area 520. Die assembly 512 has a restricted in-gate area 522 that is fluidly coupled to the shot sleeve 508 such that molten metal 510 is capable of being forced through in-gate 522 and into cavity 520. Similarly, die assembly 514 is comprised of at least two die elements 524 and 526, which form a second die cavity or casting area 528. Die assembly 514 has a restricted in-gate area 530 that is fluidly coupled to the shot sleeve 508 such that molten metal 510 is capable of being forced through in-gate 530 and into cavity 528.

In the Figures, the die assemblies 512 and 514 have been illustrated as separate assemblies. It is apparent to those skilled in the art that the die assemblies 512 and 514 can be combined into a single die assembly. The intermediate section between the two die assemblies can be utilized to provide support to the support member 61, as described below.

Each die assembly 512 and 514 has at least one auxiliary pressure source 532 and 534, respectively, that is attached to a point in the respective cavity 520, 528 that is remote or distal from the in-gates 522, 530. Preferably, auxiliary pressure sources 532 and 534 are spaced as far as possible from the in-gates 522, 530 and most preferably on opposite ends of the cavities 520, 528. The auxiliary pressure sources 532 and 534 perform two functions. First, each auxiliary pressure source 532, 534 provides an indication that its respective cavity 520, 528 is sufficiently filled with molten metal 510 and, second, to apply auxiliary pressure to each respective cavity 520, 528 as described below. Auxiliary pressure source 532 is illustrated in the figures as an auxiliary hydraulic cylinder having a piston 535 that is connected directly to the die cavity 520. Piston 535 operatively communicates with the cavity 520 and moves in a reciprocating fashion to define an expanded volume and a desired volume.

Movement of the piston 535, including movement caused by molten metal 510 filling cavity 520, can be monitored in various ways. FIG. 45 illustrates a limit switch 536 adjacent piston 535 to track its movement in and out of the die cavity 520. Auxiliary pressure source 534 is also illustrated in the figures as an auxiliary hydraulic cylinder having a piston 537 that is operatively connected directly to the die cavity 528. Movement of the piston 537, including movement caused by molten metal 510 filling cavity 528, can be monitored in various ways, but is illustrated as a limit switch or position sensor 538 adjacent piston 537 to track its movement in and out of the die cavity 528.

In the illustrated embodiment of FIG. 45, the composite or hybrid casting assembly is casting the ends of a vehicle cradle 62, which has multiple support members 61 extending between multiple castings 63, as seen in FIG. 26. In FIG. 45, only one support member 61 is illustrated but it should be understood that the other support members can be made in a substantially identical manner or in different configurations, as desired, such as seen in FIG. 26. Support member 61 can take various configurations, but is typically a tubular member, such as a high strength steel, hollow tube. Tubes such as tube 61 can be made by operations such as hydroforming, preferably according to known methods as described in U.S. Pat. Nos. 5,979,201; 6,014,879; 6,065,502; 6,474,534; 6,609,301; and 6,662,611.

To form cradle 62, tube 61 is to have a casting on each of two ends 544 and 546 of the tube 61. Die assembly 512 has been configured to provide the casting for end 544 and die assembly 514 has been configured to provide the casting for end 546. Although FIG. 45 shows only tube 61 extending into cavities 520 and 528, multiple tubes such as tube 61 may extend into each of cavities 520 and 528 and become integral with the castings produced by die assemblies 512 and 514, as seen in FIG. 26.

The ends 544 and 546 of tube 61 extend into each cavity 520 and 528, respectively, and each end 544, 546 is closed so that molten metal 510 does not enter the hollow tube 61. FIGS. 54 to 60 illustrate various examples of hollow tubes with a closed end. The various examples provide two functions: closing the end of the hollow tube and providing a mechanical interlock between the casting to be formed and external surface of the hollow tube. The mechanical interlock prevents relative movement, torsional and axial, between the hollow tube and the casting. The mechanical interlock is enhanced by providing a mechanical interlock surface.

Figure 54:
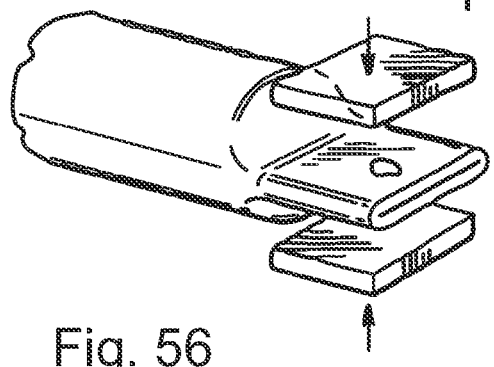
FIGS. 54-60 illustrate various examples of tube end closing and mechanical interlock for use with the present invention.

In FIG. 54, the tube end is crushed between two dies to present a flat end that is wider than the tube. A hole is provided through the flat end to present an interlock surface.

Figure 55:
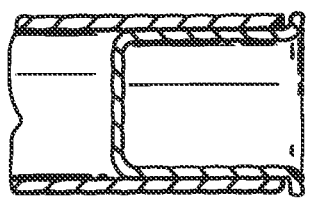

In FIG. 55, a separate stamped cap is positioned in the inside of the tube, closing the end. The cap is tack welded or crimped to the tube. The cap may have a flange having a non-circular configuration to provide a mechanical interlock surface.

Figure 56:
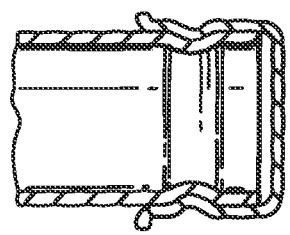

In FIG. 56, a separate stamped cap is positioned in the outside of the tube, closing the end. The cap is tack welded or crimped to the tube. The cap may have a flange having a non-circular configuration to provide a mechanical interlock surface.

Figure 57:
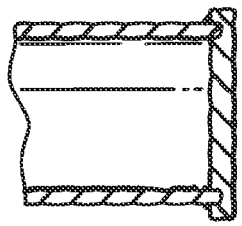

In FIG. 57, a separate stamped cap is positioned on the end of the tube, closing the end. The cap is welded to the tube. The cap may have a flange or tang having a non-circular configuration to provide a mechanical interlock surface.

Figure 58:
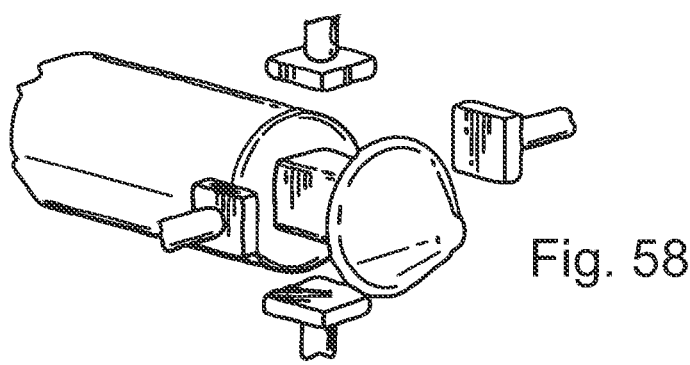

In FIG. 58, the tube end is subjected to rotary swaging to shape the end in a bayonet shape.

Figure 59:
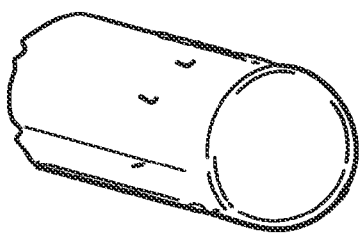

In FIG. 59, the material is spun around the ends of the tube, with indents provided on the tube.

Figure 60:
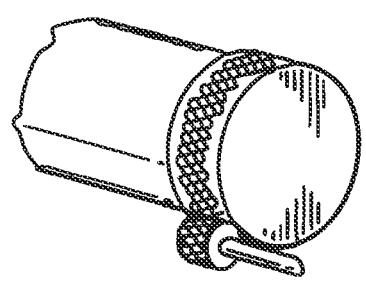

In FIG. 60, an end cap is welded to the end of the tube and a knurl is applied to the outside surface of the tube to present a mechanical interlock surface.

Figure 61:
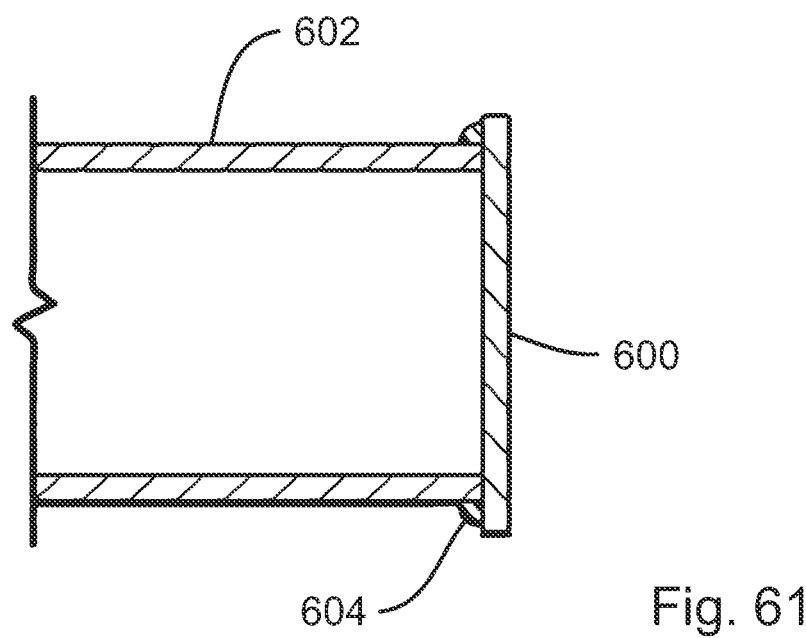
FIG. 61 shows a flat end cap abutting with an end portion of a steel member.
Figure 62:
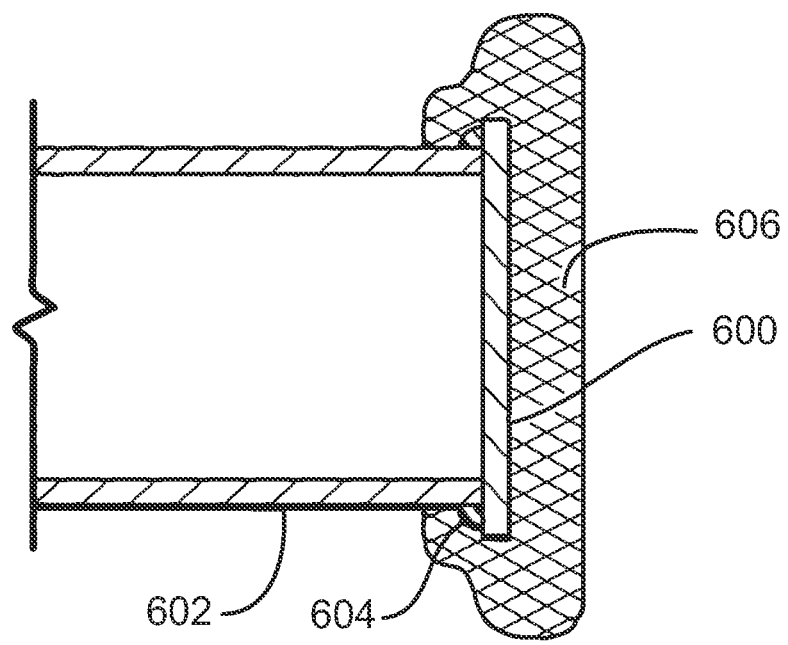
FIG. 62 shows the end cap of FIG. 61 positively and rigidly locking and securing a cast coupling member to the steel member.

FIG. 61 shows a flat end cap 600 abutting with an end portion of a steel member 602. In accordance with the embodiment shown in FIG. 61, the steel member is a tubular member. The end cap is fastened to the end portion of the steel member 602 by means of welding as indicated by welding seam 604. Alternative methods of fastening the end cap can be employed, such as crimping. Once the end cap 600 is fastened to the steel member 602, a cast coupling member 606 is cast about the end portion of the steel member enclosing the end cap 600. The end cap 600 prevents the molten metal from flowing into the steel member 602 and simultaneously positively and rigidly locks and secures the cast coupling member to the steel member, as shown in FIG. 62.

Figure 63A:
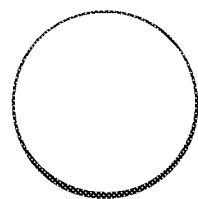
FIGS. 63a-e show exemplary embodiments of end cap designs.
Figure 63B:
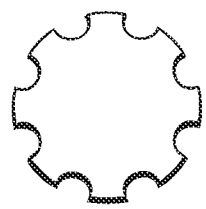
Figure 63C:
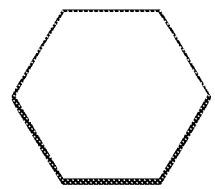
Figure 63D:
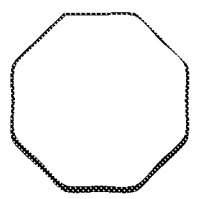
Figure 63E:
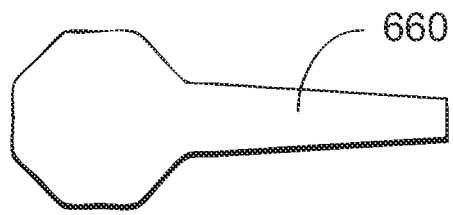

FIGS. 63a-e show exemplary embodiments of end cap designs. As can be seen from these figures, the end cap has a flange having a circular (FIGS. 63a-b) or a non-circular configuration (FIGS. 63c-e). In accordance with the embodiment shown in FIG. 63b, notches are provided along the flange to provide an additional mechanical interlock surface. FIGS. 63c-e show examples of polygonal end cap configurations. For example, FIG. 63c shows a hexagonal end cap configuration and FIG. 63d shows an octagonal end cap configuration. In accordance with the embodiment presented in FIG. 63e, the end cap has a flange having a polygonal shape including an outwardly extending member 660. The outwardly extending member 660 can generate additional torque which is advantageous for high torque applications, such as for example in twist axle assembly applications.

Each of the die assemblies 512 and 514 has a tube-receiving opening 545 and 547 and the split or parting line between die elements 516, 518 and 524, 526, respectively. Tube-receiving openings 545 and 547 are configured to complementarily receive tube ends 544, 546 respectively in a friction or interference fit. The tube-receiving openings 545 and 547 will clamp and retain the tube 61 in place after the die elements 516, 518 and 524, 526, respectively, have been closed. Although tube 61 has been illustrated as being straight and symmetrical, hydroforming enables tube of complex geometries be utilized in the present invention. To enhance the clamping capabilities, an intermediate die between the die assemblies 512, 514, can be provided to receive the tube 61 and provide support thereto, retaining the tube 61 in position during the casting process.

Preferably, the assembly 500, as illustrated in FIG. 45, is controlled by controller 550, which may take the form of a computer-based controller assembly or other automated or manually monitored controller assembly. Controller 550 can monitor and control the main pressure 502, the auxiliary pressures 532 and 534, and filling of the cavities 520 and 528. In the illustrated embodiment, the filling of the cavities can be monitored by controller 550 monitoring the sensors or limit switches 536 and 538.

The operation of the embodiment illustrated in FIG. 45 is best illustrated by viewing FIG. 45 in combination with FIGS. 46-49. The tube 61 is positioned in the casting assembly 500 such that first end 544 of tube 61 is positioned within first mold 512 and a second end 546 of the tube 61 is positioned within second mold 514.

Figure 46:
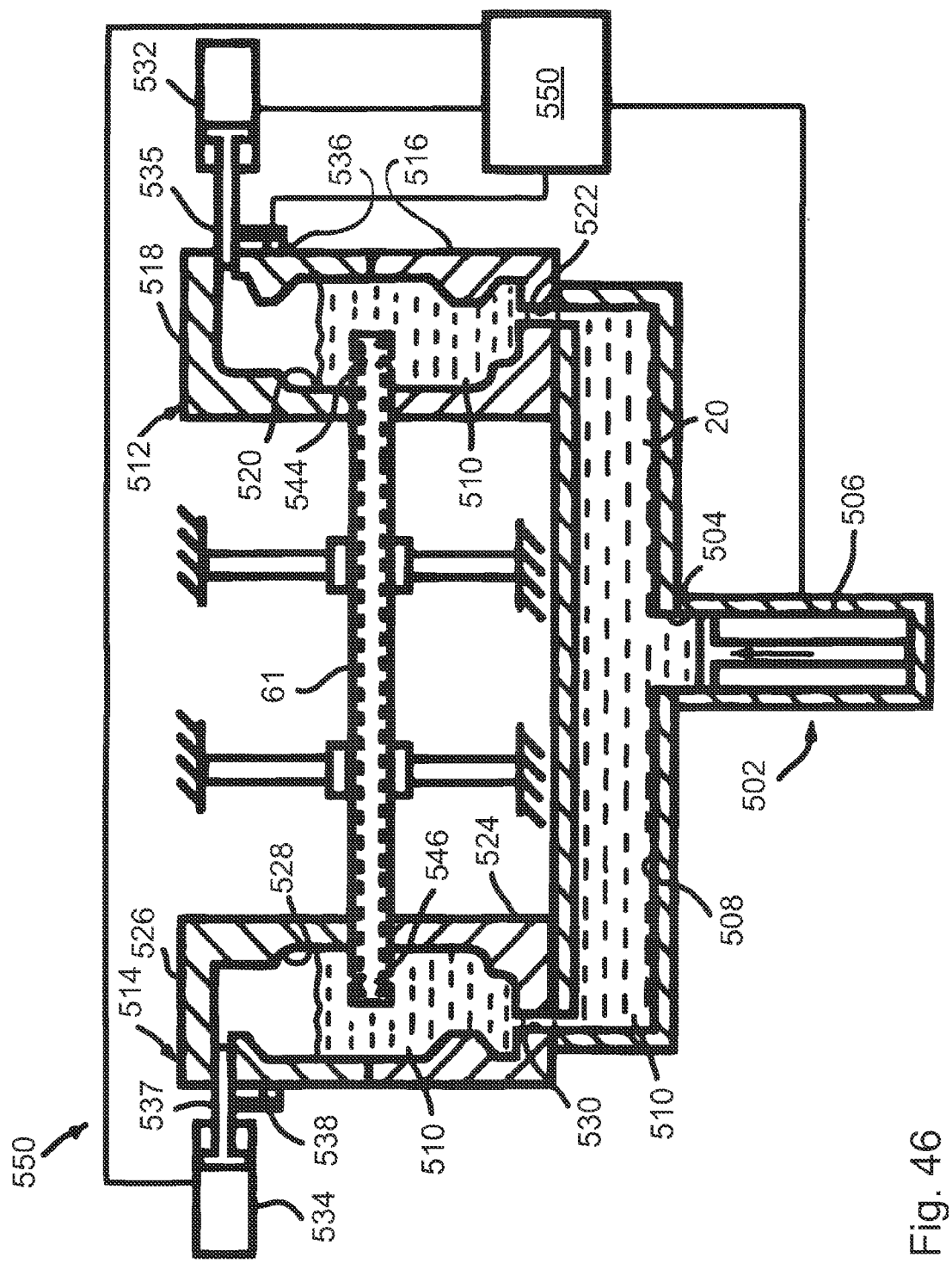
FIG. 46 illustrates the embodiment of FIG. 45 with the molten metal partially filling the molds.

The first and second molds 512 and 514 are fluidly coupled to reservoir 508 of molten metal 510. A main pressure is applied by hydraulic cylinder 506 and the molten metal 510 in reservoir 508 is forced into the first mold cavity 520 through in-gate 522 and simultaneously into the second mold cavity 528 through in-gate 530. The amount of pressure needed from cylinder 506 to fill the cavities 520 and 528 is preferably merely the pressure to overcome the resistance of pushing the molten metal 510 through the restricted in-gates 522 and 530. Thus, main pressure is applied by cylinder 506 to the molten metal 510 in the reservoir 508 at an initial, mold-filling pressure to force or inject the molten metal 510 into the mold cavities 520 and 528. As seen in FIG. 46, as the molten metal 510 begins filling the cavities 520 and 528, the molten metal 510 encapsulates the ends 544 and 546 of tube 61.

The molten metal 510 is preferably aluminium. At the moment of injection, the molten metal 510 preferably contains about 40-50% solids at less than 600° C., most preferably 583-595° C.

Figure 47:
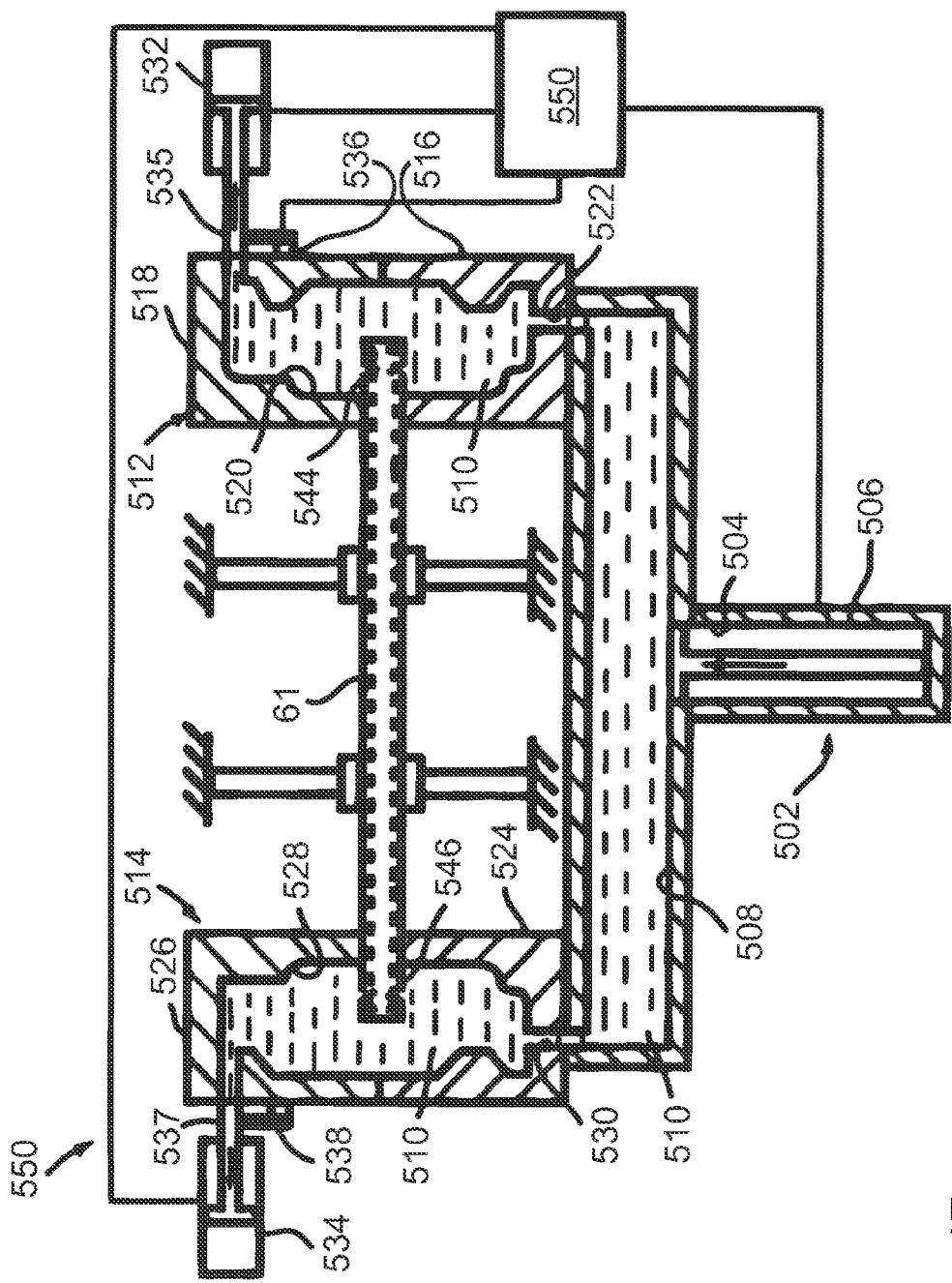
FIG. 47 illustrates the embodiment of FIG. 45 with the molten metal completely filling the molds.

As seen in FIG. 47, the cylinder 506 continues applying the initial filling pressure and the molten metal 510 completely fills each of the mold cavities 520 and 528. The pistons 535, 537 for the auxiliary cylinders 532, 534 are free to move with the molten metal 510. The molten metal 510 contacts the pistons 535, 537, and urges the pistons 535, 537 outwardly, increasing the volume of the cavities 520, 528 such that the volume of each cavity is increased to an expanded volume. Pistons 535, 537 are pushed and displaced by the molten metal 510.

The displacement of the piston 535 and 537 may be measured or observed in any variety of ways well known in the art, such as by position sensor or limit switches 536, 538, respectively. Limit switches 536 and 538 each generate a respective fill signal once the piston 535, 537 has traveled a predetermined amount. The fill signal is transmitted to the controller 550 which responsively activates the auxiliary power sources 532 and 534.

Other devices or mechanisms can be used to determine when the cavities 520 and 528 are filled. Those devices may be integral or separate from the auxiliary pressure sources 532 and 534 or interactively connected such as illustrated. For example, after experimentation with the process to determine how much time it takes to fill each cavity 520 and 528, the timing routine may be established wherein pressures of the main 506 and auxiliary cylinders 532 and 534 are turned on and off based on a predetermined timing sequence. Also, a computer controlled system using controller 550 may be used to automatically monitor the position sensors or limit switches 536, 538 or other monitoring devices or methodologies to determine when the cavities 520 and 528 are filled and when to activate the auxiliary cylinders 532 and 534 and to control the main cylinder 506. Auxiliary cylinders 532 and 534 provide merely one mechanism for determining the fill of the cavities 520 and 528 and other mechanisms can be used that are part of or separate from the auxiliary pressure devices.

Figure 48:
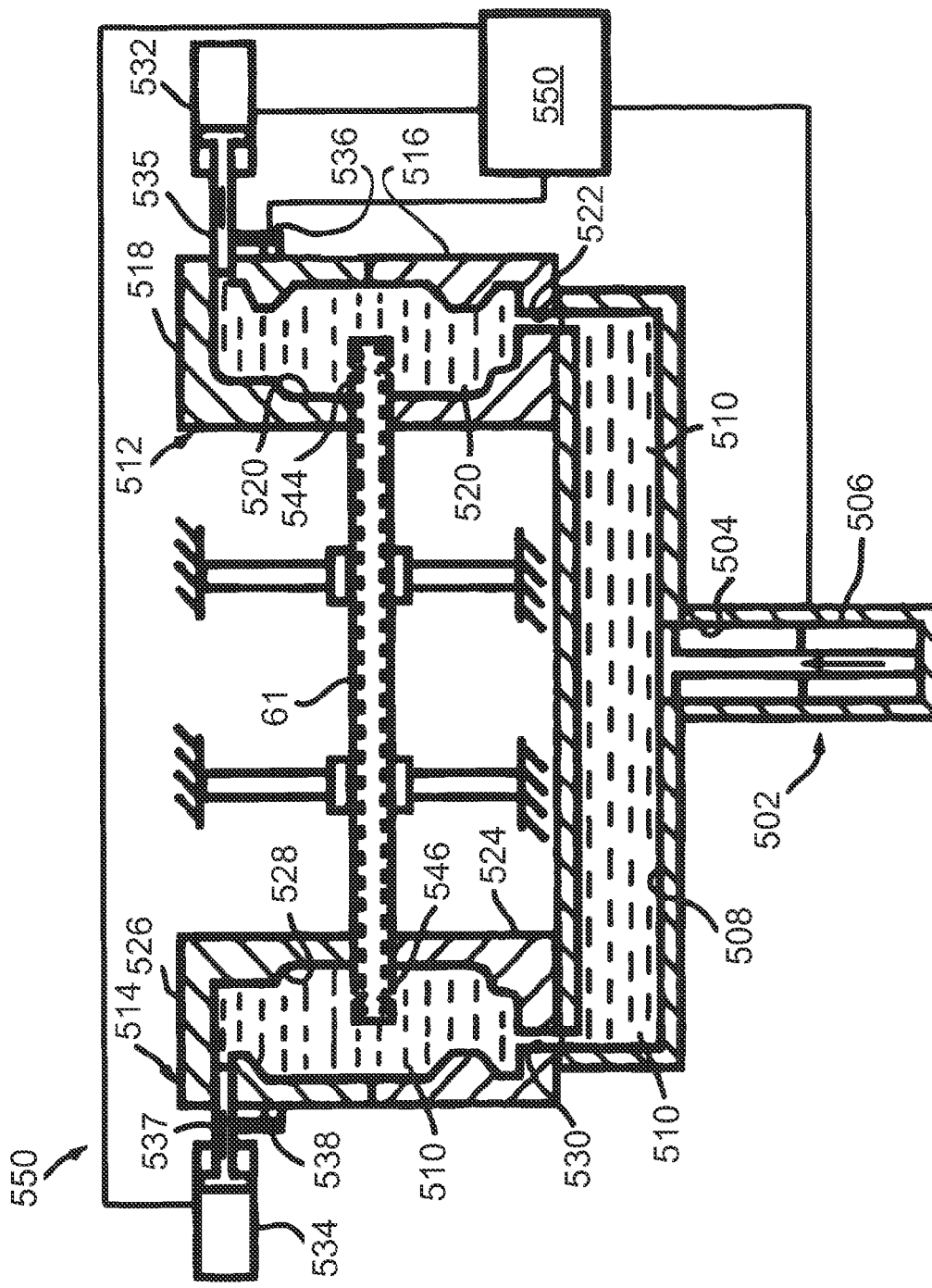
FIG. 48 illustrates the embodiment of FIG. 45 with the auxiliary pressure being applied to the molten metal in the molds.

As seen in FIG. 48, with the main cylinder 506 still applying an initial, fill pressure, or with the main cylinder 506 being turned off or relaxed; the auxiliary cylinders 532 and 534 apply auxiliary pressure to the molten metal 510 in mold cavities 520 and 528, respectively. This application of auxiliary pressure by cylinders 532 and 534 moves the pistons 535, 537 from the expanded volume to a desired volume and thereby injects a small amount of molten metal 510 back into the mold cavities 520 and 528 to compensate for or densify the solidifying metal, which shrinks upon cooling. The cylinders 532, 534 maintain a predetermined pressure on the molten metal 510 in each of the mold cavities 520 and 528 instead of relying solely on the main cylinder 506. Without the use of auxiliary cylinders 532, 534, the main cylinder 596 would necessarily have to be operated to provide a relatively high pressure once the cavities 520 and 528 were filled with molten metal 510 to provide sufficient pressure on the molten metal 510 in reservoir 508 to continue injection of molten metal 510 into the cavities 520 and 528 during the solidifying stage to ensure that the solidified metal casting conforms to the mold cavity. However, the use of the auxiliary cylinders 532 and 534 permits the main cylinder 506 to apply a relatively lower pressure than in previous casting systems and, as a result, the main cylinder 506 of the subject casting assembly 500 is permitted to be smaller than a main cylinder used in a system without auxiliary pressure supplies 532, 534.

Depending on the casting process being carried out, the main cylinder 506 may continue providing a low pressure to the molten metal 510 during solidification while the necessary pressure on the molten metal 510 for solidifying in cavities 520 and 528 is applied by auxiliary cylinders 532 and 534. Alternatively, the main cylinder 506 may be turned off or relaxed once the auxiliary cylinder 532 and 534 begin applying pressure or at sometime thereafter.

Figure 49:
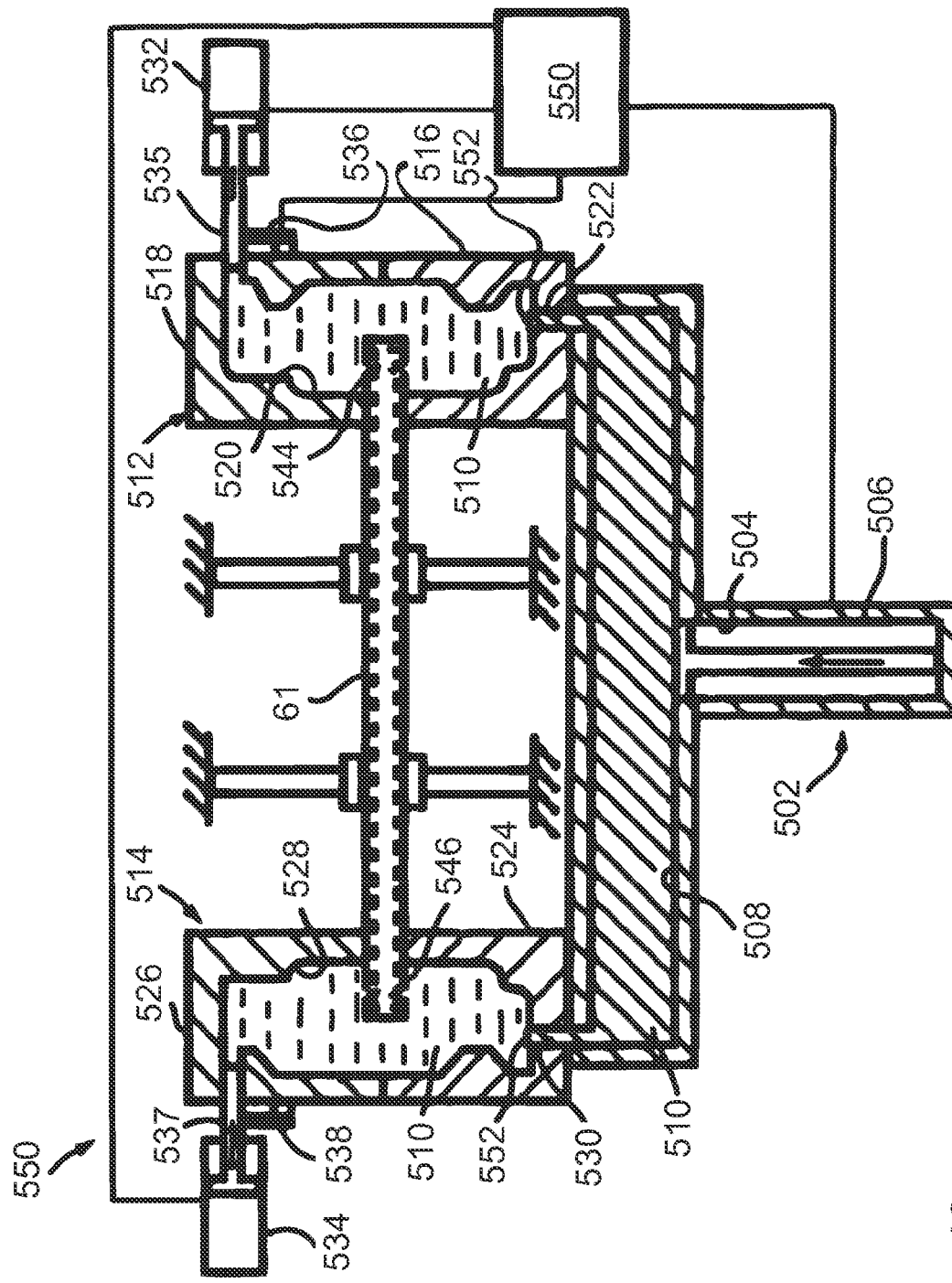
FIG. 49 illustrates the embodiment of FIG. 45 with the molten metal partially solidified, in the reservoir.

Eventually, as seen in FIG. 49, the molten metal 510 begins solidifying. The molten metal 510 may initially begin solidifying at places such as at the in-gates 522 and 530 and in the shot sleeve 508. Once the in-gates 522 and 530 solidify, any pressure applied by the main cylinder 506 will cease to be effective in applying the appropriate pressure to any metal still semi-molten in the cavities 520 and 528. FIG. 49 illustrates a benefit of the auxiliary cylinders 532 and 534 in that each cylinder continues applying pressure to the molten metal in cavities 520 and 528, respectively, even after the in-gates 522 and 530 are blocked by solidified metal 552.

Once the molten metal 510 is completely and sufficiently solidified, the auxiliary cylinders 532 and 534 are turned off and the die elements 516 and 518 and die elements 524 and 526 are opened, respectively, to reveal casts 63 that are formed from the solidified molten metal 510 in mold cavities 520 and 528. As seen in FIG. 26, the casts 63 are rigidly connected to the tubular members 61 to form, for example, a vehicle cradle 62, such as a cradle front engine cradle or a rear cradle for an automobile, as illustrated.

Figure 50:
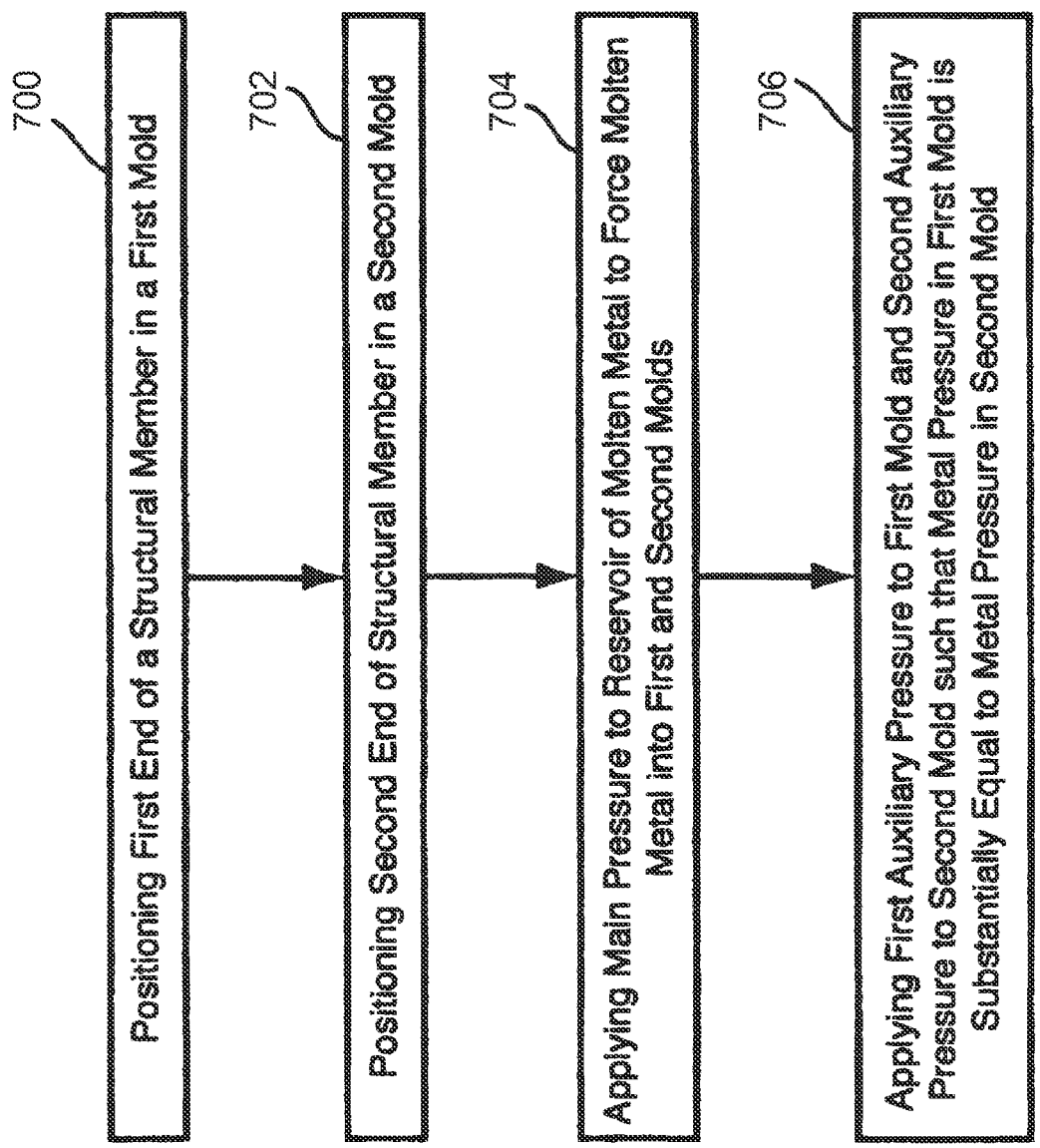
FIG. 50 illustrates a method in accordance with one aspect of the invention.

As seen in FIG. 50, one aspect of forming a metal casting is illustrated in the method of forming metal castings, comprising a position step 700 of positioning a first end 544 of a structural member 61 in a first mold cavity 520; a second positioning step 702 of positioning a second end 546 of the structural member 61 in a second mold cavity 528, the first and second mold cavities 520 and 528 being fluidly coupled to a reservoir 508 of molten metal 510; an applying step 704 of applying a main pressure to the molten metal 510 in the reservoir 508 to force the molten metal 510 into the first mold cavity 520 and the second mold cavity 528; and an applying step 706 of applying a first auxiliary pressure to the molten metal in the first mold cavity 520 and a second auxiliary pressure to the molten metal in the second mold cavity 528 such that the metal pressure in the first mold cavity 520 is substantially equal to the metal pressure in the second mold cavity 528.

Figure 51:
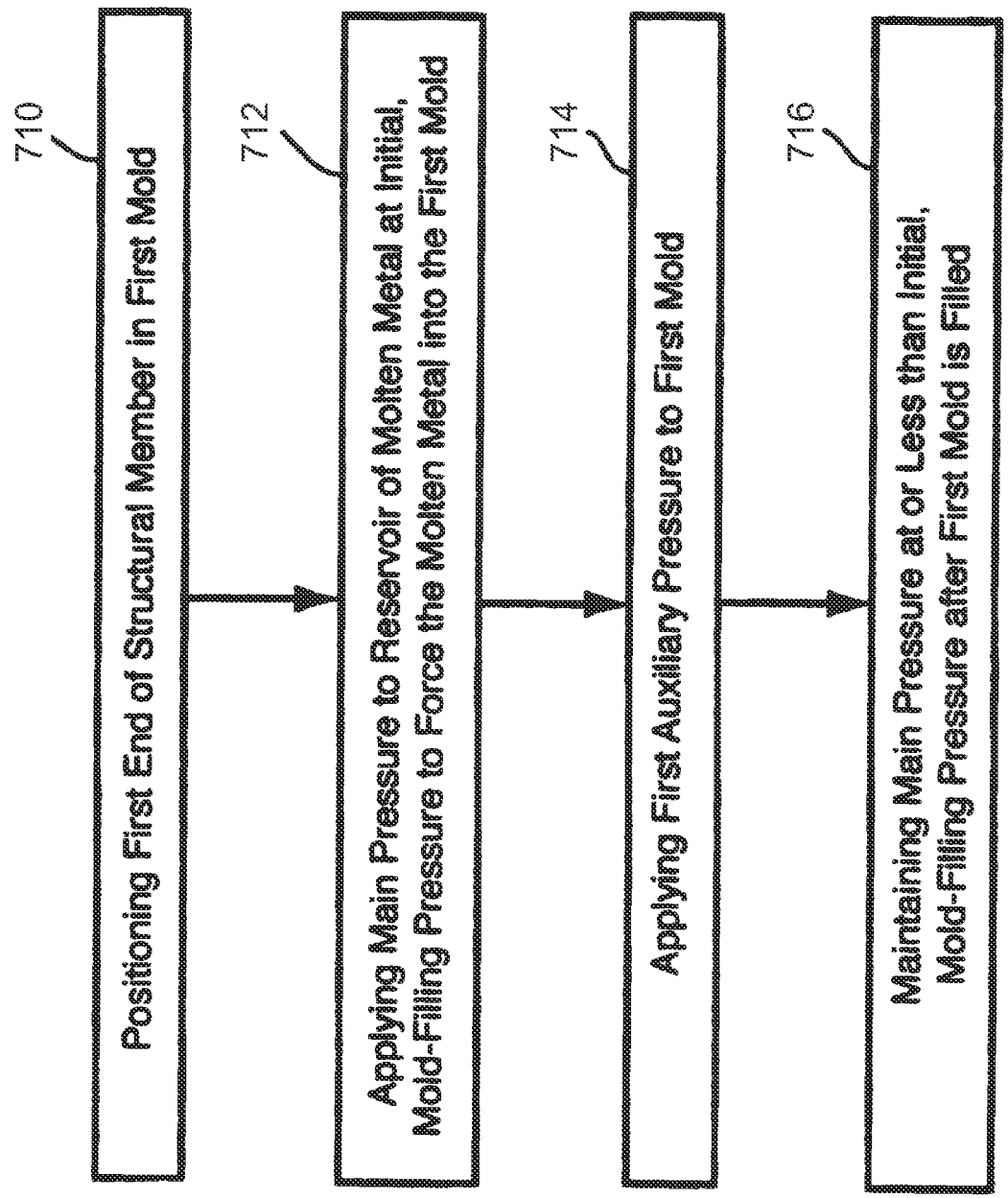
FIG. 51 illustrates a method in accordance with another aspect of the invention.

As seen in FIG. 51, another aspect of forming a composite metal casting is illustrated in the method of forming metal castings, comprising: a positioning step 710 positioning a first end 544 of a structural member 61 in a first mold cavity 520, the first mold cavity 520 being fluidly coupled to a reservoir 508 of molten metal 510; an applying step 712 applying a main pressure to the molten metal 510 in the reservoir 508 at an initial, mold-filling pressure to force the molten metal 510 into the first mold cavity 520; another application step 714 of applying a first auxiliary pressure to the molten metal in the first mold cavity 520; and a maintaining step 716 of maintaining the main pressure at or less than the initial, mold-filling pressure after the first mold cavity 520 has been filled.

Figure 52:
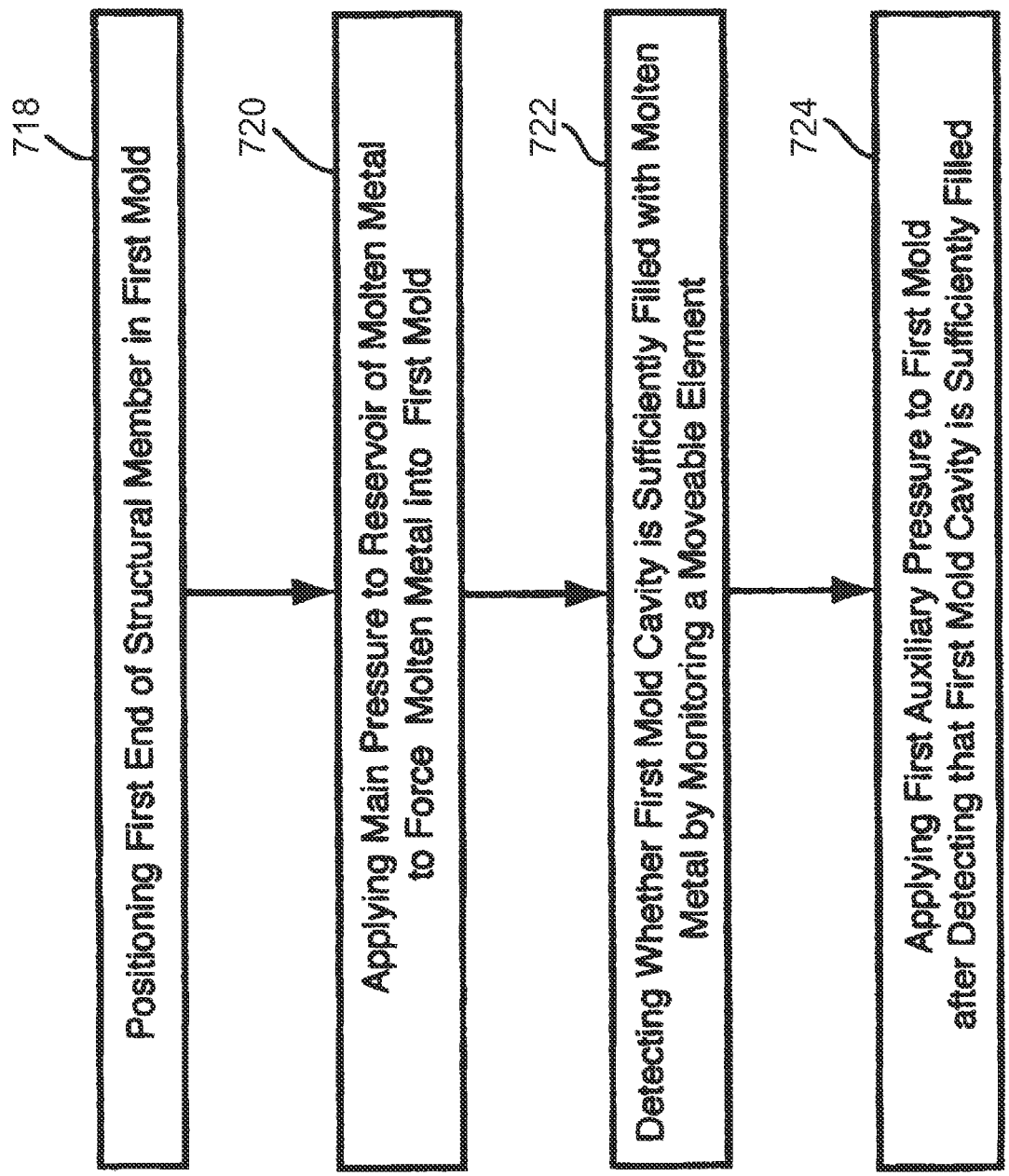
FIG. 52 illustrates a method in accordance with yet another aspect of the invention.

As seen in FIG. 52, another aspect of forming a metal casting is illustrated in the method of forming composite metal castings, comprising: the positioning step 718 of positioning a first end 544 of a structural member 61 in a first mold cavity 520, the first mold cavity 520 being fluidly coupled to a reservoir 508 of molten metal 510; an application step 720 of applying a main pressure to the molten metal 510 in the reservoir 508 to force the molten metal 510 into the first mold cavity 520; a detecting step 722 of detecting whether the first mold cavity 520 is sufficiently filled with molten metal 510 by monitoring a moveable element 535; and an application step 724 of applying a first auxiliary pressure to the molten metal in the first mold cavity after detecting that the first mold cavity 520 is sufficiently filled.

The size of a semi-solid sub-liquidus casting (SLC) machine is defined by the platen size and the clamp tonnage. The platen size determines the largest die dimension that can physically fit under the clamp of the press. The clamp tonnage is defined by the product of the "projected area" times the metal pressure. Metal pressure relative to the size of casting defects and associated material properties is significant up to a metal pressure of 4 tons per square inch. Further increases in metal pressure in excess of 4 tons per square inch are reported to provide little additional value.

In one embodiment of the system of FIGS. 45-49, the sub-liquidus casting (SLC) process semi-solid casting process includes the biscuit or molten metal reservoir 508 (typically 20" diameter) from which molten metal 510 is transferred into the die cavities 520 and 528 via a hydraulic cylinder 506 and shot tip assembly 504. The machine tonnage required is determined by the product of the metal pressure (i.e., approximately 4 tons per square inch) times the sum of the projected area of the shot tip (biscuit) assembly 504 and 508 and the projected area of the castings outside the perimeter of the shot tip biscuit assembly 504, 508.

The SLC process would ordinarily assume that the majority of the casting projected area is located directly above the shot tip/biscuit area. The platen size is thus designed to accommodate a relatively large die, presenting metal pressure and casting projected area (shot tip plus casting area) as the limiting features which define the machine tonnage requirements.

The "controlled pressure" method of the subject application is particularly applicable to the manufacture of "hybrid material" cast automotive components such as cradles which are typically separated by high strength steel tubes. Separation of the castings results in a significant amount of the casting area to be outside of the projected area of the biscuit 508, thus increasing the machine size tonnage requirement of, for example, main cylinder 506. The controlled pressure method utilizes the shot tip assembly 504, 508 to inject metal into the dies 520 and 528 and auxiliary cylinders 532 and 534 provide pressure after the die cavities 520 and 528 are full. This technique results in limiting the metal pressure during the die fill and initial solidification phase to that of the machine clamp tonnage divided by the total projected area associated with the biscuit 504, 508 and casting area 520, 528. Once the cavities 520, 528 are full, the shot tip pressure is reduced and auxiliary cylinders 532 and 534 integral to the die cavities 520 and 528, respectively, are actuated, providing pressure to only the casting projected area.

Specifically, this can be seen when taking a specific rear cradle example:

| CONVENTIONAL SLC CASTING METHOD | |
|---|---|
| Shot tip/biscuit diameter: | 20 in |
| Shot tip/biscuit projected area: | 314 in$^2$ |
| Casting projected area (outside perimeter of shot tip) | 192 in$^2$ |
| Total projected area (casting & shot tip): | 506 in$^2$ (192 + 314) |
| Required machine tonnage @ 8,000 psi (4 tons/in$^2$) metal pressure | 2,000 ton |

| CONTROLLED PRESSURE SLC CASTING METHOD IN ACCORDANCE WITH EMBODIMENTS OF SUBJECT APPLICATION | |
|---|---|
| Shot tip/biscuit diameter: | 20 in |
| Shot tip/biscuit projected area: | 314 in$^2$ |
| Casting projected area (outside perimeter of shot tip) | 192 in$^2$ |
| Metal pressure permitted at end of die fill | 2 ton/in$^2$ |
| Required machine tonnage @ 8,000 psi (4 tons/in$^2$) metal pressure | 768 ton |

Thus, when using the method in accordance with the embodiments of the subject application, the required machine tonnage is less than the required machine tonnage using conventional methods and apparatus. The embodiments of the subject application, which are referred to as "controlled pressure" casting, provides the capability to cast components such as a rear cradle or front engine cradle in one casting machine cycle, in a reduced machine tonnage that is relative to only the "saleable" casting projected area (the casts 63 themselves) rather the sum of the projected area of the castings 63 and biscuit 508.

Figure 53:
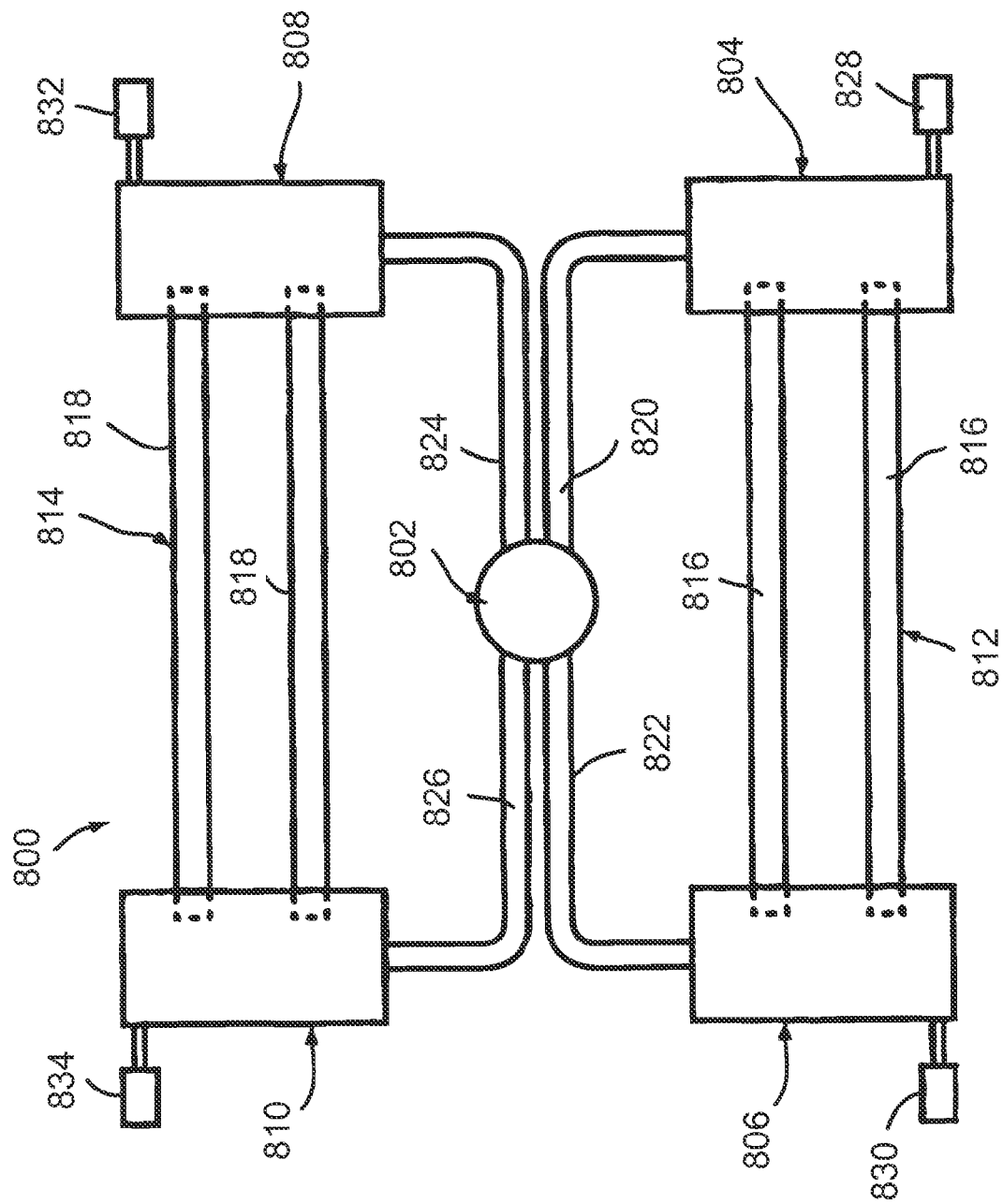
FIG. 53 illustrates a schematic of another embodiment of the present invention wherein four molds are in operation simultaneously to form two vehicle cradles.

FIG. 53 illustrates a casting assembly 800 in accordance with another embodiment of the invention wherein one shot tip pressure assembly 802 supplies molten metal to four casting die assemblies 804, 806, 808, 810 so that two vehicle cradles 812 and 814 may be cast simultaneously. Each vehicle cradle 812 and 814 is shown with two structural members 816 and 818, respectively, and each engine cradle 812 and 814 can be similar to cradle 62 in FIG. 26. The structural members 816 and 818 may be substantially identical to tube 61 in composition and make-up. Of course, the specific shape of any structural members 816 and 818 will vary dependent upon the specific vehicle cradle formed. As mentioned above, such an arrangement as illustrated in FIG. 53 is possible due to the efficiencies of the casting assemblies disclosed herein in the embodiments of the subject application.

In FIG. 53, main pressure assembly 802 is fluidly coupled to the die cavity of each die assembly 804, 806, 808, 810 by shot sleeves 820, 822, 824 and 826, respectively. Each die assembly 804, 806, 808, 810 receives the ends of two structural members 816, 818 so that the castings formed in each die assembly 804, 806, 808, 810 will encapsulate two ends of the structural members 816 and 818. Each die assembly 804, 806, 808, 810 also has an auxiliary pressure source 828, 830, 832, and 834, which is similar to auxiliary pressure sources 532 and 534 described above. Also, the casting assembly 500 can be controlled by controller in a manner as described above with respect to controller 550. Other than the main pressure 802 supplying molten metal to four die assemblies 804, 806, 808, 810, the configuration of the casting assembly 800 is substantially identical to casting assembly 500 described above.

The embodiment of FIG. 53 illustrates one of the efficiencies of the illustrated embodiments of the subject application. That is, since auxiliary pressures are applied to each die 804, 806, 808, 810 during solidifying, the main pressure supplied to each die 804, 806, 808, 810 by main cylinder 802 is less than the pressures typically applied by main cylinders in prior art casting arrangements. Thus, since the main pressure in the embodiments of the subject application are lower, the size requirements of the pressure system and for the main hydraulic cylinder is less. This permits the embodiments of the subject application to utilize smaller main hydraulic cylinders and smaller pressure requirements. Alternatively, with the same size and pressure constraints found in the prior art, embodiments of the subject application can be used to fill a greater number of die cavities with molten metal. For example, wherein the a prior art configuration may only be used to cast one vehicle cradle member, embodiments of the subject application may be used to produce more castings, for example, two cradle assemblies that each require two castings. Thus, whereas the prior art could make, for example, two castings per cycle, the embodiment of FIG. 53 may produce, for example, four casting per cycle using the same pressure and sized machinery.

Thus, embodiments of the subject application utilize a minimum level of hydraulic pressure required to transfer molten metal 510 from the shot sleeve 508 through the in-gates 522 and 530 to the die cavities 520 and 528. The hydraulic pressure from the main pressure cylinder 506 that is needed to fill the cavities 520 and 528 is much less than the hydraulic pressure needed from a main pressure cylinder of, for example, a prior art device that only relies upon one pressure source—the main pressure source—to provide pressure during solidifying to reduce the volume of entrapped air and increase the rate of heat transfer during solidifying. The embodiments of the subject application also incorporate moveable cores (squeeze pins) in the form of auxiliary hydraulic cylinders 532 and 534 in each die cavity 529 and 528, respectively. The auxiliary cylinders 532 and 534 are capable of detecting that their respective die cavity 520 and 528 is full, prior to increasing the metal pressure within the cavities 520 and 528.

Embodiments of the subject application also simultaneously actuate the auxiliary hydraulic cylinders 532 and 534 acting as moveable cores to increase metal pressure integral to each die cavity 520 and 528, respectively, which share a common submerged member 61. Thus, embodiments of the subject application illustrate a method of densifying the metal in multiple cavity dies 520, 528 to minimize the main pressure force.

Also, embodiments of the subject application provide a method of detecting whether die cavities such as cavities 520 and 528 are filled with molten metal 510 by using a moveable core, such as in the form of auxiliary hydraulic cylinders 532 and 534.

FIG. 64 shows a hybrid torsion beam axle assembly according to an embodiment of the instant invention. The hybrid torsion beam axle assembly 1000 comprises a tubular member 1002 made of a metal material, such as for instance steel. The tubular member 1002 may be heat-treated. The tubular member 1002 can be formed to any desired shape by using any conventional process. For example, the tubular member 1002 can be formed using a hydroforming process, or the like, thereby forming a hydrocast hybrid component. In the instant embodiment, the tubular member 1002 is a steel torsion beam of the hybrid torsion beam axle assembly 1000.

The hybrid torsion beam axle assembly 1000 also includes a pair of attachment or coupling members, such as for instance trailing arms 1004 and 1006, connected one each to longitudinal opposite end portions 1008 and 1010 of the tubular member 1002. The trailing arms 1004 and 1006 are made by aluminum die casting, as described in greater detail below. As used herein, the term "aluminum" denotes aluminum and its alloys. Optionally, the trailing arms 1004 and 1006 are made by magnesium die casting, wherein the term "magnesium" denotes magnesium and its alloys.

Figure 65:
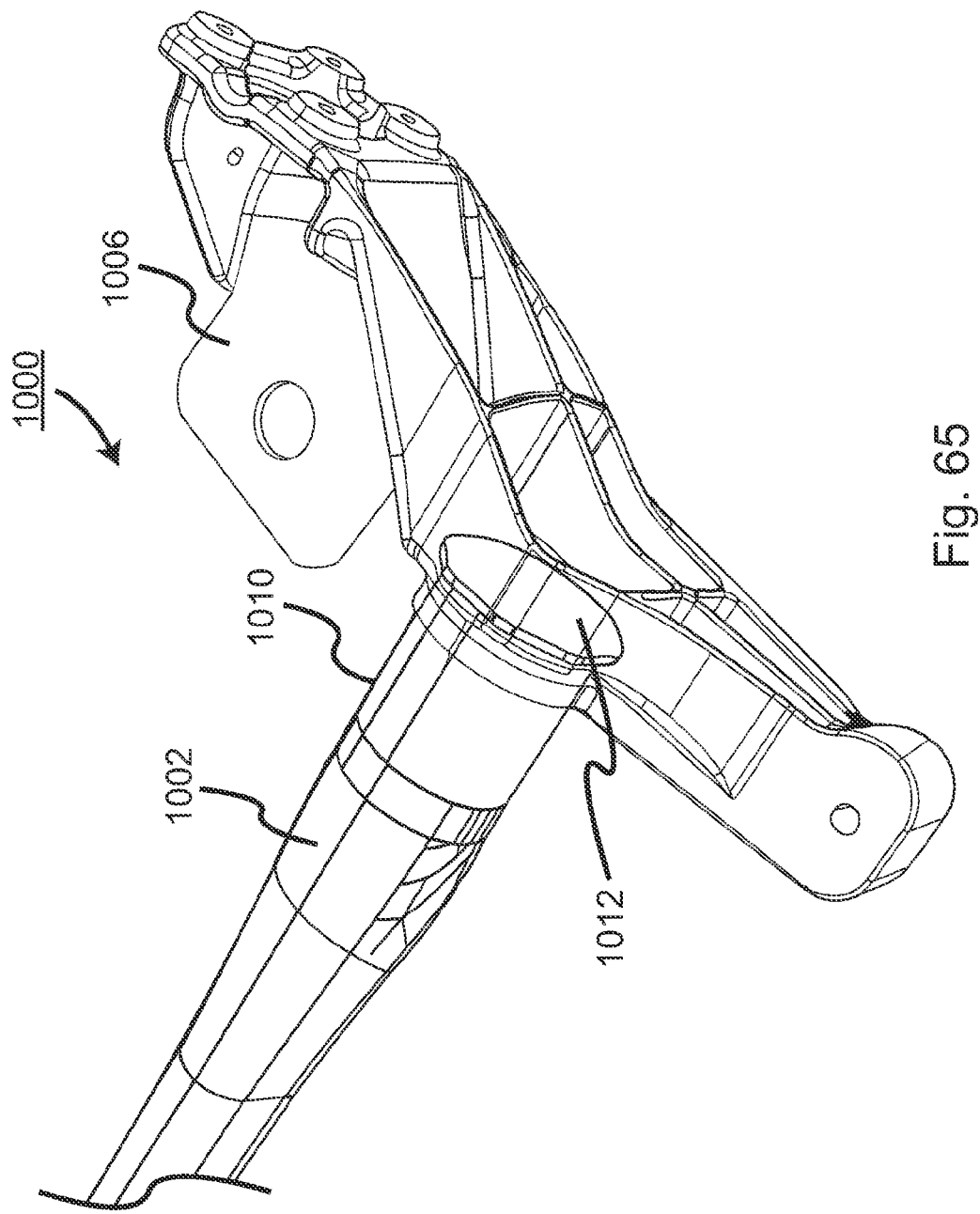
FIG. 65 shows an enlarged perspective view of one end of the hybrid torsion beam axle assembly of FIG. 64.
Figure 66:
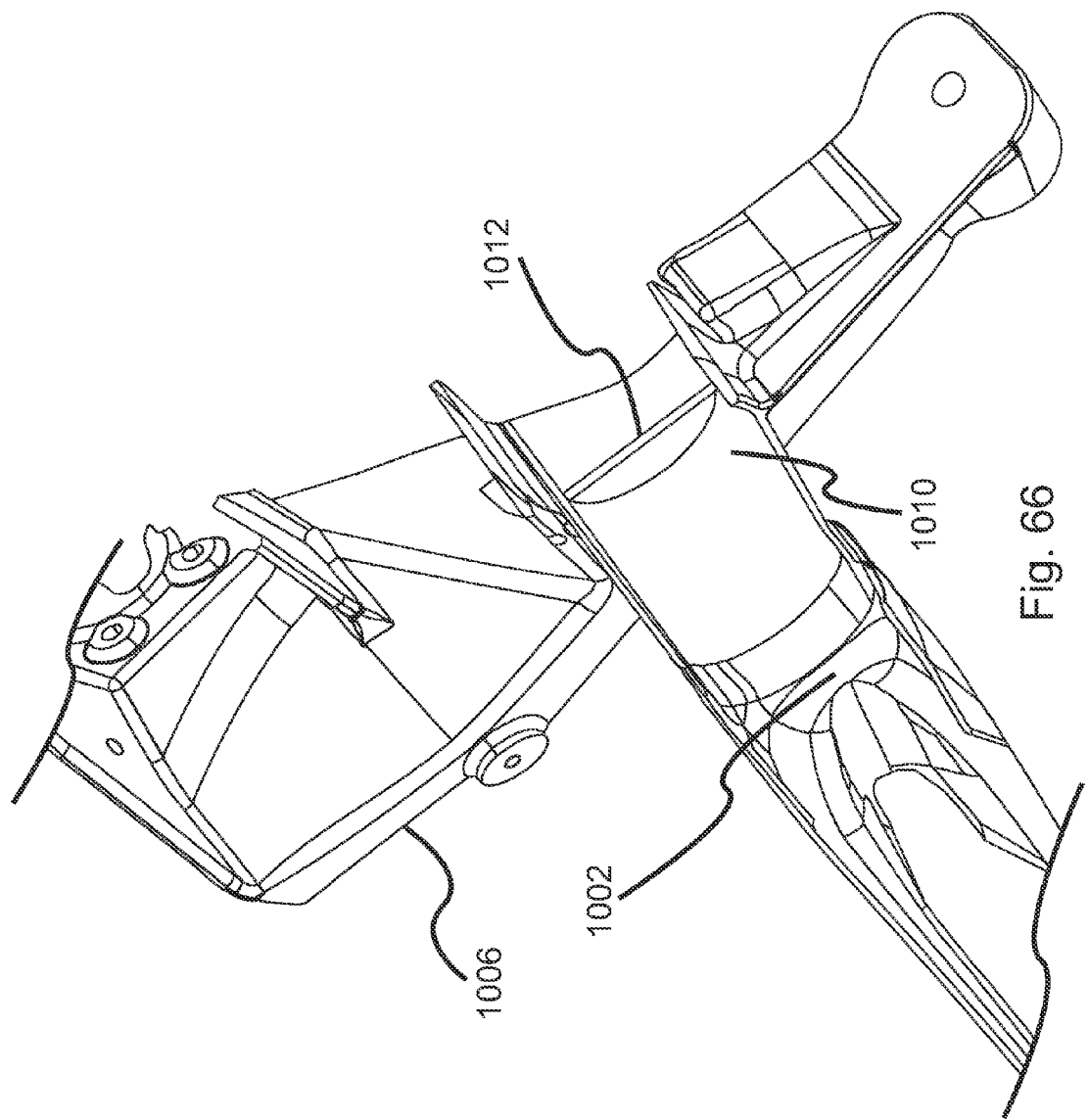
FIG. 66 is partial cut-away section of the one end of the hybrid torsion beam axle assembly shown in FIG. 65; and, FIG. 67 shows a second perspective view of the flange structure of the end cap that is fastened to one end of the torsion beam of FIG. 64.
Figure 67:
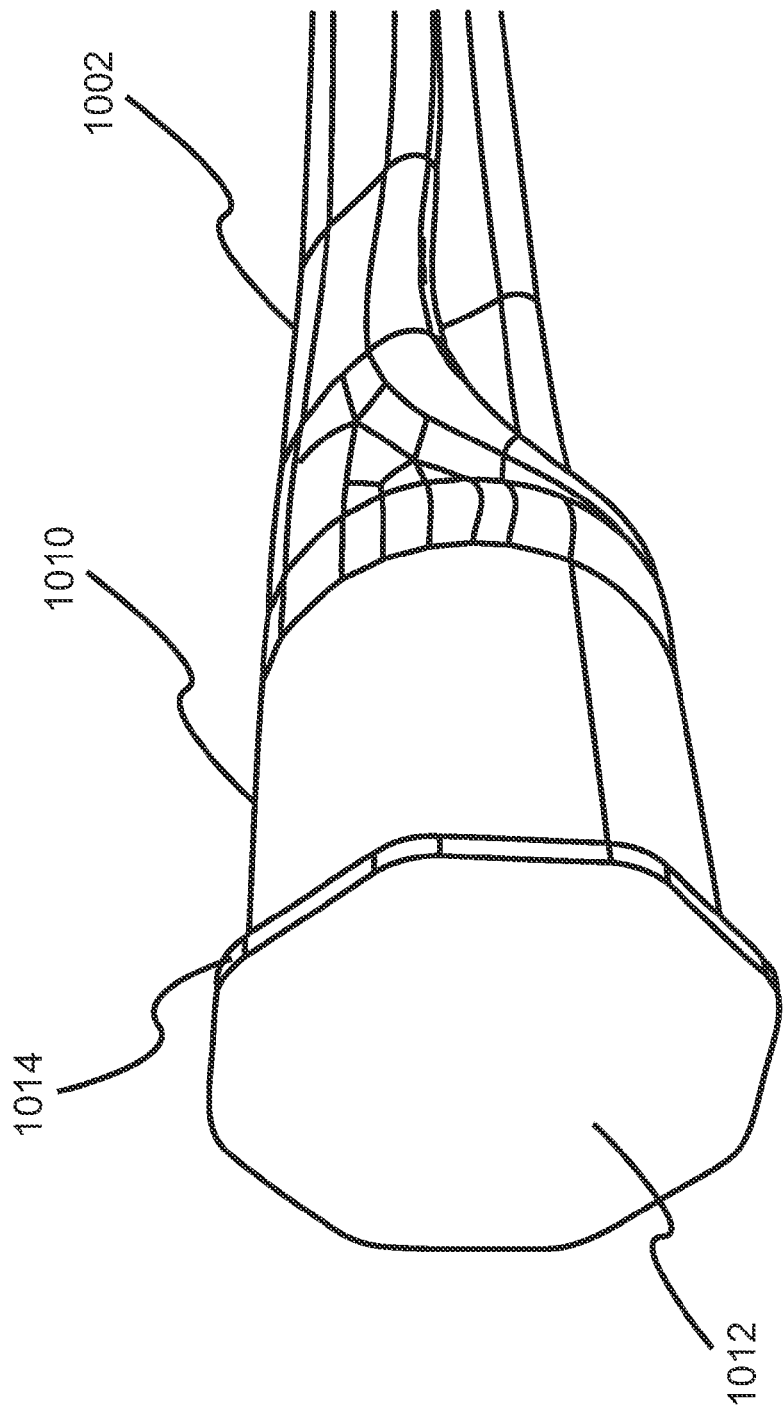

Referring now to FIGS. 65-67, one aspect of the invention is the method by which the trailing arms 1004 and 1006 are secured to the tubular member 1002. In particular, as shown in FIG. 65, an end cap 1012 is secured to one end 1010 of the tubular member 1002. The end cap 1012 closes the one end 1010 of the tubular member 1002. In the instant example, the end cap 1012 comprises a flange 1014 (shown in FIG. 67) extending past the sidewall of the tubular member 1002, so as to provide an anchor structure for retaining the cast trailing arm 1006. The flange 1014 has a non-circular (polygonal) configuration to provide a mechanical interlock surface, in particular an octagonal configuration. Optionally, the flange 1014 has an outwardly extending member as discussed above with reference to FIG. 20e. The outwardly extending member can generate additional torque, which is advantageous for high torque applications such as in the hybrid torsion beam axle assembly. Optionally, the flange 1014 has a circular configuration, either with or without an outwardly extending member. Optionally, the flange 1014 has another suitable configuration, such as for instance an elliptical shape, a star-like shape or an irregular shape, etc.

Referring again to FIG. 65, the trailing arm 1006 is fabricated using a cast-in-place technique, rather than using a conventional welding technique. The cast technology used to form the trailing arm 1006 can be, for example, high pressure aluminum die casting, low pressure permanent mold, lost foam casting, squeeze cast, vacuum die cast, semi-solid casting, or the like. End cap 1012 is fastened to the end 1010 of the tubular member 1002, such as for instance by welding. The end cap 1012 seals the end 1010 of the tubular member 1002 to prevent the ingress or influx of the molten casting material into the tubular member 1002 during the cast-in-place technique. The trailing arm 1006 is then cast in place encapsulating the end cap 1012 and a portion of the tubular member 1002. In this manner, the trailing arm 1006 is positively secured to the tubular member 1002.

Referring now to FIG. 66, shown is partial cut-away view of the hybrid torsion beam axle assembly 1000. FIG. 66 shows the trailing arm 1006 cast about the end of the tubular member 1002 and end cap 1012.

Of course, the trailing arm 1004 is fabricated similarly using a cast-in-place technique. In particular, a not illustrated end cap seals the end 1008 of the tubular member 1002 to prevent the ingress or influx of the molten casting material into the tubular member 1002 during the cast-in-place technique. In this manner, the trailing arm 1004 is positively secured to the tubular member 1002.

While the invention has been specifically described in connection with certain specific embodiments thereof, it is to be understood that this is by way of illustration and not of limitation, and the scope of the appended claims should be construed as broadly as the prior art will permit.

What is claimed is:

1. A hybrid torsion beam axle assembly, comprising:
a steel torsion beam;
an end cap fixedly secured to an end portion of the steel torsion beam; and
a cast trailing arm cast about the end portion of the steel torsion beam including the end cap, thereby positively and rigidly securing the cast trailing arm to the steel torsion beam.

2. The hybrid torsion beam axle assembly according to claim 1, wherein the steel torsion beam is tubular in shape.

3. The hybrid torsion beam axle assembly according to claim 1, wherein the end cap has a flange having one of a circular and a non-circular configuration.

4. The hybrid torsion beam axle assembly according to claim 3, wherein the flange has notches for providing a mechanical interlock surface.

5. The hybrid torsion beam axle assembly according to claim 1, wherein the end cap has a flange having a polygonal shape for providing a mechanical interlock surface.

6. The hybrid torsion beam axle assembly according to claim 1, wherein the end cap has a flange having a polygonal shape including an outwardly extending member.

7. The hybrid torsion beam axle assembly according to claim 1, comprising a knurl on an outside surface about the end portion of the steel torsion beam for providing a mechanical interlock surface.

8. The hybrid torsion beam axle assembly according to claim 1, wherein the steel torsion beam is made from one of high strength steel, ultra high strength steel, boron steel and stainless steel.

9. The hybrid torsion beam axle assembly according to claim 1, wherein the trailing arm is cast from aluminium or an alloy thereof.

10. The hybrid torsion beam axle assembly according to claim 1, wherein the trailing arm is cast from magnesium or an alloy thereof.

* * * * *